United States Patent
Concorso

(10) Patent No.: US 8,069,343 B2
(45) Date of Patent: Nov. 29, 2011

(54) COMPUTER WITH BOOTABLE RESTORATION

(76) Inventor: James A. Concorso, Bridgewater, NJ (US)

( * ) Notice: Subject to any disclaimer, the term of this patent is extended or adjusted under 35 U.S.C. 154(b) by 489 days.

(21) Appl. No.: 12/383,128

(22) Filed: Mar. 20, 2009

(65) Prior Publication Data

US 2010/0241837 A1    Sep. 23, 2010

(51) Int. Cl.
*G06F 11/00* (2006.01)

(52) U.S. Cl. .................. 713/1; 713/2; 713/100; 714/36; 714/6; 717/174

(58) Field of Classification Search .................. 713/1, 2, 713/100; 714/6, 36; 717/174
See application file for complete search history.

(56) References Cited

U.S. PATENT DOCUMENTS

| | | | |
|---|---|---|---|
| 5,485,606 A * | 1/1996 | Midgdey et al. ...................... 1/1 |
| 5,579,522 A * | 11/1996 | Christeson et al. ............... 713/2 |
| 6,167,494 A * | 12/2000 | Cheston et al. ............... 711/162 |
| 6,519,762 B1 | 2/2003 | Colligan et al. |
| 6,615,365 B1 | 9/2003 | Jenevein et al. |
| 6,845,464 B2 | 1/2005 | Gold |
| 6,934,881 B2 | 8/2005 | Gold et al. |
| 7,024,581 B1 | 4/2006 | Wang et al. |
| 7,047,403 B2 | 5/2006 | Lin |
| 7,111,203 B2 * | 9/2006 | Hu et al. ......................... 714/36 |
| 7,430,686 B1 * | 9/2008 | Wang et al. .................... 714/6.3 |
| 2006/0085686 A1 * | 4/2006 | Cheston et al. ................. 714/38 |

* cited by examiner

*Primary Examiner* — M Elamin

(57) ABSTRACT

A bootable restoration computer includes: at least one mass storage device; at least two mass storage device partitions in the at least one mass storage device, including first and second partitions; a partition image restoration program; at least one partition image; at least one human interface device; a primary operating system with graphical user interface; a secondary operating system; and, a boot loader responsive to the human interface device that provides for selecting between the primary secondary operating systems. The primary operating system resides on the first partition and is configured so that its standard locations for storing user-created files are folders rooted on at least one of any partition other than the first partition. The at least one partition image is an image of the first partition, and resides on at least one of any partition other than the first partition. If no opportunity is taken to select the secondary operating system in a predefined time, the computer loads the primary operating system. If the opportunity is taken, the partition image restoration program restores the partition image to the first partition.

42 Claims, 30 Drawing Sheets

COMPUTER WITH BOOTABLE RESTORATION

BACKGROUND OF INVENTION a. Field of Invention

The present invention resides in the field of computers, and is particularly advantageous for personal computers where user skills range from professional to minimal. It is directed to a personal computer in which a manufacturer-programmed state can be restored without the loss of user files. It is especially useful against aging, spyware installation, user error, and virus invasion.

b. Description of Related Art

Backup and recovery methods for personal computers and most other computers have been evolving for a decade, fueled predominantly by the advent of partition image backup and restoration programs. A partition image is a sector-based copy of the contents of a mass storage device partition. Thus, a partition image contains both file/folder data and locational information relating thereto. A partition image backup and restoration program makes an exact copy of an entire mass storage device partition in the form of a partition image. The user performs a recovery operation by booting the computer to the partition image backup and restoration program, which mounts the partition image to the originating mass storage device partition from which the image was made. Such a method requires the user to make a newer partition image whenever he acquires, creates, or modifies files. A typical user neither possesses nor wishes to learn the skill necessary to create new partition images, and might find the need for such maintenance objectionable. Consequently, the use of a Partition Image Backup and Restoration Program will likely result in the loss of the user's most recent files. Moreover, a user who makes frequent partition images is faced with a dilemma wherein a recent partition image that contains all of the user's files may also contain the kind of corruption or degradation of the operating system for which backup and recovery is sought, thus obviating its benefit.

In light of the aforementioned compromises, other methods of protecting the functionality and integrity of the operating system have been developed as interim alternatives to whole-partition imaging. To wit, System File Checker (SFC) performs a check to verify that critical system files have not been altered or replaced. While this method affords protection of some files, other damage may occur that renders the personal computer unusable due to corruption of files that fall outside the scope of the System File Checker. Furthermore, it may be necessary or desirable to replace one or more protected system files, and such a protection scheme may actually interfere with legitimate and desired modification and reconfiguration of the operating system.

Another prior art solution to the problem of protecting a computer, such as a personal computer, is usually known as System Restore, which periodically creates backup copies of selected system configuration files that the user can employ to roll back the operating system to a previous configuration state. Such a scheme burdens the user because these restore points, as they are called, must be clearly and verbosely documented if the user is to discern which restore point is right for a given situation. Also, rolling back the system might evoke a conflict between the older configuration files that are restored, and the newer files that remain.

Again, neither the System File Checker nor the System Restore provide protection for the whole operating system and all of its constituent parts. Worse still is the allocation of resources and speed and performance degradation that accompanies the use of the System File Checker and the System Restore.

Still more invasive methods of protecting computer integrity and functionality exist, wherein third-party application programs are installed to scan for viruses, and spyware. These methods invariably fail because of the incessant need to update the software with the latest spyware and virus definitions that are required literally on a daily basis. Equally troubling is the deep intrusion into the quality of the user's computing experience perpetrated by such software which seeks to scan every file that is written to the mass storage device partition. As was the case with the System File Checker and the System Restore, there is also a performance, speed, and resource penalty to be paid even more so in the case of anti-virus and anti-spyware software.

The following patents are representative of the field pertaining to the present invention:

U.S. Pat. No. 6,519,762, issued to Tom Colligan, Jonathan Ellis, and Hunter Robertson, describes a computer system having capability for restoration of a hard disk drive, said computer system comprising at least one processor, at least one hard disk drive, a software image stored on said at least one hard disk drive, said software image including a factory downloaded image which is subject to corruption, and a protected software restoration image not prone to a typical corruption, said protected software restoration image being stored on said at least one hard disk drive and available for use by said at least one processor in executing the restoration of said software image on said at least one hard disk drive to a like new factory downloaded image condition.

U.S. Pat. No. 6,615,365, issued to Roy M. Jenevein, Heidi S. Kramer, Derrick S. Shadel, Andy V. Lawrence, and Val A. Arbon, describes a computer system comprising a processor, a volatile memory in operable connection with the processor, and a persistent storage medium accessible to the processor, a partition stored in the persistent storage, user data stored in the partition, file system data stored in the partition, and at least one image which contains a copy of at least a portion of the user data, the image also being stored in the partition.

U.S. Pat. No. 6,845,464, issued to Stephen Gold, describes method of performing a recovery operation of an operating system for a computer entity, said computer entity comprising a data processor arrangement and at least one data storage device, wherein said data storage device is configured into a plurality of separate partition areas, a first of said areas being an operating system back-up area partition which is not used for direct running of an operating system by said computer entity, a second of said areas being a user setting archive partition area, said method comprising causing the data processor arrangement to perform the steps of copying a back-up operating system from a back-up source onto the operating system back-up area partition which is not used for direct running of an operating system by said computer entity, copying user settings data from said back-up source to the user setting archive partition area of said data storage device, and resetting said computer entity.

U.S. Pat. No. 6,934,881, issued to Stephen Gold and Peter Thomas Camble, describes a method of restoring an operational state of a computer entity, said computer entity comprising at least one data processor, at least one data storage device, a primary operating system capable of running said computer entity, a secondary operating system capable of rebuilding said primary operating system, and a known good, pristine copy of said primary operating system, and patch data representing a portion of code which replaces a portion of said primary operating system stored on said data storage device, said method comprising the steps of booting said computer entity to operate from said secondary operating system, rebuilding, under control of said secondary operating system, said primary operating system from said copy of said primary operating system, and applying said patch data to the rebuilt primary operating system.

U.S. Pat. No. 7,024,581, issued to Frank C. Wang, Donald Messerli, and Dennis E. Kelly, describes a system for recovering the content of a computer storage device comprising means for installing in a primary partition of the storage device, application programs and a primary operating system for controlling execution of the application programs therein and for installing a second differing operating system in a protected recovery partition, means for including said second operating system effective during installation of operating systems on the storage device for creating and storing a sector-based copy of the primary partition, and means for including the second operating system for restoring the primary partition from said sector-based copy in the event of corruption of the primary operating system.

U.S. Pat. No. 7,047,403, issued to Wen-Pin Lin, describes a system for operating system recovery in a computer system, comprising a data storage device, a first partition, a second partition including an image copy of an operating system, and a third partition including bootable files, and a basic input/output system having a system recovery function to activate the third partition and boot the computer system to the third partition if the system recovery function is executed, wherein after the computer system is booted to the third partition, the computer system unpacks the image copy of the operating system in the second partition into an integral copy of operating system and copies the integral copy of operating system to the first partition, deactivate the third partition, activates the first partition, and reboots the computer system to the first partition.

U.S. Pat. No. 7,111,203, issued to Jianfeng Hu, Gang Bai, Peng Zhang, and Wenbing Yang, describes method for implementing data backup and recovery in a hard disk of a computer, comprising (a) pre-setting a backup/recovery function key and a recording device on the hardware, wherein the recording device is for recording the information about the computer bootstrap mode, (b) powering a computer motherboard and booting a computer BIOS by triggering hardware, and if by pressing on the backup/recovery function key, storing information about starting a backup/recovery function in the recording device, (c) reading the information about the computer bootstrap mode from the recording device, if the information represents a backup/recovery function to be started, proceeding to step (d), otherwise, proceeding to step (e), and (d) operating the hard disk protection partition by BIOS, loading a kernel of an embedded operating system and performing the backup/recovery processing, or, (e) booting the computer with a preinstalled conventional operating system.

U.S. Pat. No. 7,430,686, issued to Frank C. Wang, Donald Messerli, and Dennis E. Kelly, describes a method comprising the steps of storing a first copy of the content of a first storage area in a second storage area, the first storage area including a first operating system, installing a second operating system and storing a backup/restore program and a second copy of the content of the first storage area in the second storage area, the second copy comprising changes occurring in the content of the first storage area since the first copy, selectively restoring the first storage area using at least one of the copies selected from the first copy and the second copy using the backup/restore program running under at least one operating system selected from the first opening system and the second operating system, and executing the first operating system in the first storage area before and after restoring the first storage area.

Notwithstanding the above prior art and the state-of-the-art as understood, it appears that the present invention concept wherein a computer with bootable restoration has a mass storage device with at least two partitions including a first partition for a primary operating system, and has the primary operating system so configured that the standard locations for storing user-created files are rooted on a partition other than the first partition, and has an image of the first partition residing on a partition other than the first partition, is neither taught nor rendered obvious thereby.

SUMMARY OF INVENTION

The present invention is a computer with bootable restoration; it includes a physical computer member that has: (a) at least one mass storage device; (b) at least two mass storage device partitions in the at least one mass storage device, including first and second partitions; (c) a partition image restoration program; (d) at least one partition image; (e) at least one human interface device; (f) a primary operating system that includes a graphical user interface; (g) a secondary operating system; and, (h) a boot loader responsive to the at least one human interface device, the boot loader providing opportunity for selecting between the primary operating system and the secondary operating system.

The primary operating system resides on the first partition and the primary operating system is configured so that its standard locations for storing user-created files are folders rooted on at least one of any partition other than the first partition, the at least one partition image is an image of the first partition, and the at least one partition image resides on at least one of any partition other than the first partition. If no opportunity is taken by a user to select the secondary operating system within a predefined time, the computer loads the primary operating system. When the secondary operating system is selected by a user within the predefined time, the computer automatically executes the partition image restoration program, which restores the partition image to the first partition.

In some preferred embodiments of the present invention computer with bootable restoration, the primary operating system configuration includes registry data that defines standard locations for storing user-created files as folders rooted on at least one of any partition other than the first partition.

In some preferred embodiments of the present invention computer with bootable restoration, at least two mass storage device partitions is at least three mass storage device partitions, including a third partition; the at least one partition image resides on the third partition; the third partition is hidden from and inaccessible to the primary operating system.

In some preferred embodiments of the present invention computer with bootable restoration, the primary operating system configuration includes registry data that defines standard locations for storing user-created files as folders rooted on the second partition.

In some preferred embodiments of the present invention computer with bootable restoration, a plurality of application programs has been installed on the primary operating system.

In some preferred embodiments of the present invention computer with bootable restoration, the at least one partition image is at least two partition images including first and second partition images, the first partition image excluding the plurality of application programs, and the second partition image including the plurality of application programs.

In some preferred embodiments of the present invention computer with bootable restoration, a plurality of application programs has been installed on the primary operating system.

In some preferred embodiments of the present invention computer with bootable restoration, the at least one partition image is at least two partition images including first and second partition images, the first partition image excluding the plurality of application programs, and the second partition image including the plurality of application programs.

The present invention is a computer with bootable restoration; it includes a physical computer member that has: (i) two mass storage devices, being a first mass storage device and a second mass storage device; (j) at least three mass storage device partitions located in at least one of the two mass storage devices, including first, second, and third partitions; (k) a partition image restoration program; (l) at least one partition image; (m) at least one human interface device; (n) a primary operating system that includes a graphical user interface; (o) a secondary operating system; and, (p) a boot loader responsive to the at least one human interface device, the boot loader providing opportunity for selecting between the primary operating system and the secondary operating system. The primary operating system resides on the first partition and the primary operating system is configured so that its standard locations for storing user-created files are folders rooted on at least one of any partition other than the first partition, the at least one partition image is an image of the first partition, the at least one partition image resides on the third partition, and the third partition is hidden from and inaccessible to the primary operating system. If no opportunity is taken by a user to select the secondary operating system within a predefined time, the computer loads the primary operating system. When the secondary operating system is selected by a user within the predefined time, the computer automatically executes the partition image restoration program, which restores the partition image to the first partition.

In some preferred embodiments of the present invention computer with bootable restoration, the primary operating system configuration includes registry data that defines standard locations for storing user-created files as folders rooted on at least one of any partition other than the first partition.

In some preferred embodiments of the present invention computer with bootable restoration, the primary operating system configuration includes registry data that defines standard locations for storing user-created files as folders rooted on the second partition.

In some preferred embodiments of the present invention computer with bootable restoration, a plurality of application programs has been installed on the primary operating system.

In some preferred embodiments of the present invention computer with bootable restoration, the at least one partition image is at least two partition images including first and second partition images, the first partition image excluding the plurality of application programs, and the second partition image including the plurality of application programs.

In some preferred embodiments of the present invention computer with bootable restoration, the boot loader, the secondary operating system, and the partition image restoration program reside on the first mass storage device; the first, second, and third partitions reside on the second mass storage device.

In some preferred embodiments of the present invention computer with bootable restoration, the boot loader, the secondary operating system, and the partition image restoration program reside on the first mass storage device; the first, second, and third partitions reside on the second mass storage device.

In some preferred embodiments of the present invention computer with bootable restoration, the boot loader, the secondary operating system, and the partition image restoration program reside on the first mass storage device; the first, second, and third partitions reside on the second mass storage device.

In some preferred embodiments of the present invention computer with bootable restoration, the third partition resides on the first mass storage device; the boot loader, the secondary operating system, and the partition image restoration program reside on the third partition; the first and second partitions reside on the second mass storage device.

In some preferred embodiments of the present invention computer with bootable restoration, the third partition resides on the first mass storage device; the boot loader, the secondary operating system, and the partition image restoration program reside on the third partition; the first and second partitions reside on the second mass storage device.

In some preferred embodiments of the present invention computer with bootable restoration, the first partition image, the boot loader, the secondary operating system, and the partition image restoration program reside on the first mass storage device; the first, second, and third partitions reside on the second mass storage device.

In some preferred embodiments of the present invention computer with bootable restoration, the at least three mass storage device partitions is at least four mass storage device partitions including a fourth partition; the third and fourth partitions reside on the first mass storage device; the boot loader, the secondary operating system, and the partition image restoration program reside on the fourth partition; the first and second partitions reside on the second mass storage device.

In some preferred embodiments of the present invention computer with bootable restoration, the at least three mass storage device partitions is at least four mass storage device partitions including a fourth partition; the third and fourth partitions reside on the first mass storage device; the boot loader, the secondary operating system, and the partition image restoration program reside on the fourth partition; the first and second partitions reside on the second mass storage device.

In some preferred embodiments of the present invention computer with bootable restoration, the at least three mass storage device partitions is at least four mass storage device partitions including a fourth partition; the third and fourth partitions reside on the first mass storage device; the boot loader, the secondary operating system, and the partition image restoration program reside on the fourth partition; the first and second partitions reside on the second mass storage device.

In some preferred embodiments of the present invention computer with bootable restoration, the at least three mass storage device partitions is at least five mass storage device partitions including fourth and fifth partitions; the fourth and fifth partitions reside on the first mass storage device; the boot loader, the secondary operating system, and the partition image restoration program reside on the fourth partition; the first partition image resides on the fifth partition; the first, second, and third partitions reside on the second mass storage device.

In some preferred embodiments of the present invention computer with bootable restoration, the at least three mass storage device partitions is at least five mass storage device partitions including fourth and fifth partitions; the fourth and fifth partitions reside on the first mass storage device; the boot loader, the secondary operating system, and the partition image restoration program reside on the fourth partition; the first partition image resides on the fifth partition; the first, second, and third partitions reside on the second mass storage device.

In some preferred embodiments of the present invention computer with bootable restoration, the at least three mass storage device partitions is at least five mass storage device partitions including fourth and fifth partitions; the fourth and fifth partitions reside on the first mass storage device; the boot loader, the secondary operating system, and the partition image restoration program reside on the fourth partition; the first partition image resides on the fifth partition; the first, second, and third partitions reside on the second mass storage device.

The present invention is a computer with bootable restoration; it includes a physical computer member that has: (q) three mass storage devices, being a first mass storage device, a second mass storage device and a third mass storage device; (r) at least three mass storage device partitions located in at least one of the three mass storage devices, including first, second, and third partitions; (s) a partition image restoration program; (t) at least one partition image; (u) at least one human interface device; (v) a primary operating system that includes a graphical user interface; (w) a secondary operating system; and, (x) a boot loader responsive to the at least one human interface device, the boot loader providing opportunity for selecting between the primary operating system and the secondary operating system. The primary operating system resides on the first partition and the primary operating system is configured so that its standard locations for storing user-created files are folders rooted on at least one of any partition other than the first partition, the at least one partition image is an image of the first partition, the at least one partition image resides on the third partition, and the third partition is hidden from and inaccessible to the primary operating system. If no opportunity is taken by a user to select the secondary operating system within a predefined time, the computer loads the primary operating system. When the secondary operating system is selected by a user within the predefined time, the computer automatically executes the partition image restoration program, which restores the partition image to the first partition.

In some preferred embodiments of the present invention computer with bootable restoration, the primary operating system configuration includes registry data that defines standard locations for storing user-created files as folders rooted on at least one of any partition other than the first partition.

In some preferred embodiments of the present invention computer with bootable restoration, the primary operating system configuration includes registry data that defines standard locations for storing user-created files as folders rooted on the second partition.

In some preferred embodiments of the present invention computer with bootable restoration, a plurality of application programs has been installed on the primary operating system.

In some preferred embodiments of the present invention computer with bootable restoration, the at least one partition image is at least two partition images including first and second partition images, the first partition image excluding the plurality of application programs, and the second partition image including the plurality of application programs.

In some preferred embodiments of the present invention computer with bootable restoration, the third partition resides on the first mass storage device; the boot loader, the secondary operating system, and the partition image restoration program reside on the third partition; the first partition resides on the second mass storage device; the second partition resides on the third mass storage device.

In some preferred embodiments of the present invention computer with bootable restoration, the third partition resides on the first mass storage device; the boot loader, the secondary operating system, and the partition image restoration program reside on the third partition; the first partition resides on the second mass storage device; the second partition resides on the third mass storage device.

In some preferred embodiments of the present invention computer with bootable restoration, the third partition resides on the first mass storage device; the boot loader, the secondary operating system, and the partition image restoration program reside on the third partition; the first partition resides on the second mass storage device; the second partition resides on the third mass storage device.

In some preferred embodiments of the present invention computer with bootable restoration, the at least three mass storage device partitions is at least four mass storage device partitions including a fourth partition; the third and fourth partitions reside on the first mass storage device; the boot loader, the secondary operating system, and the partition image restoration program reside on the fourth partition; the first partition resides on the second mass storage device; the second partition resides on the third mass storage device.

In some preferred embodiments of the present invention computer with bootable restoration, the at least three mass storage device partitions is at least four mass storage device partitions including a fourth partition; the third and fourth partitions reside on the first mass storage device; the boot loader, the secondary operating system, and the partition image restoration program reside on the fourth partition; the first partition resides on the second mass storage device; the second partition resides on the third mass storage device.

In some preferred embodiments of the present invention computer with bootable restoration, the at least three mass storage device partitions is at least four mass storage device partitions including a fourth partition; the third and fourth partitions reside on the first mass storage device; the boot loader, the secondary operating system, and the partition image restoration program reside on the fourth partition; the first partition resides on the second mass storage device; the second partition resides on the third mass storage device.

In some preferred embodiments of the present invention computer with bootable restoration, the at least three mass storage device partitions is at least four mass storage device partitions including a fourth partition; the fourth partition resides on the first mass storage device; the boot loader, the secondary operating system, the partition image restoration program, and the first partition image reside on the fourth partition; the first and third partitions reside on the second mass storage device; the second partition resides on the third mass storage device.

In some preferred embodiments of the present invention computer with bootable restoration, the at least three mass storage device partitions is at least four mass storage device partitions including a fourth partition; the fourth partition resides on the first mass storage device; the boot loader, the secondary operating system, the partition image restoration program, and the first partition image reside on the fourth partition; the first and third partitions reside on the second mass storage device; the second partition resides on the third mass storage device.

In some preferred embodiments of the present invention computer with bootable restoration, the at least three mass storage device partitions is at least four mass storage device partitions including a fourth partition; the fourth partition resides on the first mass storage device; the boot loader, the secondary operating system, the partition image restoration program, and the first partition image reside on the fourth partition; the first and third partitions reside on the second mass storage device; the second partition resides on the third mass storage device.

In some preferred embodiments of the present invention computer with bootable restoration, the at least three mass storage device partitions is at least five mass storage device partitions including fourth and fifth partitions; the fourth and fifth partitions reside on the first mass storage device; the boot loader, the secondary operating system, and the partition image restoration program reside on the fourth partition; the first partition image resides on the fifth partition; the first and third partitions reside on the second mass storage device; the second partition resides on the third mass storage device.

In some preferred embodiments of the present invention computer with bootable restoration, the at least three mass storage device partitions is at least five mass storage device partitions including fourth and fifth partitions; the fourth and fifth partitions reside on the first mass storage device; the boot loader, the secondary operating system, and the partition image restoration program reside on the fourth partition; the first partition image resides on the fifth partition; the first and third partitions reside on the second mass storage device; the second partition resides on the third mass storage device.

In some preferred embodiments of the present invention computer with bootable restoration, the at least three mass storage device partitions is at least five mass storage device partitions including fourth and fifth partitions; the fourth and fifth partitions reside on the first mass storage device; the boot loader, the secondary operating system, and the partition image restoration program reside on the fourth partition; the first partition image resides on the fifth partition; the first and third partitions reside on the second mass storage device; the second partition resides on the third mass storage device.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE EMBODIMENTS

Figure 1:
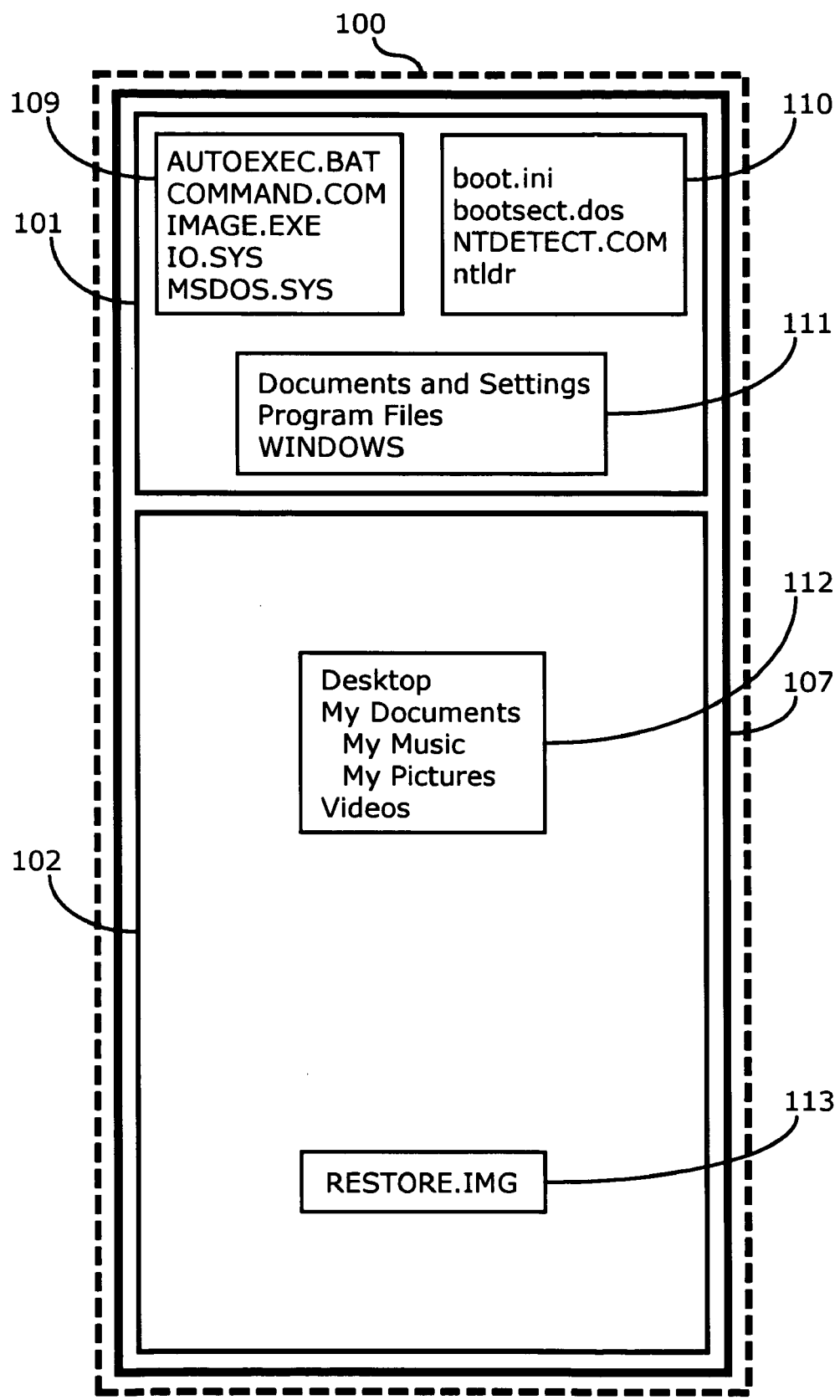
FIG. 1 is a block diagram of a mass storage device having two partitions and one partition image.

The present invention relates to a computer, especially a personal computer, in which all of the benefits of partition image restoration are realized without compromise. A brief description of the concept follows:

Most desktop operating systems, for example, Windows XP (Trademark of Microsoft Corporation, One Microsoft Way, Redmond, Wash. 98052, USA) provide directories or folders that it designates as standard locations for storing user-created files. Sometimes these are called "shell folders". In a typical personal computer, a desktop operating system, application programs, and shell folders coexist on a mass storage device partition. In the present invention, a primary operating system is configured so that certain shell folders (the ones that are standard locations for storing user-created files) are rooted on a partition that is not cohabited by the primary operating system, making it possible to wholly replace the primary operating system and application programs without threatening the user files. With the primary operating system so configured, the user need not have special knowledge of where to safely store files, rather, all of the standard storage locations that the user might invoke in an application program are rooted on a distal partition.

The benefits of the present invention are more fully appreciated by considering an anecdotal example: A user purchases a computer of the present invention and begins creating documents. Perhaps the user transfers pictures from a digital camera to the present invention computer. One day, the user accidentally mutes the sound and cannot remember how to unmute. Instead of troubleshooting or seeking technical support, the user reboots the computer, whereupon the user is briefly provided an opportunity to load a partition image restoration program. The user may exercise this opportunity by selecting the partition image restoration program via keyboard, mouse, or other responsive human interface device. When the partition image restoration program completes, and the computer is rebooted, the primary operating system appears in its manufacturer-programmed state, as do any application programs that were included with the present invention computer. The user's documents and pictures remain intact because the primary operating system had been configured such that the standard locations for storing user-created files are rooted on a distal partition of the mass storage device, and/or on separate secondary and/or tertiary mass storage devices, and the partition image restoration program did not write to that partition. If the user does not take the opportunity to use the partition image restoration program, then when a predefined opportunity time passes, the computer defaults to the primary operating system.

In the embodiments described below, Windows XP is utilized as the primary operating system, files obtained from a Windows 98SE boot floppy image are used as the secondary operating system, and the Windows XP installer provides the boot loader. Nevertheless, any operating system may be used as the primary operating system of the present invention, such as Linux, and any widely-available boot loader may be employed such as GRUB or LILO. Further, the secondary operating system of the present invention need not utilize files obtained from a Windows 98SE boot floppy image; many widely-available DOS-equivalent operating systems are viable substitutes.

Referring now to FIG. 1, mass storage device 107 is contained within otherwise conventional computer 100. Computer 100 has standard computer components, connections, and functionalities (not shown), and any available computer could be used. Mass storage device 107 has partitions 101 and 102 (designated by Windows as drive letters "C:" and "D:", respectively). Partition 101 utilizes the FAT32 file system and has partition image restoration program and secondary operating system files 109 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1a and 2, respectively, while "COMMAND.COM" and "IO.SYS" are obtained from a Windows 98SE boot floppy image. "IMAGE.EXE" is a partition image restoration program of TeraByte, Incorporated (doing business as TeraByte Unlimited, currently located in Las Vegas, Nev., USA).

Partition 101 further includes boot loader files 110 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 110 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 below.

Once the Windows XP installer has progressed past the point at which it created "bootsect.dos", "MSDOS.SYS" becomes unneeded and may be safely deleted. Indeed, the reason that the Windows 98SE content was placed on partition 101 prior to installing Windows XP was so that the Windows XP installer would detect it and provide a proper boot loader configuration.

Partition 101 further has folders 111 as follows: "Documents and Settings", "Program Files", and "WINDOWS". "Documents and Settings", "Program Files", and "WINDOWS" are folders of the primary operating system. Contrary to its name, a "Documents and Settings" folder of the present invention houses user settings, but not user documents. "Documents and Settings" is merely a name given by the Windows XP installer. This is an important semantic when studying FIG. 1, as well as subsequent drawing figures, because an object of the present invention is that the user settings share a common partition with the primary operating system, where they will be overwritten by the partition image restoration program. By contrast, some prior art restorable computers place user settings outside of the primary operating system partition; a drawback, considering the frequency at which users corrupt those settings.

Partition 102 may utilize either NTFS (NT File System) or FAT32 (File Allocation Table 32-bit) and has folders 112 as follows: "Desktop", "My Documents", "My Music", "My Pictures", and "Videos". The primary operating system is configured to treat folders 112 as standard locations for storing user-created files by way of registry code shown in Table 4a below.

Partition 102 further has partition image 113, named "RESTORE.IMG", which is an image of partition 101.

TABLE 1a

Figure 4:
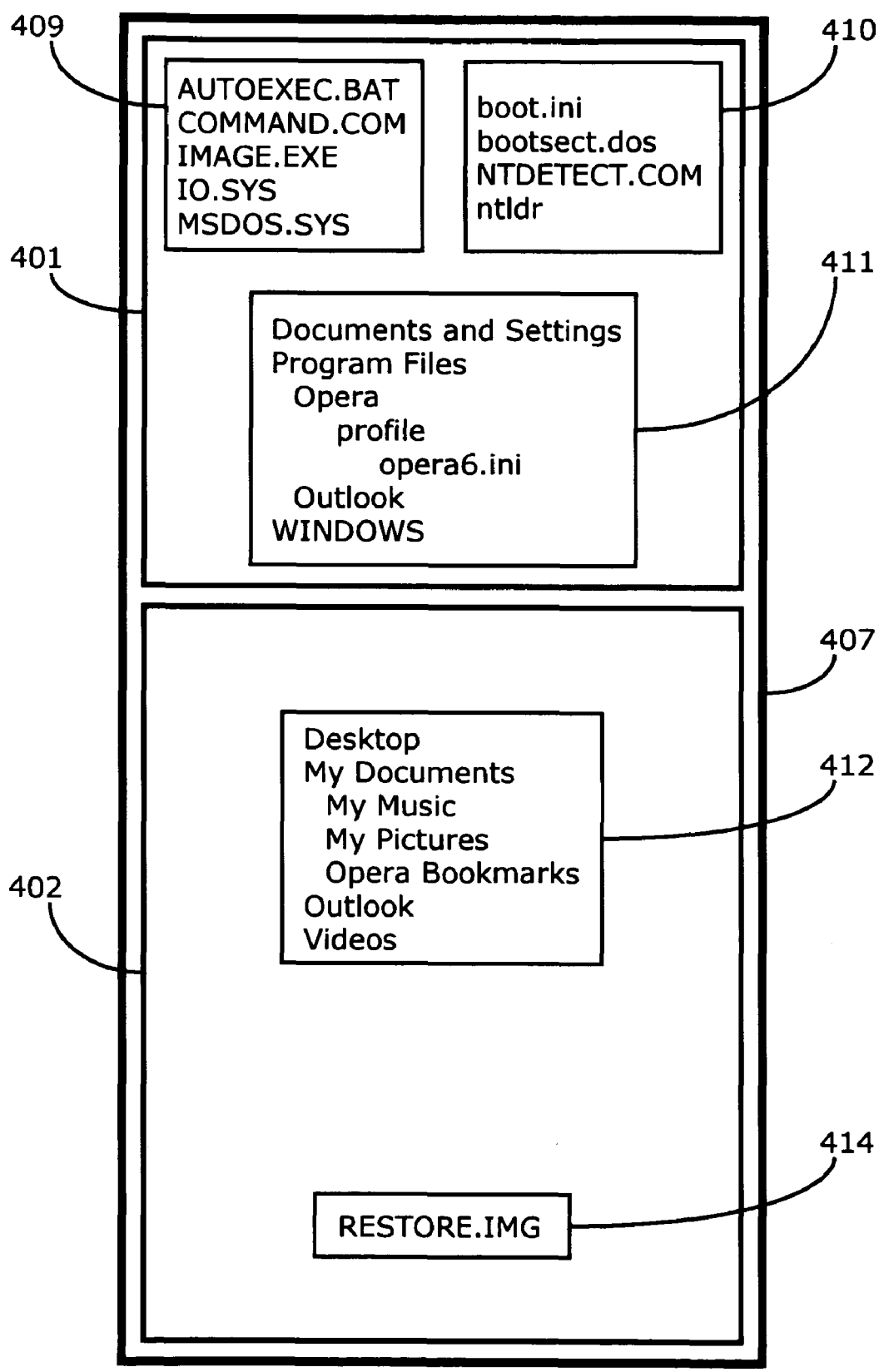
FIG. 4 is a block diagram of a mass storage device having two partitions, a plurality of application programs, and one partition image.

ASCII Code contained within file AUTOEXEC.BAT of FIGS. 1 and 4:

IMAGE /r01atx 02:\RESTORE.IMG

TABLE 1b

Figure 5:
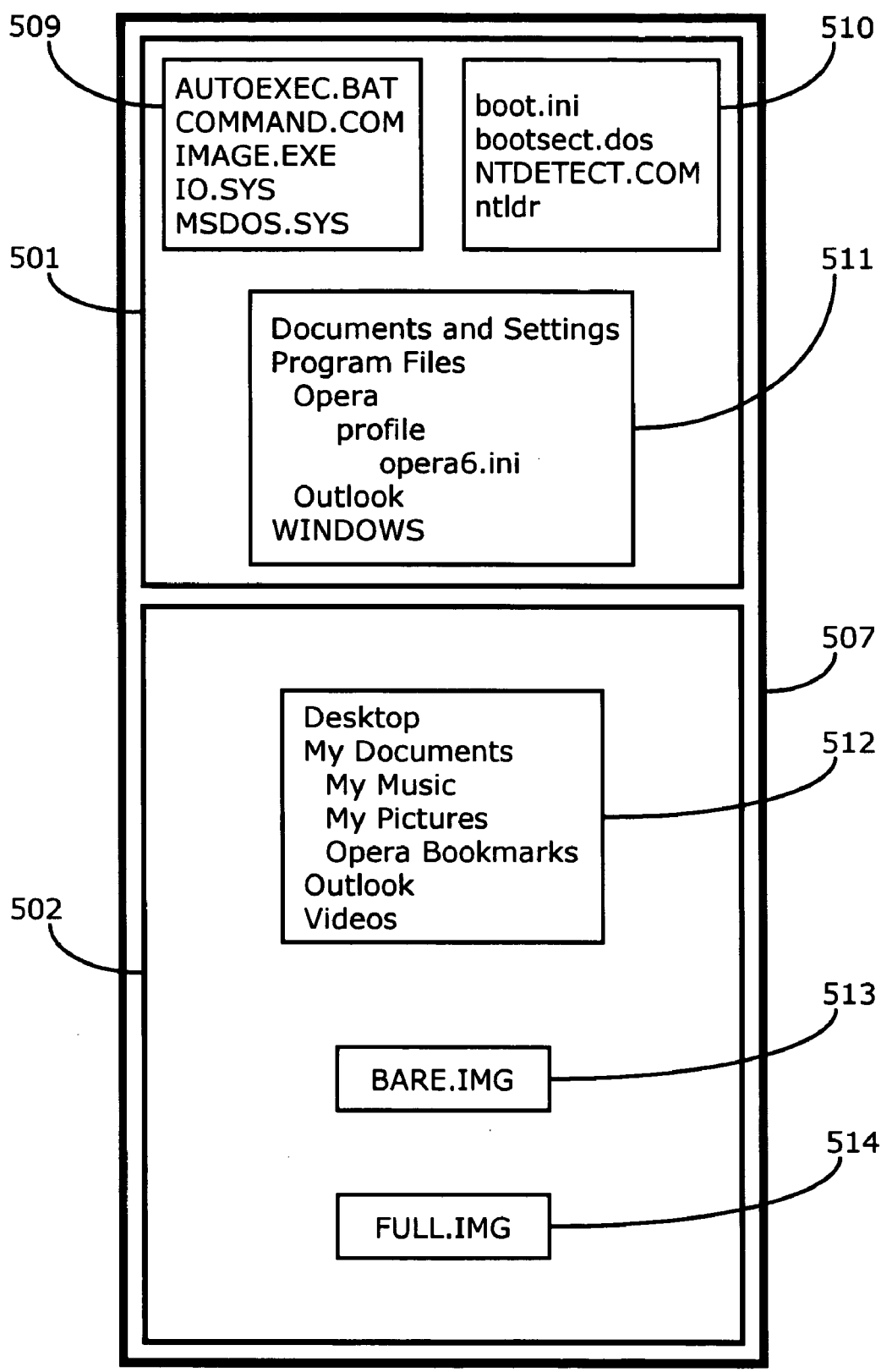
FIG. 5 is a block diagram of a mass storage device having two partitions, a plurality of application programs, and two partition images.

ASCII Code contained within file AUTOEXEC.BAT of FIG. 5:

IMAGE /r01atx 02:\BARE.IMG

TABLE 1c

Modified ASCII Code of file AUTOEXEC.BAT of FIG. 5:

IMAGE /r01atx 02:\FULL.IMG

TABLE 1d

Figure 6:
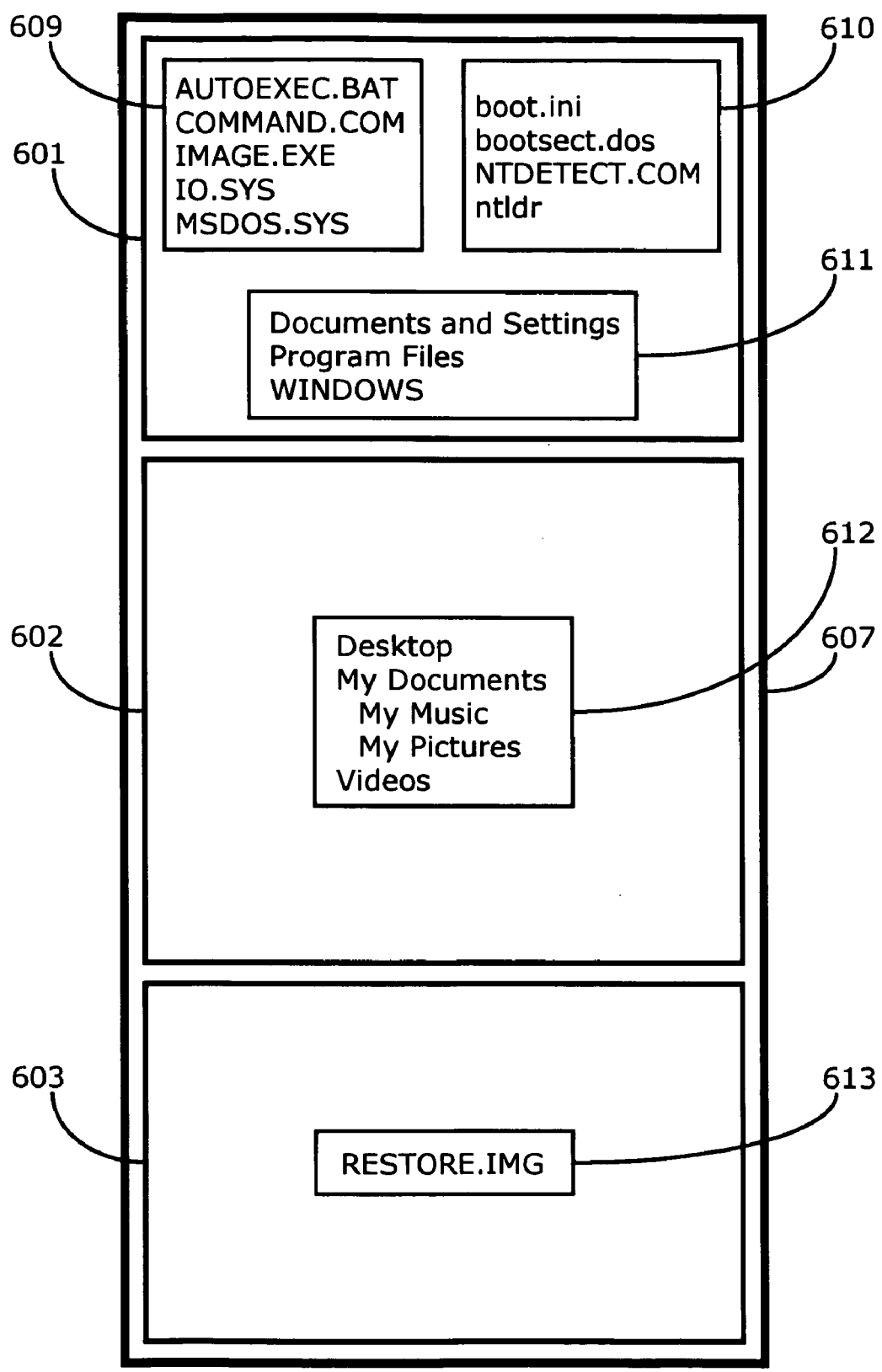
FIG. 6 is a block diagram of a mass storage device having three partitions and one partition image.
Figure 7:
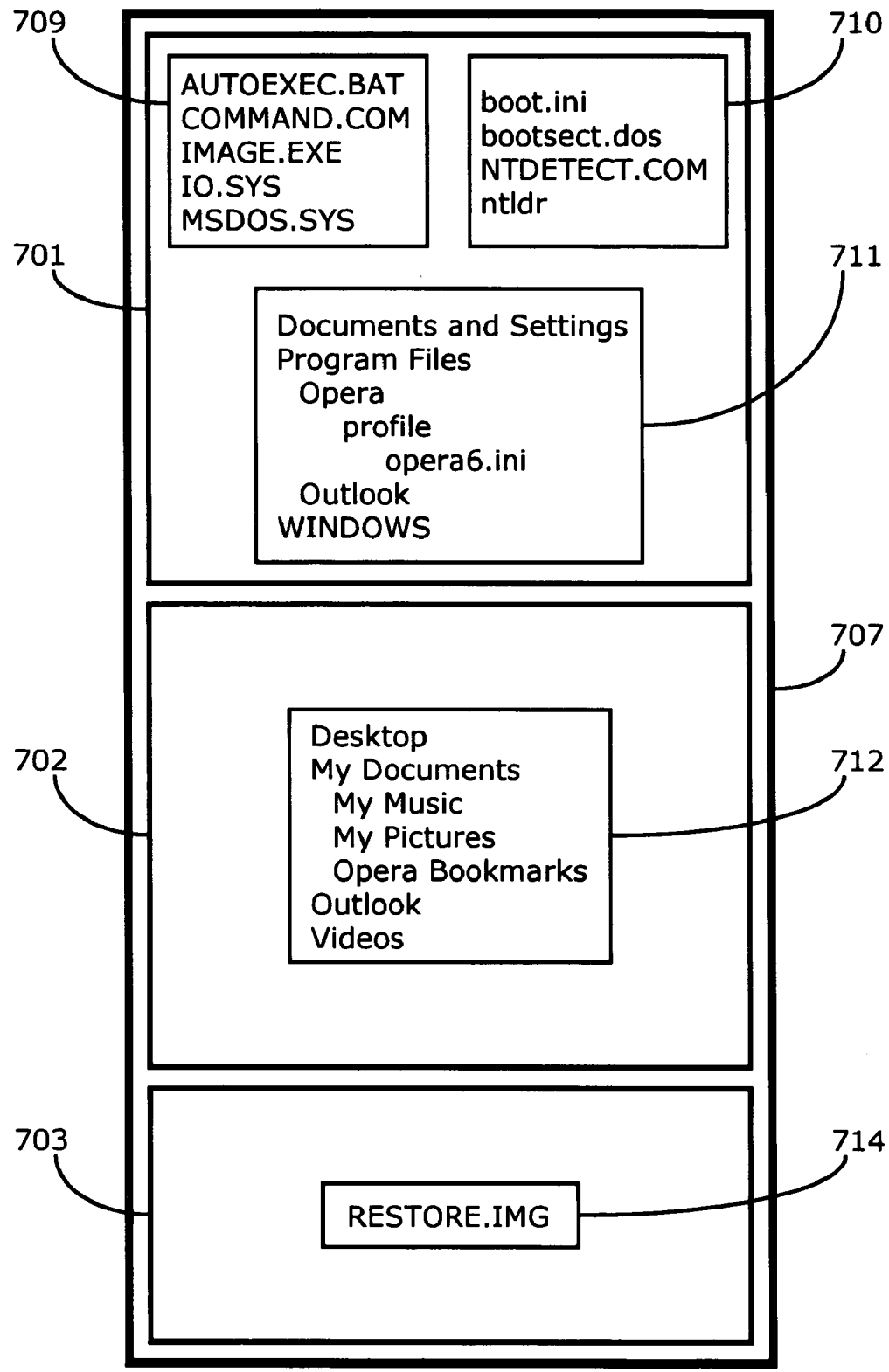
FIG. 7 is a block diagram of a mass storage device having three partitions, a plurality of application programs, and one partition image.

ASCII Code contained within file AUTOEXEC.BAT of FIGS. 6 and 7:

IMAGE /r01atx 03:\RESTORE.IMG

TABLE 1e

Figure 8:
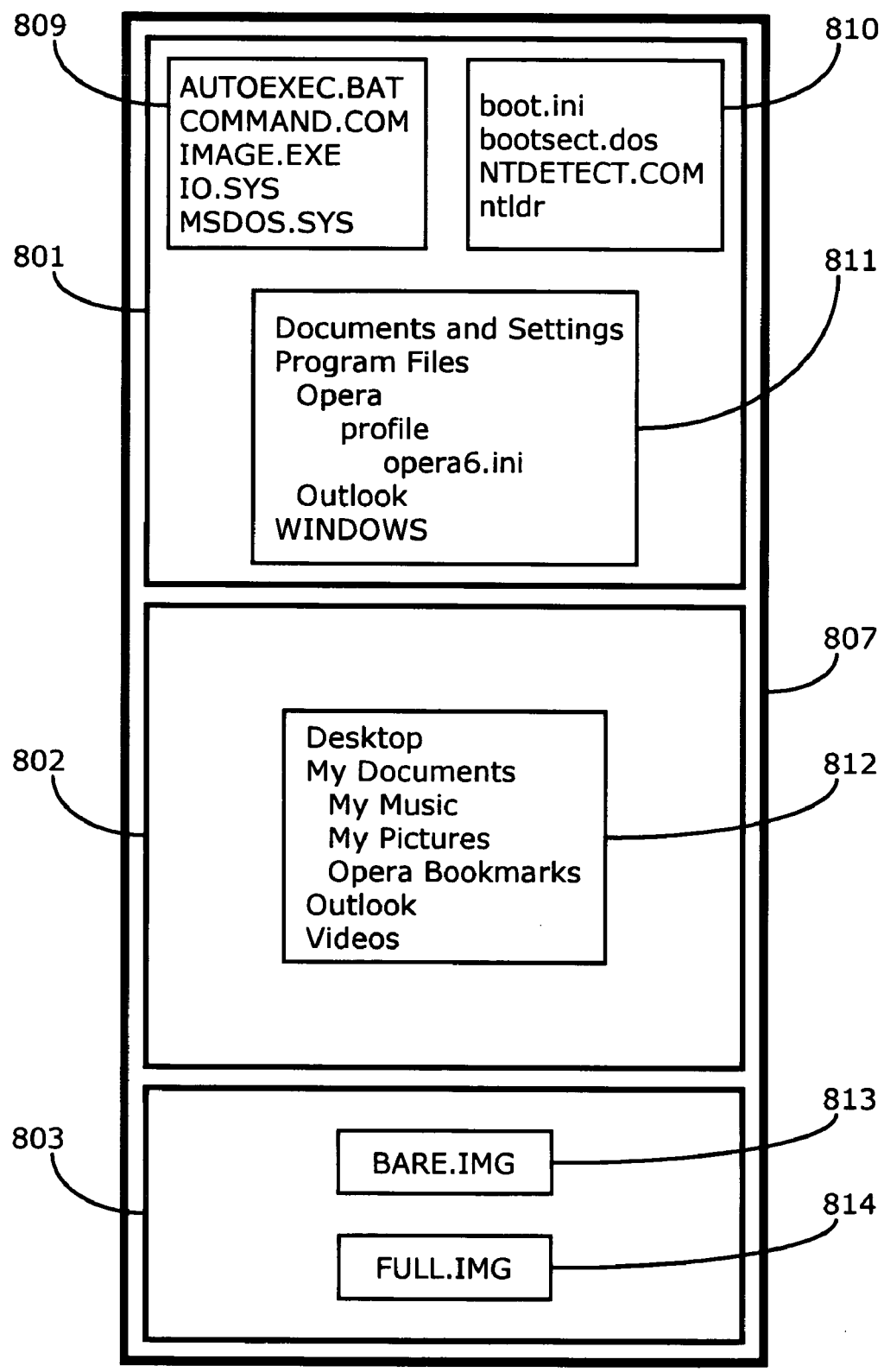
FIG. 8 is a block diagram of a mass storage device having three partitions, a plurality of application programs, and two partition images.

ASCII Code contained within file AUTOEXEC.BAT of FIG. 8:

IMAGE /r01atx 03:\BARE.IMG

TABLE 1f

Modified ASCII Code of file AUTOEXEC.BAT of FIG. 8:

IMAGE /r01atx 03:\FULL.IMG

TABLE 1g

Figure 9:
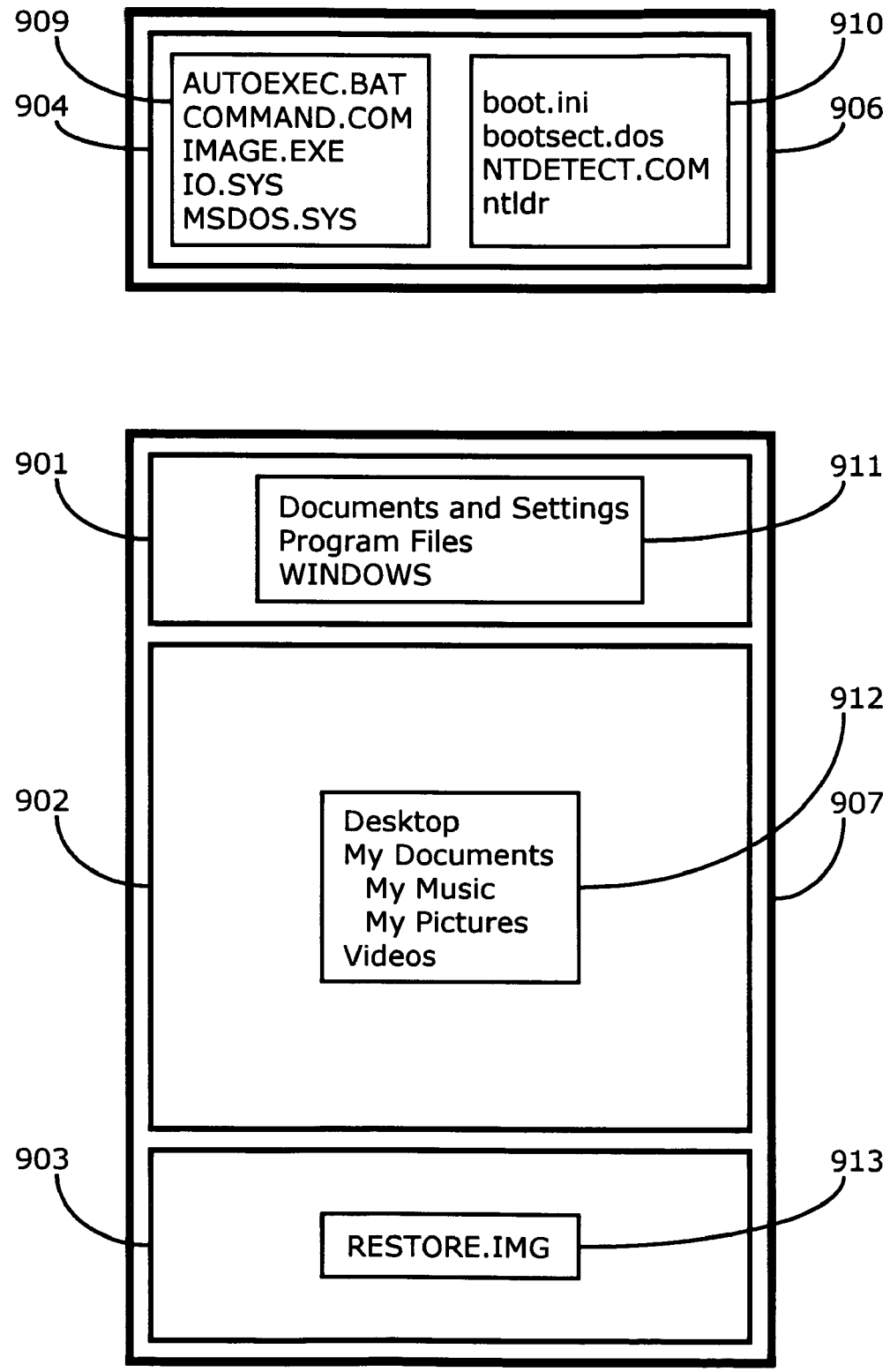
FIG. 9 is a block diagram of two mass storage devices having four partitions and one partition image.
Figure 10:
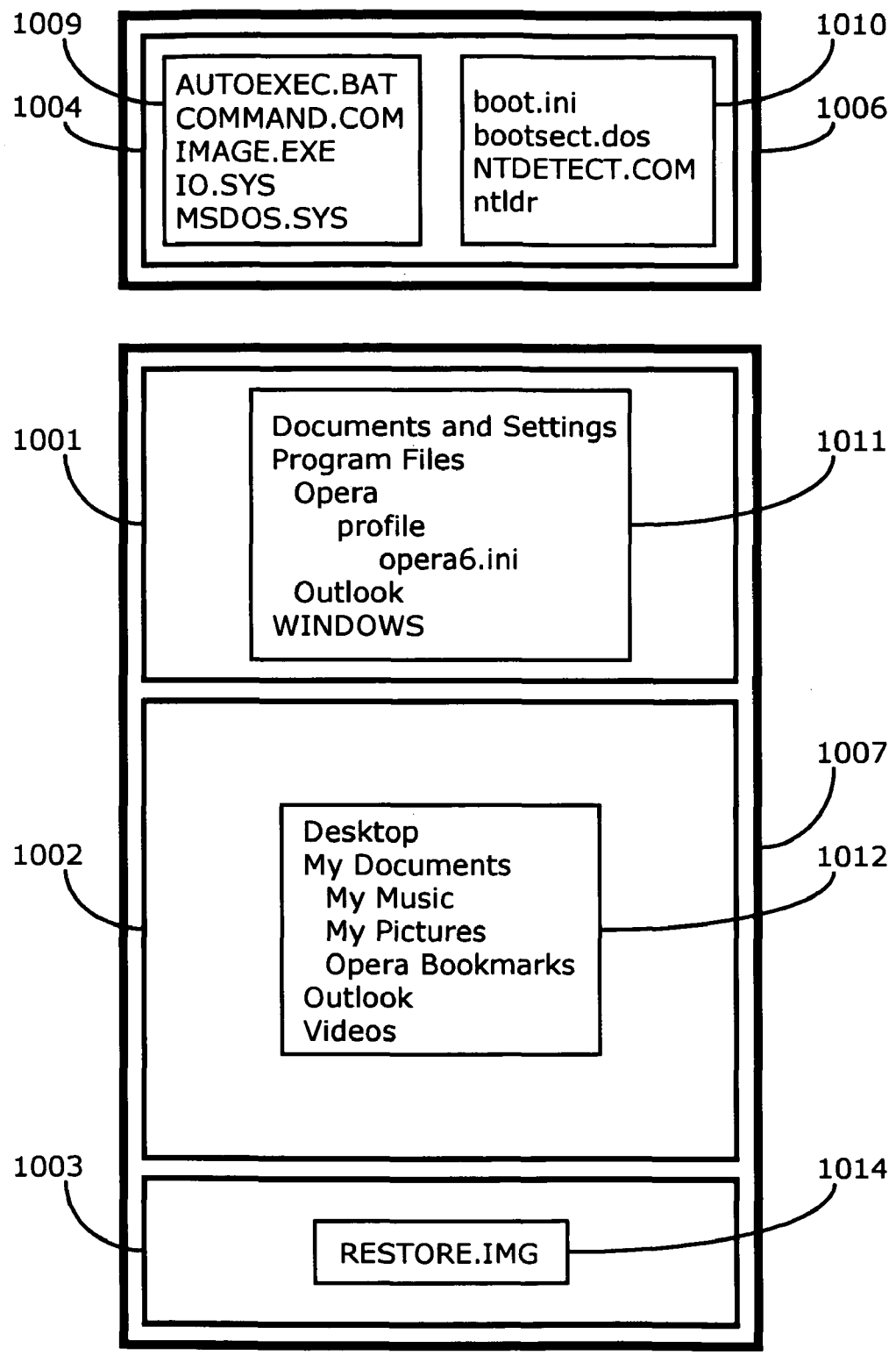
FIG. 10 is a block diagram of two mass storage devices having four partitions, a plurality of application programs, and one partition image.

ASCII Code contained within file AUTOEXEC.BAT of FIGS. 9 and 10:

IMAGE /r11atx 13:\RESTORE.IMG

TABLE 1h

Figure 11:
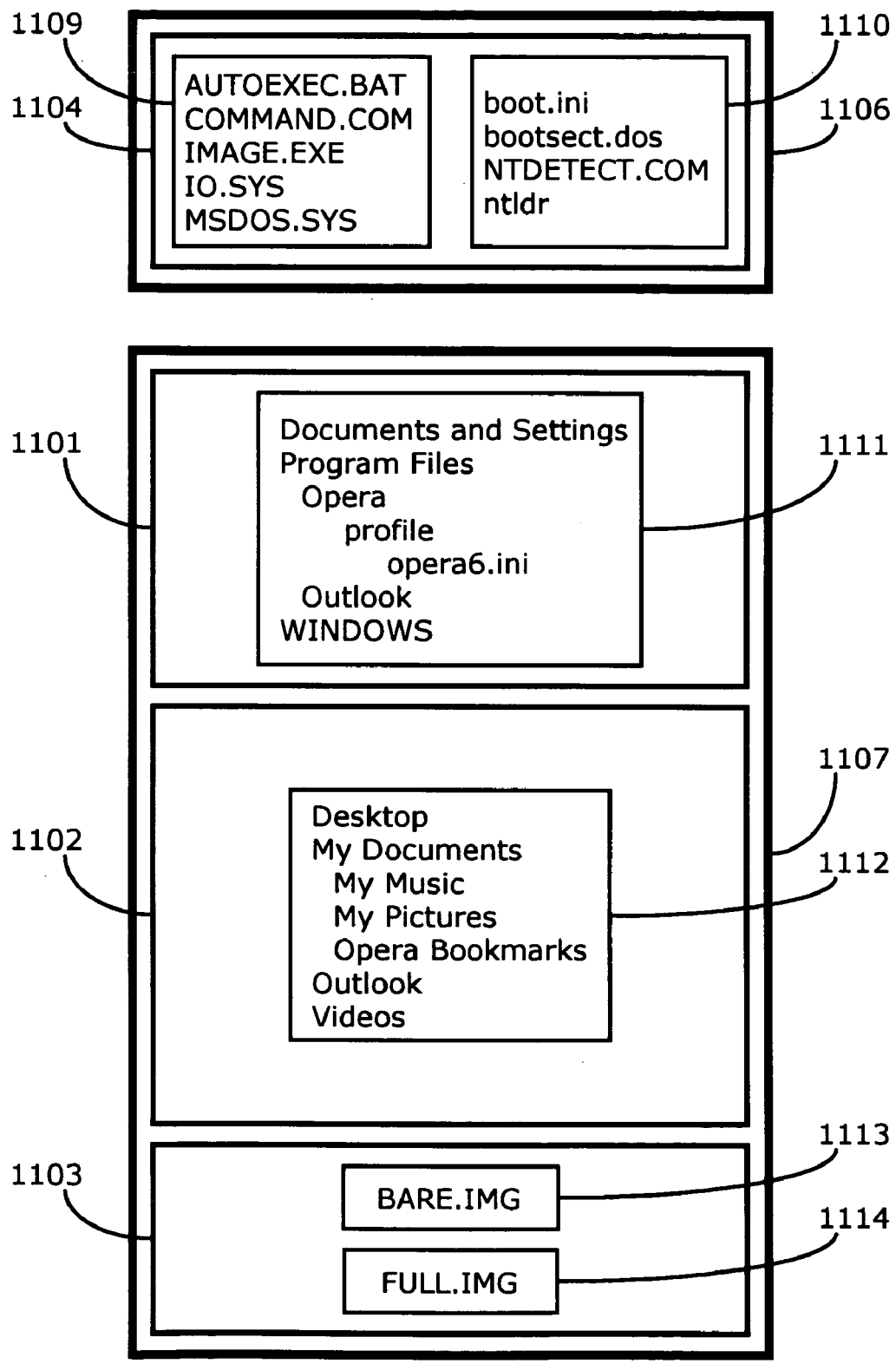
FIG. 11 is a block diagram of two mass storage devices having four partitions, a plurality of application programs, and two partition images.

ASCII Code contained within file AUTOEXEC.BAT of FIG. 11:

IMAGE /r11atx 13:\BARE.IMG

TABLE 1i

Figure 15:
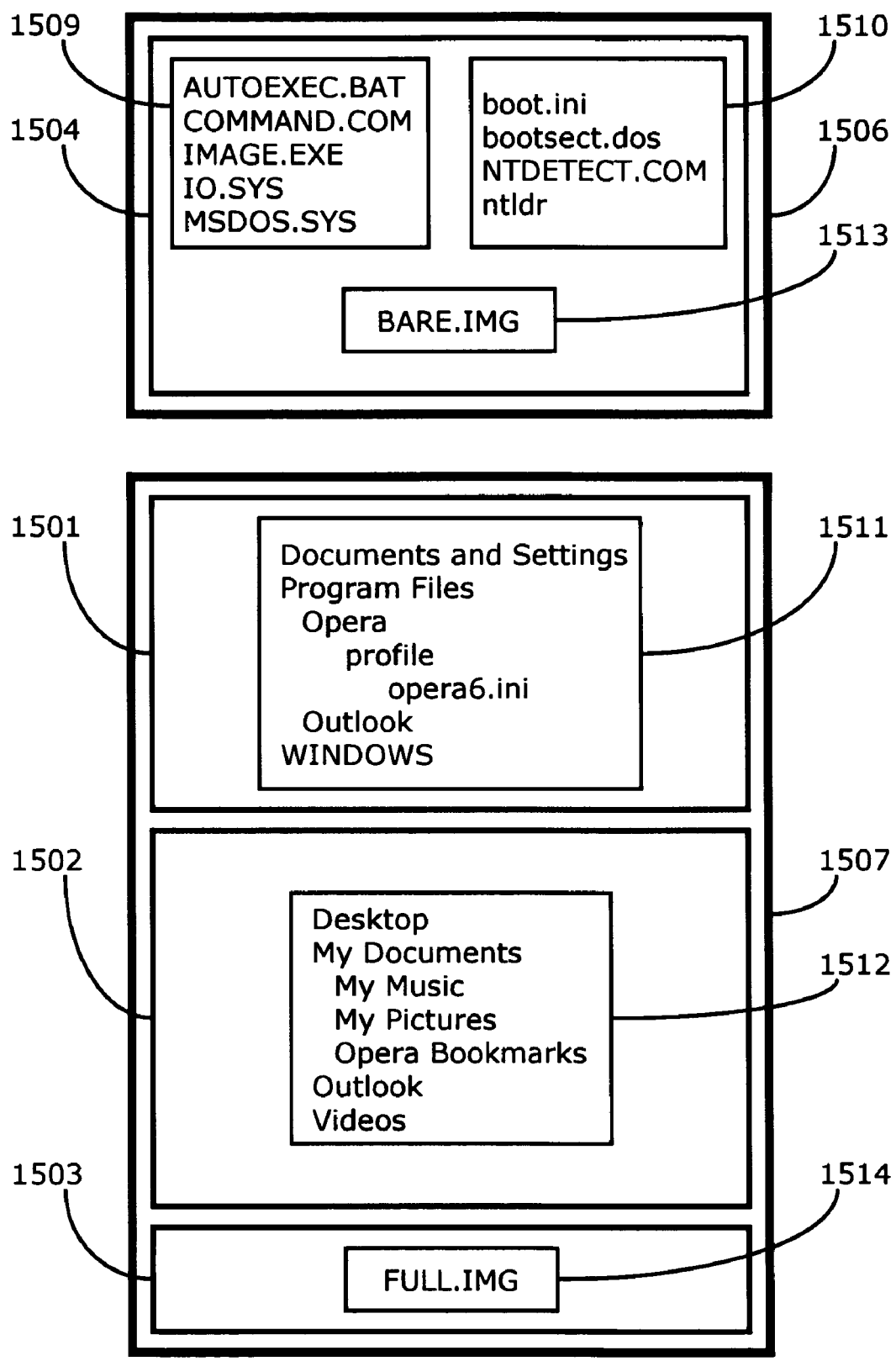
FIG. 15 is a block diagram of two mass storage devices having four partitions, a plurality of application programs, and two partition images occupying different partitions.
Figure 19:
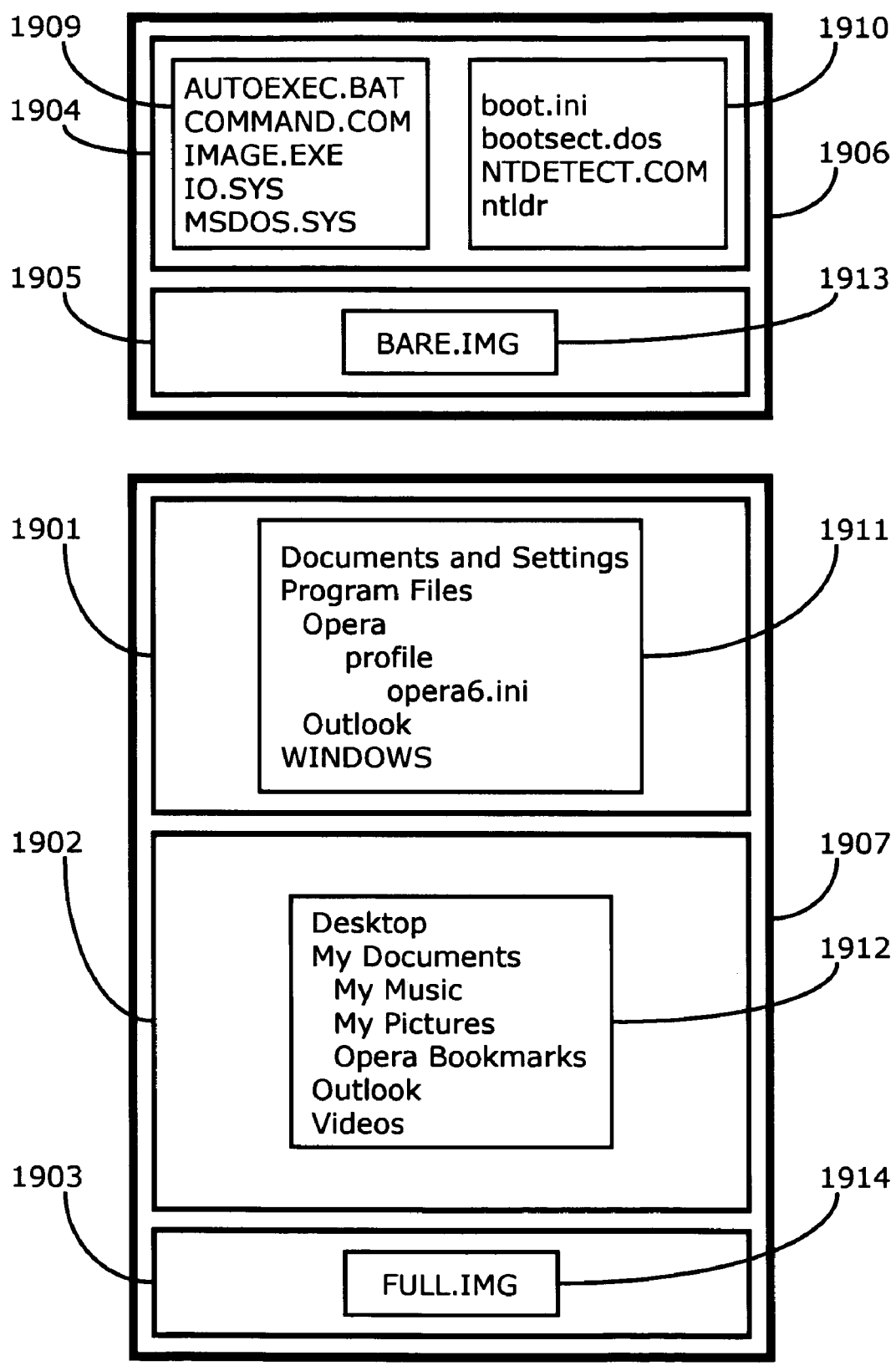
FIG. 19 is a block diagram of two mass storage devices having five partitions, a plurality of application programs, and two partition images occupying different partitions.

Modified ASCII Code of file AUTOEXEC.BAT of FIGS. 11, 15, and 19:

IMAGE /r11atx 13:\FULL.IMG

TABLE 1j

ASCII Code contained within file AUTOEXEC.BAT of FIGS. 12, 13, 23, and 24:

IMAGE /r11atx 01:\RESTORE.IMG

TABLE 1k

Modified ASCII Code of file AUTOEXEC.BAT of FIGS. 14, 15, 25, and 26:

IMAGE /r11atx 01:\BARE.IMG

TABLE 1m

Figure 14:
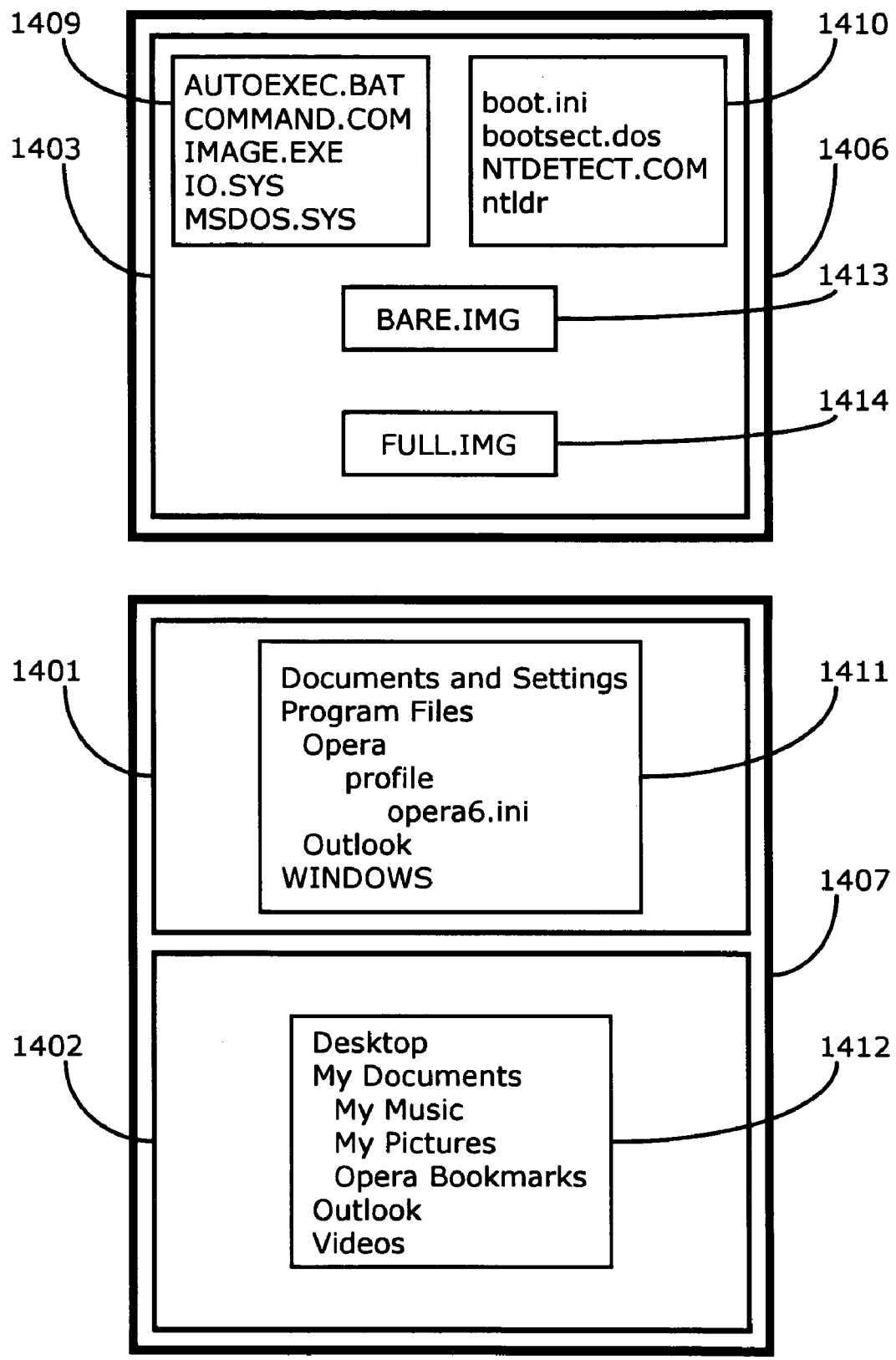
FIG. 14 is a block diagram of two mass storage devices having three partitions, a plurality of application programs, and two partition images.
Figure 25:
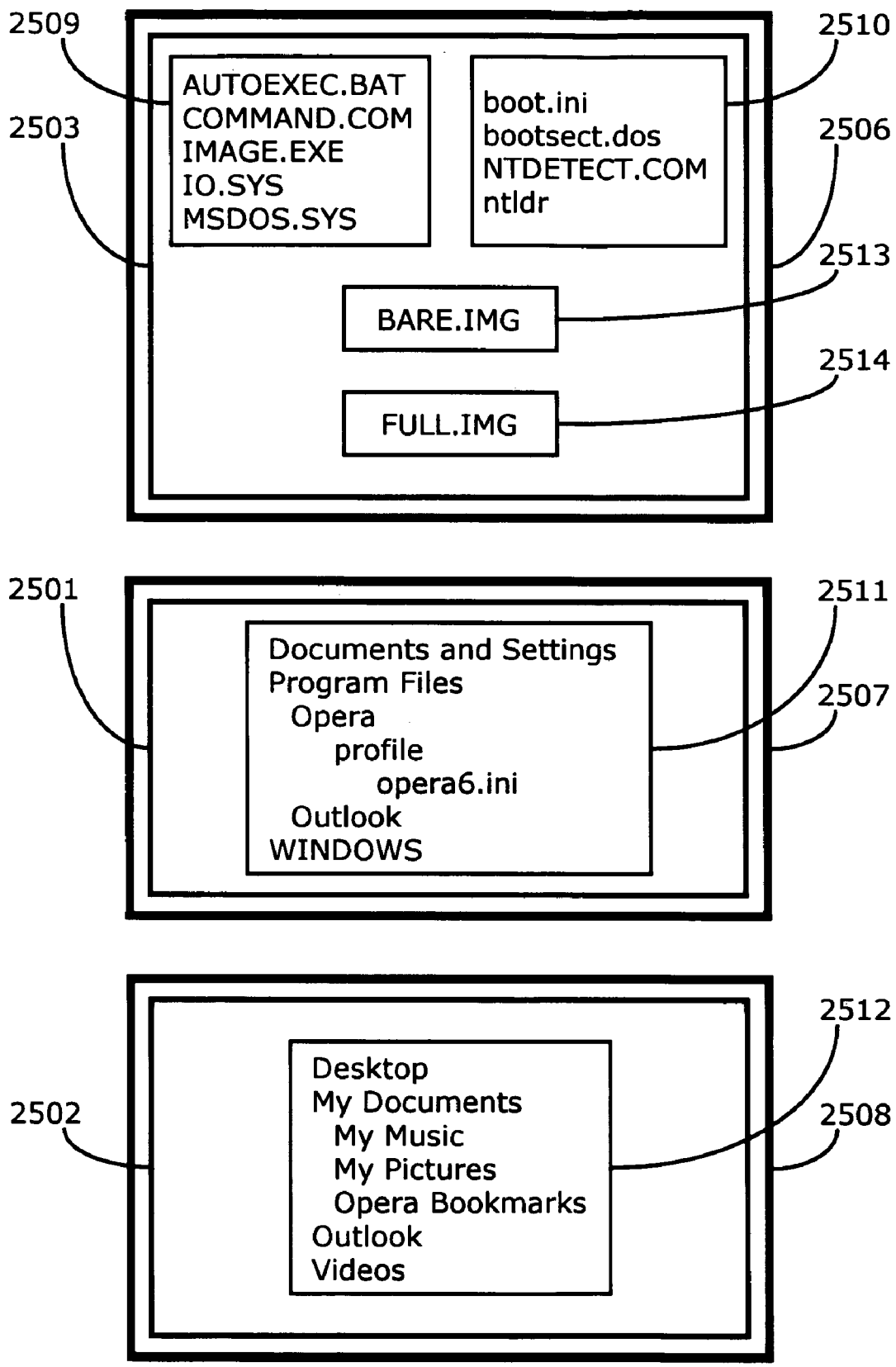
FIG. 25 is a block diagram of three mass storage devices having three partitions, a plurality of application programs, and two partition images.

ASCII Code contained within file AUTOEXEC.BAT of FIGS. 14 and 25:

IMAGE /r11atx 01:\FULL.IMG

TABLE 1n

ASCII Code contained within file AUTOEXEC.BAT of FIGS. 16, 17, 27, and 28:

IMAGE /r11atx 02:\RESTORE.IMG

TABLE 1p

Modified ASCII Code of file AUTOEXEC.BAT of FIGS. 18, 19, 29, and 30:

IMAGE /r11atx 02:\BARE.IMG

TABLE 1q

Figure 18:
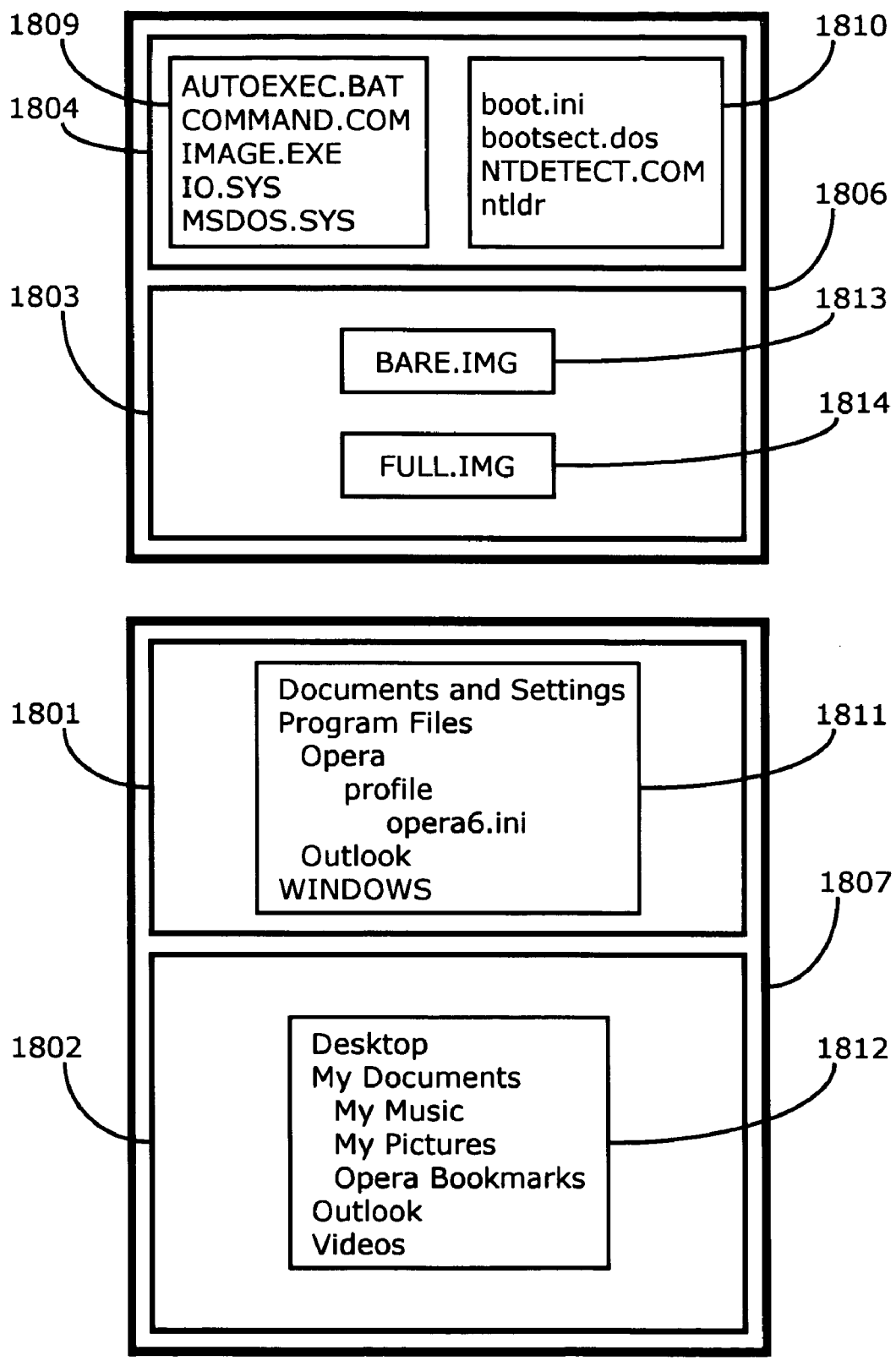
FIG. 18 is a block diagram of two mass storage devices having four partitions, two of which are located in each mass storage device, a plurality of application programs, and two partition images.
Figure 29:
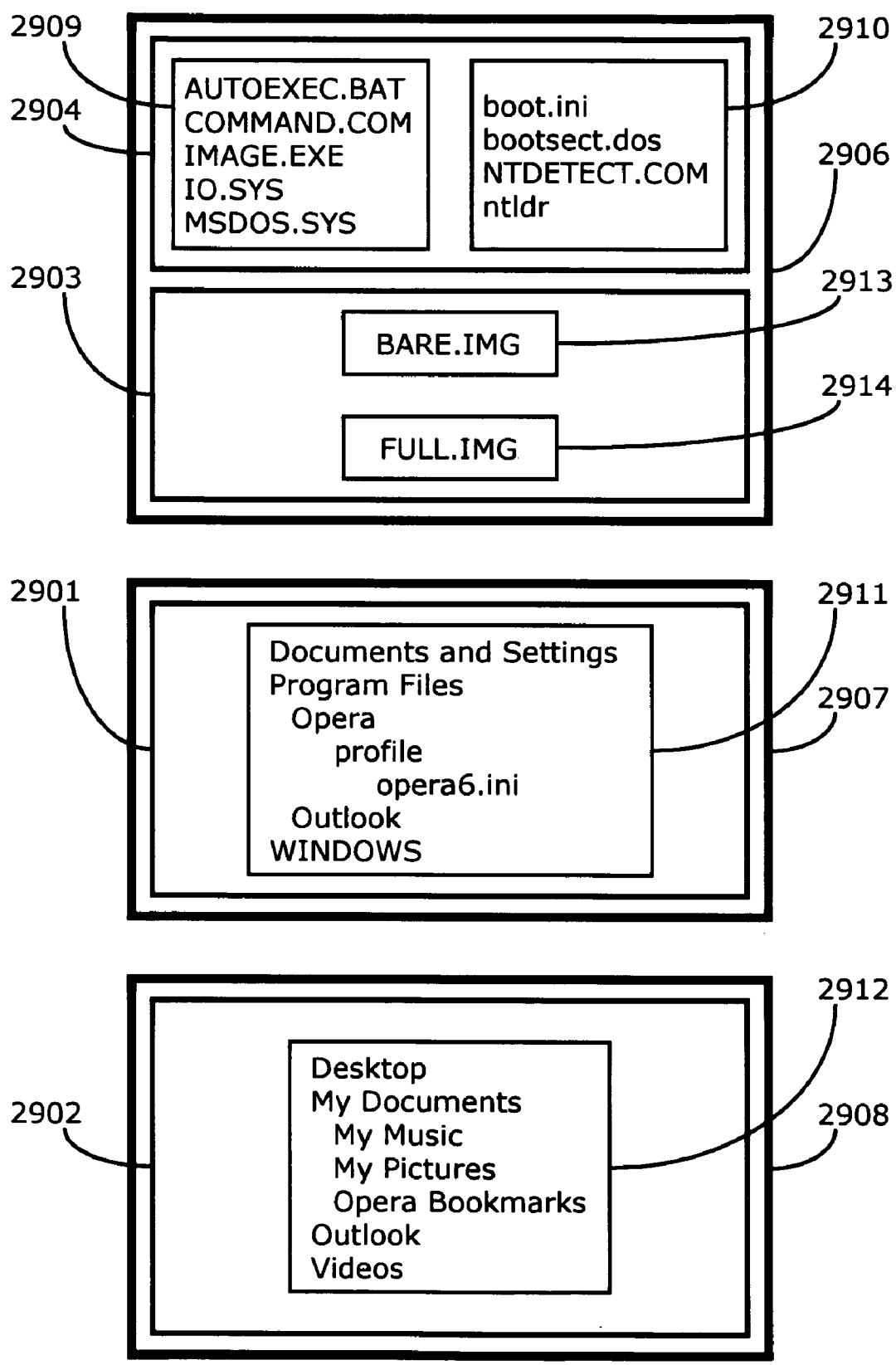
FIG. 29 is a block diagram of three mass storage devices having four partitions, two of which are located on the first mass storage device, a plurality of application programs, and two partition images; and, FIG. 30 is a block diagram of three mass storage devices having five partitions, a plurality of application programs, and two partition images occupying different partitions.

Modified ASCII Code of file AUTOEXEC.BAT of FIG. 18 and 29:

IMAGE /r11atx 02:\FULL.IMG

TABLE 1r

Figure 20:
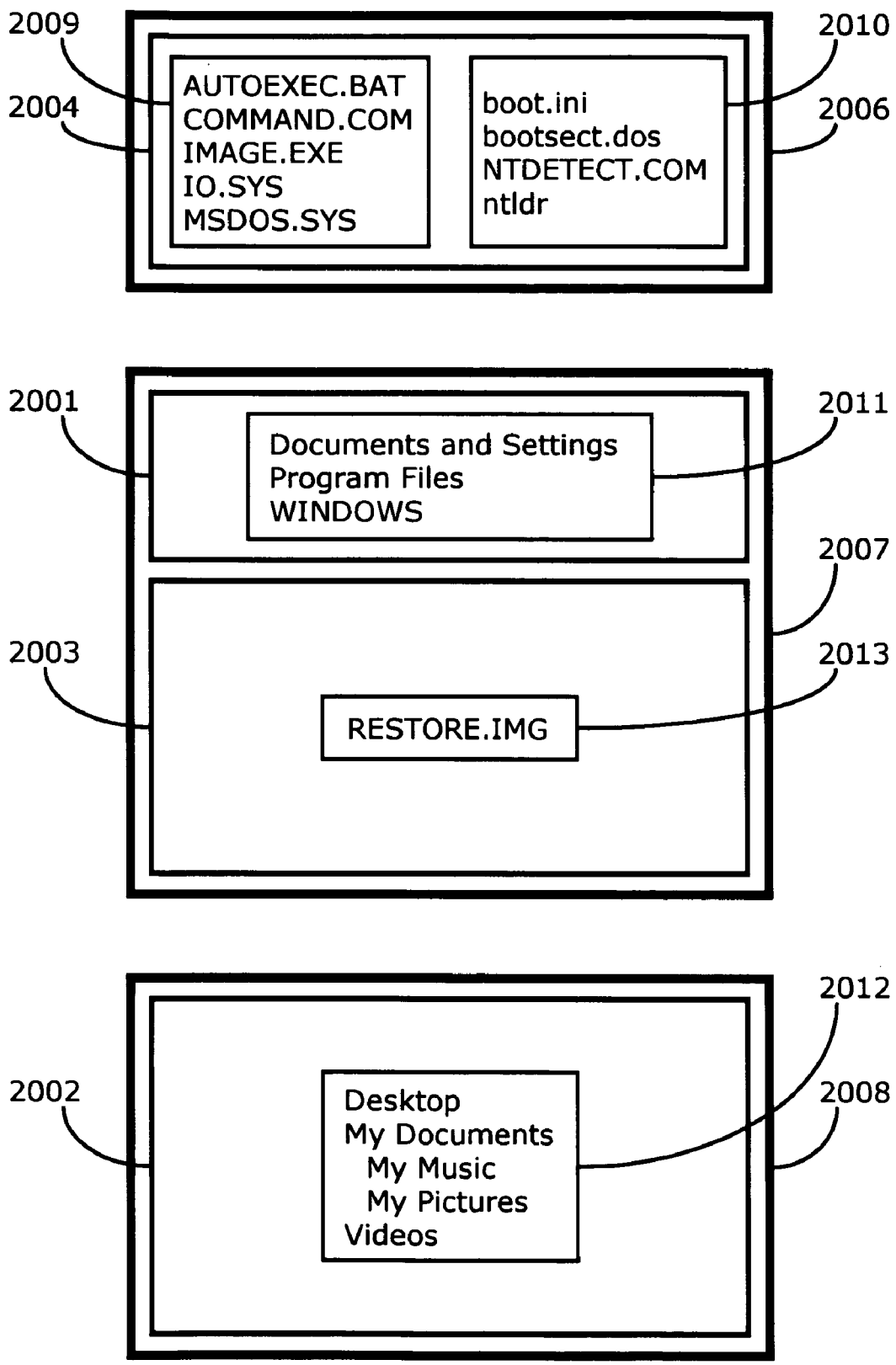
FIG. 20 is a block diagram of three mass storage devices having four partitions and one partition image.
Figure 21:
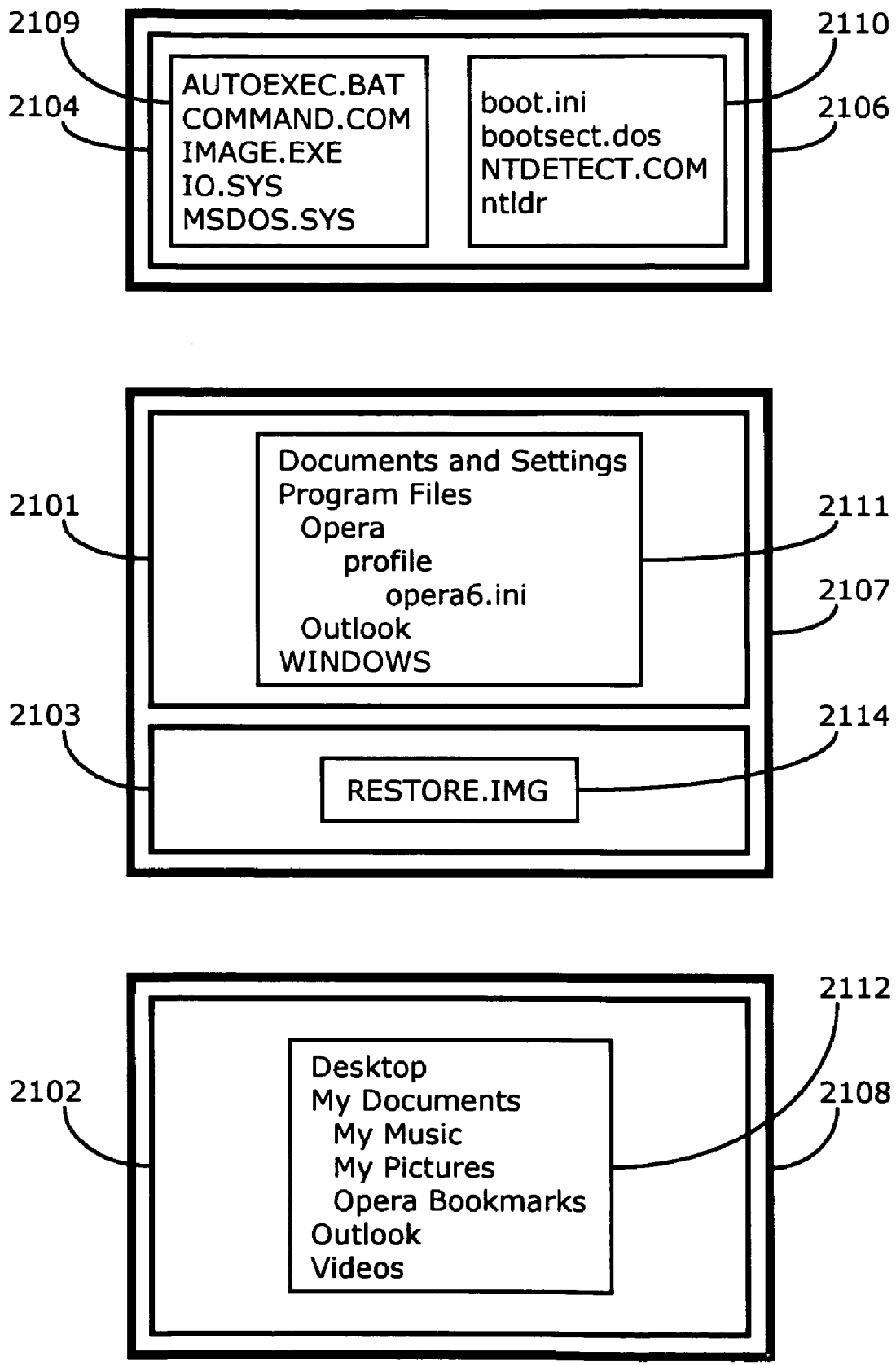
FIG. 21 is a block diagram of three mass storage devices having four partitions, a plurality of application programs, and one partition image.

ASCII Code contained within file AUTOEXEC.BAT of FIGS. 20 and 21:

IMAGE /r11atx 12:\RESTORE.IMG

TABLE 1s

Figure 22:
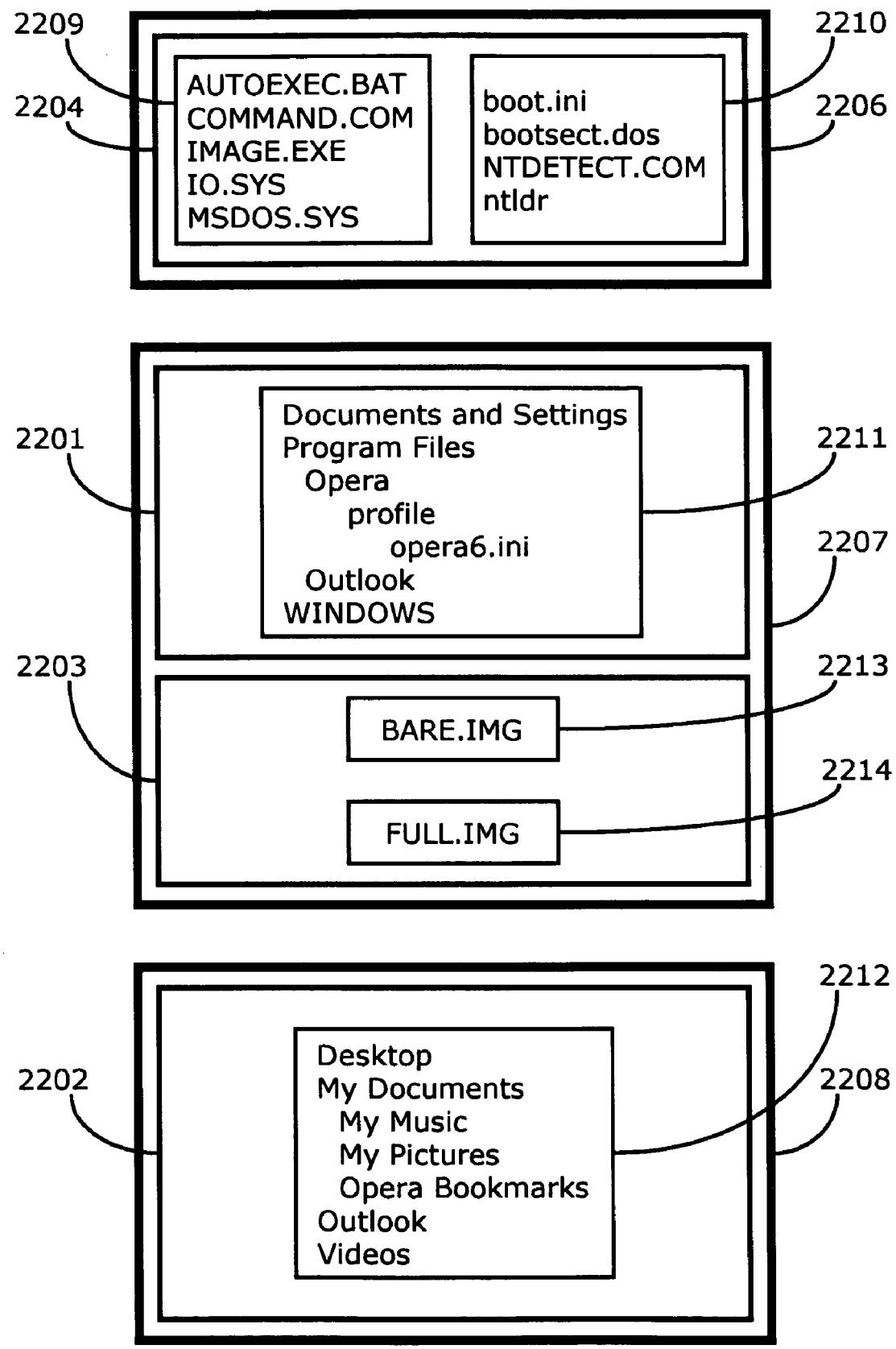
FIG. 22 is a block diagram of three mass storage devices having four partitions, a plurality of application programs, and two partition images.

ASCII Code contained within file AUTOEXEC.BAT of FIG. 22:

IMAGE /r11atx 12:\BARE.IMG

TABLE 1t

Figure 26:
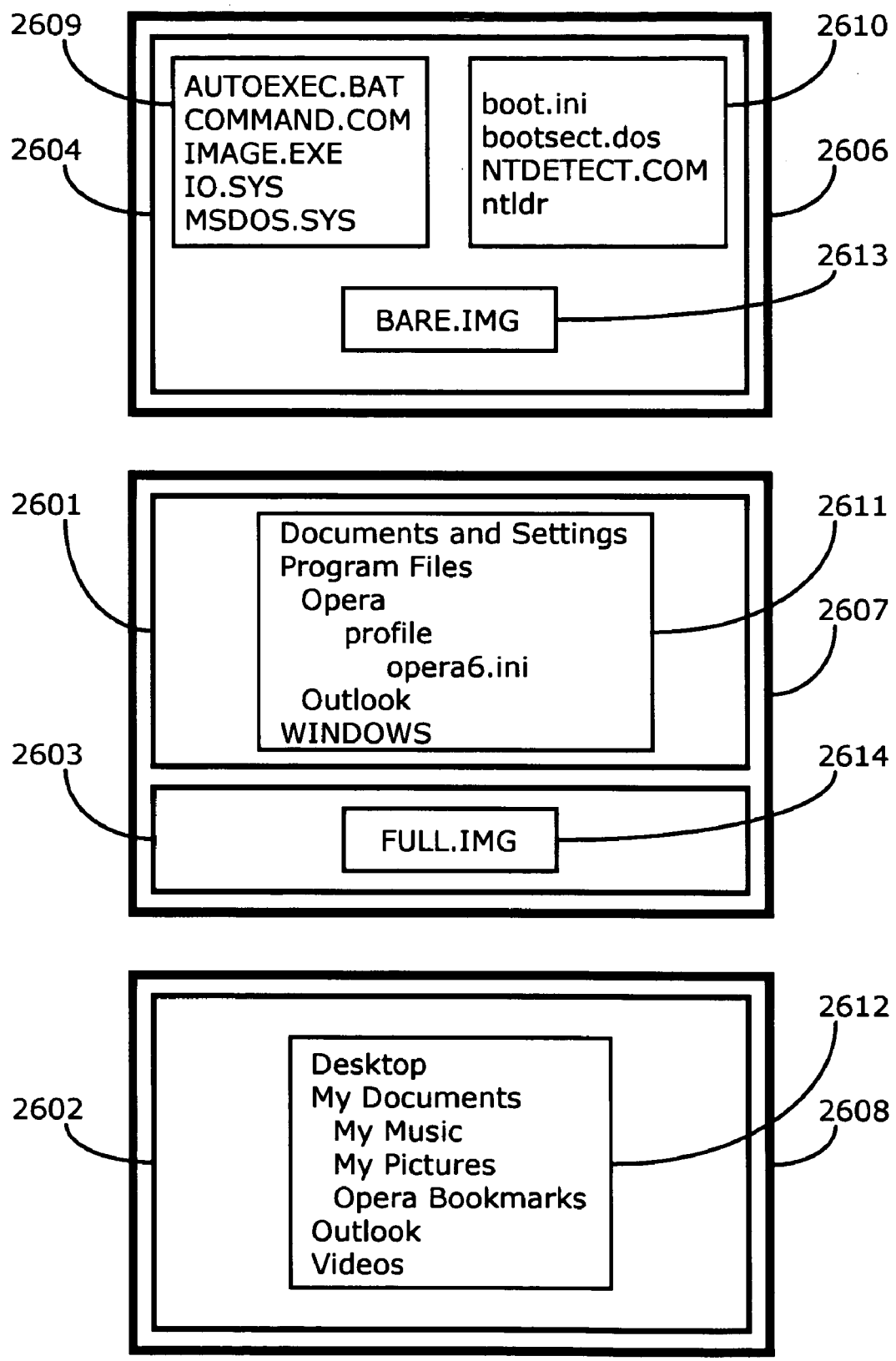
FIG. 26 is a block diagram of three mass storage devices having four partitions, a plurality of application programs, and two partition images occupying different partitions.
Figure 30:
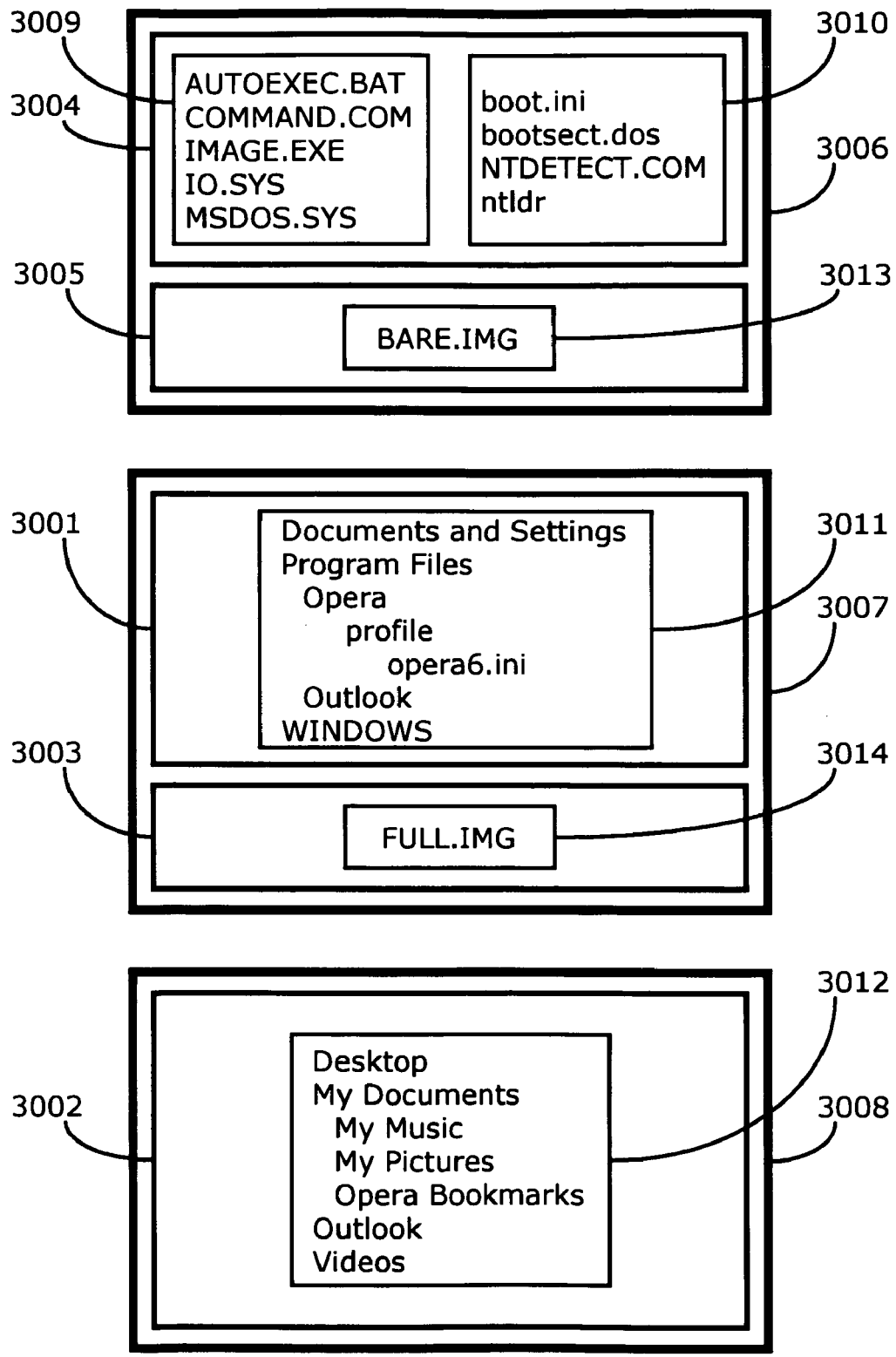

ASCII Code contained within file AUTOEXEC.BAT of FIGS. 22, 26, and 30:

IMAGE /r11atx 12:\FULL.IMG

TABLE 2

ASCII Code contained within file MSDOS.SYS:

[Options]
BootGUI=0
[Paths]
HostWinBootDrv=C
WinBootDir=C:

TABLE 3

Modified INI Code contained within file boot.ini:
Key: "operating systems"

Value: "C:\"   Data: "Panic Button (TM) (Patent Pending)"

TABLE 4a

Registry Code for location of Shell Folders of FIGS. 1, 4, 5, 6, 7, and 8:

Key: "HKCU\Software\Microsoft\Windows\CurrentVersion\Explorer\Shell Folders"

| | |
|---|---|
| Value: "Desktop" | Data: "D:\Desktop" |
| Value: "My Music" | Data: "D:\My Documents\My Music" |
| Value: "My Pictures" | Data: "D:\My Documents\My Pictures" |
| Value: "My Video" | Data: "D:\Videos" |
| Value: "Personal" | Data: "D:\My Documents" |

Key: "HKCU\Software\Microsoft\Windows\CurrentVersion\Explorer\User Shell Folders"

| | |
|---|---|
| Value: "Desktop" | Data: "D:\Desktop" |
| Value: "My Music" | Data: "D:\My Documents\My Music" |
| Value: "My Pictures" | Data: "D:\My Documents\My Pictures" |
| Value: "My Video" | Data: "D:\Videos" |
| Value: "Personal" | Data: "D:\My Documents" |

TABLE 4b

Registry Code for location of Shell Folders of FIGS. 9 through 30:

Key: "HKCU\Software\Microsoft\Windows\CurrentVersion\Explorer\Shell Folders"

| | |
|---|---|
| Value: "Desktop" | Data: "E:\Desktop" |
| Value: "My Music" | Data: "E:\My Documents\My Music" |
| Value: "My Pictures" | Data: "E:\My Documents\My Pictures" |
| Value: "My Video" | Data: "E:\Videos" |

TABLE 4b-continued

Registry Code for location of Shell Folders of FIGS. 9 through 30:

| | |
|---|---|
| Value: "Personal" | Data: "E:\My Documents" |

Key: "HKCU\Software\Microsoft\Windows\CurrentVersion\Explorer\User Shell Folders"

| | |
|---|---|
| Value: "Desktop" | Data: "E:\Desktop" |
| Value: "My Music" | Data: "E:\My Documents\My Music" |
| Value: "My Pictures" | Data: "E:\My Documents\My Pictures" |
| Value: "My Video" | Data: "E:\Videos" |
| Value: "Personal" | Data: "E:\My Documents" |

TABLE 5a

INI Code contained within file opera6.ini of FIGS. 1, 4, 5, 6, 7, and 8:
Key: "User Prefs"

| | |
|---|---|
| Value: "Hot List File Ver2" | Data: "D:\My Documents\Opera Bookmarks\opera6.adr" |

TABLE 5b

INI Code contained within file opera6.ini of FIGS. 9 through 30:
Key: "User Prefs"

| | |
|---|---|
| Value: "Hot List File Ver2" | Data: "E\My Documents\Opera Bookmarks\opera6.adr" |

TABLE 6a

Registry Code for location of Outlook folder of FIGS. 1, 4, 5, 6, 7, and 8:

Key: "HKCU\Software\Microsoft\Windows NT\CurrentVersion\Windows Messaging Subsystem\Profiles"
Value: "DefaultProfile"　　Data: "Outlook"
Key: "HKCU\Software\Microsoft\Windows NT\CurrentVersion\Windows Messaging Subsystem\Profiles\Outlook"
Subkey: "0A0D020000000000C000000000000046"
Value: "0003036f" Binary Data: "98,C3,01,00"
Key: "HKCU\Software\Microsoft\Windows NT\CurrentVersion\Windows Messaging Subsystem\Profiles\Outlook"
Subkey: "486F6E6F725043486F6E6F72426F6F6B"
Value: "00033009" Binary Data: "02,00,00,00"
Key: "HKCU\Software\Microsoft\Windows NT\CurrentVersion\Windows Messaging Subsystem\Profiles\Outlook"
Subkey: "486F6E6F725043486F6E6F72426F6F6B"
Value: "01023d0c" Binary Data: "CC,EE,95,D0,E3,39,06,42,A6,BF,75,64,06,B0,B9,6A"
Value: "01020fff" Binary Data: "00,00,00,00,38,A1,BB,10,05,E5,10,1A,A1,BB,08,00,2B,2A,56,C2,00,00,6D,73,70,73,\
74,2E,64,6C,6C,00,00,00,00,00,4E,49,54,41,F9,BF,B8,01,00,AA,00,37,D9,6E,00,00,00,00,44,00,3A,00,5C,00,4F,00,75,\
00,74,00,6C,00,6F,00,6F,00,6B,00,5C,00,4F,00,75,00,74,00,6C,00,6F,00,6F,00,6B,00,2E,00,70,73,00,74,00,00,00"
Key: "HKCU\Software\Microsoft\Windows NT\CurrentVersion\Windows Messaging Subsystem\Profiles\Outlook"
Subkey: "9207F3E0A3B11019908B08002B2A56C2"
Value: "01023d00" Binary Data: "48,6F,6E,6F,72,50,43,48,6F,6E,6F,72,42,6F,6F,6B"

TABLE 6b

Registry Code for location of Outlook folder of FIGS. 9 through 30:

Key: "HKCU\Software\Microsoft\Windows NT\CurrentVersion\Windows Messaging Subsystem\Profiles"
Value: "DefaultProfile"　　Data: "Outlook"
Key: "HKCU\Software\Microsoft\Windows NT\CurrentVersion\Windows Messaging Subsystem\Profiles\Outlook"
Subkey: "0A0D020000000000C000000000000046"
Value: "0003036f" Binary Data: "98,C3,01,00"
Key: "HKCU\Software\Microsoft\Windows NT\CurrentVersion\Windows Messaging Subsystem\Profiles\Outlook"
Subkey: "486F6E6F725043486F6E6F72426F6F6B"
Value: "00033009" Binary Data: "02,00,00,00"
Key: "HKCU\Software\Microsoft\Windows NT\CurrentVersion\Windows Messaging Subsystem\Profiles\Outlook"
Subkey: "486F6E6F725043486F6E6F72426F6F6B"
Value: "01023d0c" Binary Data: "CC,EE,95,D0,E3,39,06,42,A6,BF,75,64,06,B0,B9,6A"
Value: "01020fff" Binary Data: "00,00,00,00,38,A1,BB,10,05,E5,10,1A,A1,BB,08,00,2B,2A,56,C2,00,00,6D,73,70,73,\
74,2E,64,6C,6C,00,00,00,00,00,4E,49,54,41,F9,BF,B8,01,00,AA,00,37,D9,6E,00,00,00,00,45,00,3A,00,5C,00,4F,00,75,\
00,74,00,6C,00,6F,00,6F,00,6B,00,5C,00,4F,00,75,00,74,00,6C,00,6F,00,6F,00,6B,00,2E,00,70,73,00,74,00,00,00"

TABLE 6b-continued

Registry Code for location of Outlook folder of FIGS. 9 through 30:

Key: "HKCU\Software\Microsoft\Windows NT\CurrentVersion\Windows Messaging Subsystem\Profiles\Outlook"
Subkey: "9207F3E0A3B11019908B08002B2A56C2"
Value: "01023d00" Binary Data: "48,6F,6E,6F,72,50,43,48,6F,6E,6F,72,42,6F,6F,6B"

Figure 2:
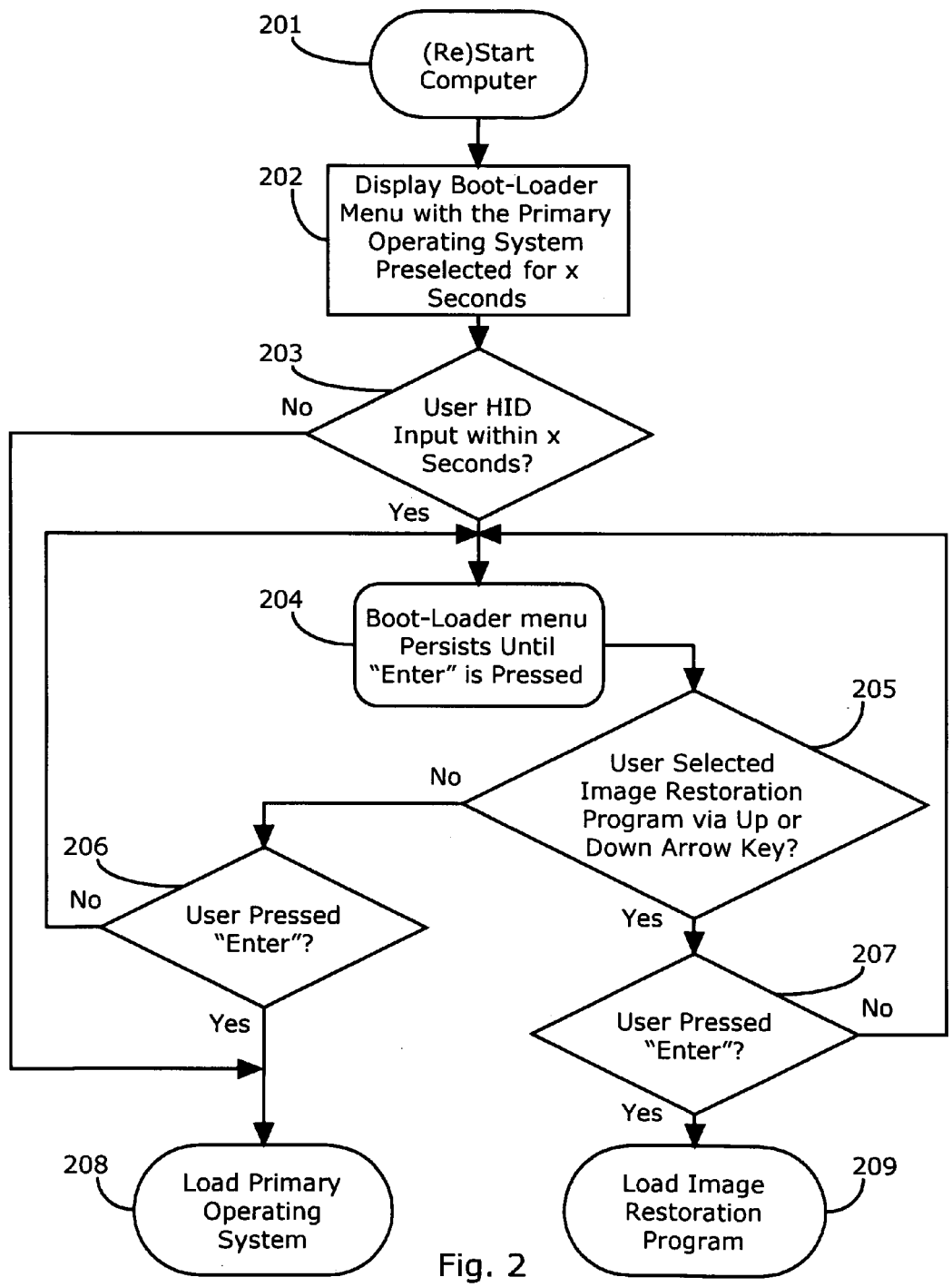
FIG. 2 is a flowchart depicting the boot process according to the present invention.

Referring now to FIG. 2, a flowchart depicting a boot process of the present invention is shown. First, the computer is restarted or started (201). A prompt screen is displayed (pictured in FIG. 3) with the primary operating system preselected, and a predefined countdown begins (202). If the user presents no input (203) to a responsive human interface device (HID), e.g., the keyboard, the predefined countdown lapses, and the process proceeds directly to loading the primary operating system (208). If the user offers any keystroke (203), the countdown halts, and the prompt screen persists (204) until the "Enter" key is pressed. If the user presses the up arrow key or the down arrow key (205), the prompt screen no longer has the primary operating system selected, but instead, has the partition image restoration program selected, which will load (209) if the user presses enter (207). If the primary operating system remains selected (205), it will load (208) when the user presses "Enter" (206).

Figure 3:
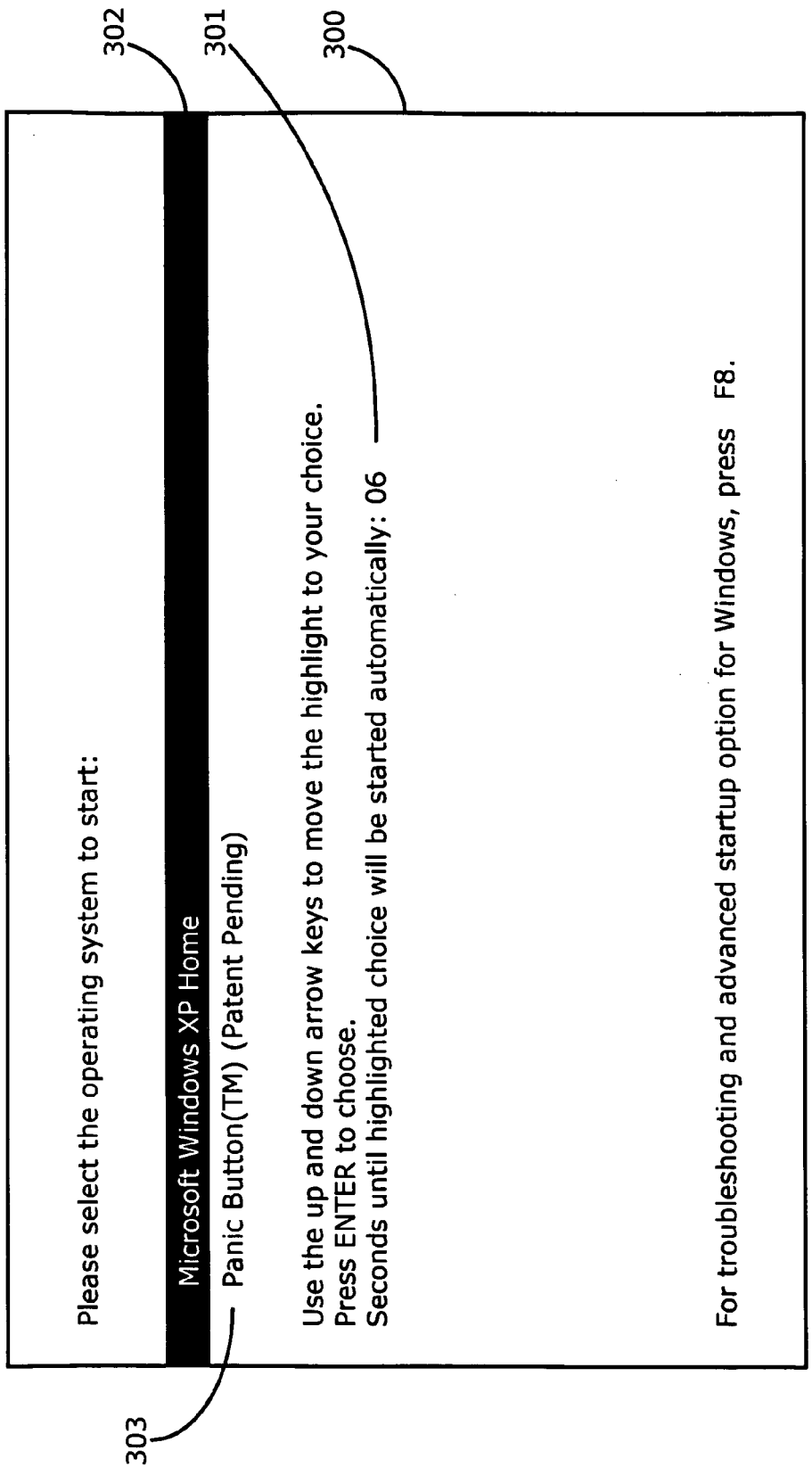
FIG. 3 is a pictorial view of a boot loader screen according to the present invention.

Referring now to FIG. 3, prompt screen 300 displays for a predefined time whose passage is visible via countdown display 301. Prompt screen 300 presents an opportunity for a user to select the secondary operating system. Selection stripe 302 is shown highlighting the primary operating system boot option. Selection stripe 302 is responsive to human interface device and may be so moved so that it highlights secondary operating system boot option 303 according to user input. Prompt screen 300 is designed to always open with stripe 302 on the primary operating system.

Instead of text, a prompt screen of the present invention could show at least one icon, or other graphics. Indeed, a prompt of the present invention computer could be an audio prompt giving human voice instructions, thereby obviating a prompt screen altogether.

In some forthcoming embodiments, a plurality of application programs is included with the present invention. Specifically, a web browser called "Opera" (Trademark of Opera Software ASA, Waldemar Thranes gate 98, NO-0175, Oslo, Norway, Telephone +47 24 16 40 00) and an email client application program called "Outlook" (Trademark of Microsoft Corporation, One Microsoft Way, Redmond, Wash. 98052, USA) are included.

Referring now to FIG. 4, mass storage device 407 is contained within a computer (not shown) and has partitions 401 and 402 (designated by Windows as drive letters "C:" and "D:", respectively). Partition 401 utilizes the FAT32 file system and has partition image restoration program and secondary operating system files 409 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1a and 2, respectively, while "COMMAND.COM" and "IO.SYS" are obtained from a Windows 98SE boot floppy image. "IMAGE.EXE" is a partition image restoration program of TeraByte, Incorporated.

Partition 401 further includes boot loader files 410 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 410 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Partition 401 further has folders 411 as follows: "Documents and Settings", "Program Files", "Opera", "profile", "opera6.ini" (a configuration file), "Outlook", and "WINDOWS". "Documents and Settings", "Program Files", and "WINDOWS" are folders of the primary operating system. Within "Program Files" of folders 411, "Outlook" is the main application program folder of the Outlook email client, and "Opera" is the main application program folder of the Opera web browser; within the "Opera" folder, a folder named "profile" contains configuration file "opera6.ini" (discussed below).

Partition 402 may utilize either NTFS or the FAT32 file system and has folders 412 as follows: "Desktop", "My Documents", "My Music", "My Pictures", "Opera Bookmarks", "Outlook", and "Videos". The primary operating system is configured to treat "Desktop", "My Documents", "My Music", "My Pictures", and "Videos" of folders 412 as standard locations for storing user-created files by way of registry code shown in Table 4a above. The Opera web browser is configured to store bookmarks in the "Opera Bookmarks" folder of folders 412 by way of INI code contained within file "opera6.ini" shown in Table 5a above, while the Outlook email client is configured to store email in the "Outlook" folder of folders 412 by way of registry code shown in Table 6a above.

Partition 402 further has partition image 414, named "RESTORE.IMG", which is an image of partition 401.

With respect to all subsequent Figures, as with FIGS. 1 and 4 above, the storage device(s) are within the context of an otherwise conventional computer, with all of its essential functional hardware and other essential components.

Referring now to FIG. 5, mass storage device 507 has partitions 501 and 502 (designated by Windows as drive letters "C:" and "D:", respectively). Partition 501 utilizes the FAT32 file system and has partition image restoration program and secondary operating system files 509 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1c and 2, respectively, while "COMMAND.COM" and "IO.SYS" are obtained from a Windows 98SE boot floppy image. "IMAGE.EXE" is a partition image restoration program of TeraByte, Incorporated.

Partition 501 further includes boot loader files 510 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 510 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Partition 501 further has folders 511 as follows: "Documents and Settings", "Program Files", "Opera", "profile", "opera6.ini" (a configuration file), "Outlook", and "WINDOWS". "Documents and Settings", "Program Files", and "WINDOWS" are folders of the primary operating system. Within "Program Files" of folders 511, "Outlook" is the main application program folder of the Outlook email client, and "Opera" is the main application program folder of the Opera web browser; within the "Opera" folder, a folder named "profile" contains configuration file "opera6.ini" (discussed below).

Partition 502 may utilize either NTFS or the FAT32 file system and has folders 512 as follows: "Desktop", "My Documents", "My Music", "My Pictures", "Opera Bookmarks", "Outlook", and "Videos". The primary operating system is configured to treat "Desktop", "My Documents", "My Music", "My Pictures", and "Videos" of folders 512 as standard locations for storing user-created files by way of registry code shown in Table 4a above. The Opera web browser is configured to store bookmarks in the "Opera Bookmarks" folder of folders 512 by way of INI code contained within file "opera6.ini" shown in Table 5a above, while the Outlook email client is configured to store email in the "Outlook" folder of folders 512 by way of registry code shown in Table 6a above.

Partition 502 further has partition images 513 and 514. Partition images 513 and 514, named "BARE.IMG" and "FULL.IMG", respectively, are images of partition 501. Partition image 513 excludes the plurality of application programs (e.g., the Opera web browser and the Outlook email client), making it resemble an image of partition 101 of FIG. 1. Partition image 514 includes the plurality of application programs of partition 501. In the event that the present invention computer is to be rebuilt to include newer versions of application programs, the ASCII code of AUTOEXEC.BAT may be modified as set forth in Table 1b. Subsequently, the partition image restoration program is run, restoring partition image 513 to partition 501. Thus, the present invention computer may be rebuilt without needing to reinstall the primary operating system.

The partition image(s) depicted in FIGS. 1, 4, and 5 are safer against accidental or malicious damage on a partition that is hidden from the primary operating system. Thus, embodiments depicted in FIGS. 1, 4, and 5 will now be reiterated in FIGS. 6, 7, and 8, respectively, with an additional partition for the partition image(s).

Referring now to FIG. 6, mass storage device 607 has partitions 601 and 602 (designated by Windows as drive letters "C:" and "D:", respectively), and partition 603 (hidden). Partition 601 utilizes the FAT32 file system and has partition image restoration program and secondary operating system files 609 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1d and 2, respectively, while "COMMAND.COM" and "IO.SYS" are obtained from a Windows 98SE boot floppy image. "IMAGE.EXE" is a partition image restoration program of TeraByte, Incorporated.

Partition 601 further includes boot loader files 610 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 610 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Partition 601 further has folders 611 as follows: "Documents and Settings", "Program Files", and "WINDOWS". "Documents and Settings", "Program Files", and "WINDOWS" are folders of the primary operating system.

Partition 602 may utilize either NTFS or the FAT32 file system and has folders 612 as follows: "Desktop", "My Documents", "My Music", "My Pictures", and "Videos". The primary operating system is configured to treat folders 612 as standard locations for storing user-created files by way of registry code shown in Table 4a above.

Partition 603 may utilize either NTFS or the FAT32 file system and has partition image 613, named "RESTORE.IMG", which is an image of partition 601.

Referring now to FIG. 7, mass storage device 707 has partitions 701 and 702 (designated by Windows as drive letters "C:" and "D:", respectively), and partition 703 (hidden). Partition 701 utilizes the FAT32 file system and has partition image restoration program and secondary operating system files 709 as follows: "AUTOEXEC.BAT", "COMMAND.COM", "IMAGE.EEXE", "IO.SYS", and "MSDOS.SYS". "AUTOEXEC.BAT" and "MSDOS.SYS" contain ASCII code set forth in Tables 1d and 2, respectively, while "COMMAND.COM" and "IO.SYS" are obtained from a Windows 98SE boot floppy image. "IMAGE.EXE" is a partition image restoration program of TeraByte, Incorporated.

Partition 701 further includes boot loader files 710 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 710 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Partition 701 further has folders 711 as follows: "Documents and Settings", "Program Files", "Opera", "profile", "opera6.ini" (a configuration file), "Outlook", and "WINDOWS". "Documents and Settings", "Program Files", and "WINDOWS" are folders of the primary operating system. Within "Program Files" of folders 711, "Outlook" is the main application program folder of the Outlook email client, and "Opera" is the main application program folder of the Opera web browser; within the "Opera" folder, a folder named "profile" contains configuration file "opera6.ini" (discussed below).

Partition 702 may utilize either NTFS or the FAT32 file system and has folders 712 as follows: "Desktop", "My Documents", "My Music", "My Pictures", "Opera Bookmarks", "Outlook", and "Videos". The primary operating system is configured to treat "Desktop", "My Documents", "My Music", "My Pictures", and "Videos" of folders 712 as standard locations for storing user-created files by way of registry code shown in Table 4a above. The Opera web browser is configured to store bookmarks in the "Opera Bookmarks" folder of folders 712 by way of INI code contained within file "opera6.ini" shown in Table 5a above, while the Outlook email client is configured to store email in the "Outlook" folder of folders 712 by way of registry code shown in Table 6a above.

Partition 703 may utilize either NTFS or the FAT32 file system and has partition image 714, named "RESTORE.IMG", which is an image of partition 701.

Referring now to FIG. 8, mass storage device 807 has partitions 801 and 802 (designated by Windows as drive letters "C:" and "D:", respectively), and partition 803 (hidden). Partition 801 utilizes the FAT32 file system and has partition image restoration program and secondary operating system files 809 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1f and 2, respectively, while "COMMAND.COM" and "IO.SYS" are obtained from a Windows 98SE boot floppy image. "IMAGE.EXE" is a partition image restoration program of TeraByte, Incorporated.

Partition 801 further includes boot loader files 810 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 810 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Partition 801 further has folders 811 as follows: "Documents and Settings", "Program Files", "Opera", "profile", "opera6.ini" (a configuration file), "Outlook", and "WINDOWS". "Documents and Settings", "Program Files", and "WINDOWS" are folders of the primary operating system. Within "Program Files" of folders 811, "Outlook" is the main application program folder of the Outlook email client, and "Opera" is the main application program folder of the Opera web browser; within the "Opera" folder, a folder named "profile" contains configuration file "opera6.ini" (discussed below).

Partition 802 may utilize either NTFS or the FAT32 file system and has folders 812 as follows: "Desktop", "My Documents", "My Music", "My Pictures", "Opera Bookmarks", "Outlook", and "Videos". The primary operating system is configured to treat "Desktop", "My Documents", "My Music", "My Pictures", and "Videos" of folders 812 as standard locations for storing user-created files by way of registry code shown in Table 4a above. The Opera web browser is configured to store bookmarks in the "Opera Bookmarks" folder of folders 812 by way of INI code contained within file "opera6.ini" shown in Table 5a above, while the Outlook email client is configured to store email in the "Outlook" folder of folders 812 by way of registry code shown in Table 6a above.

Partition 803 may utilize either NTFS or the FAT32 file system and has partition images 813 and 814. Partition images 813 and 814, named "BARE.IMG" and "FULL.IMG", respectively, are images of partition 801. Partition image 813 excludes the plurality of application programs (e.g., the Opera web browser and the Outlook email client), making it resemble an image of partition 601 of FIG. 6. Partition image 814 includes the plurality of application programs of partition 801. In the event that the present invention computer is to be rebuilt to include newer versions of application programs, the ASCII code of AUTOEXEC.BAT may be modified as set forth in Table 1e. Subsequently, the partition image restoration program is run, restoring partition image 813 to partition 801. Thus, the present invention computer may be rebuilt without needing to reinstall the primary operating system.

Although the embodiments depicted in FIGS. 6, 7, and 8 are quite robust, the boot loader, secondary operating system, and partition image restoration program are safer against accidental or malicious damage on a mass storage device that is invisible to the primary operating system, or in a read-only environment, or both. Thus, in the forthcoming embodiments, the boot loader, the secondary operating system, and the partition image restoration program reside on a distal mass storage device, which may be a hard disk drive, USB flash drive, or integrated circuit; it may also be incorporated into the motherboard, e.g., as a part of the BIOS (basic input/output system). There are many mass storage devices that include a physical (hardware) means for write protection. One such device is a hard disk drive having jumper pins that can be bridged to make it impossible to write or alter data on the drive, rendering it as a read-only device. Another example of such a mass storage device is a USB flash drive having a slide switch that puts the drive in a read-only state. In any case, the mass storage device that includes the boot loader, partition image restoration program, and secondary operating system may be made invisible to the primary operating system by simply removing its Windows drive letter, and, preferably, be write-protected, that is, placed in a read-only state.

In cases where there are at least two mass storage devices, it is understood that one of the mass storage devices may not have plural partitions. Some artisans would characterize such a mass storage device as having a single partition.

Referring now to FIG. 9, first mass storage device 906 has partition 904. Partition 904 utilizes the FAT32 file system and has partition image restoration program and secondary operating system files 909 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1g and 2, respectively, while "COMMAND.COM" and "IO.SYS" are obtained from a Windows 98SE boot floppy image. "IMAGE.EXE" is a partition image restoration program of TeraByte, Incorporated.

Partition 904 further includes boot loader files 910 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 910 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Once the primary operating system has been installed, partition 904 may have its drive letter ("C:") removed via a partition editing application program such as Partition Magic (Trademark of Symantec Corporation, 20330 Stevens Creek Boulevard, Cupertino, Calif. 95014, USA), thereby rendering it invisible to the primary operating system. If added security is desired, first mass storage device 906 may be hardware-switched to a read-only state, making it impossible to compromise the present invention accidentally or maliciously.

Second mass storage device 907 has partitions 901 and 902 (designated by Windows as drive letters "D:" and "E:", respectively), and partition 903 (hidden). Partition 901 may utilize either NTFS or the FAT32 file system, and has folders 911 as follows: "Documents and Settings", "Program Files", and "WINDOWS". "Documents and Settings", "Program Files", and "WINDOWS" are folders of the primary operating system.

Partition 902 may utilize either NTFS or the FAT32 file system and has folders 912 as follows: "Desktop", "My Documents", "My Music", "My Pictures", and "Videos". The primary operating system is configured to treat folders 912 as standard locations for storing user-created files by way of registry code shown in Table 4b above.

Partition 903 may utilize either NTFS or the FAT32 file system and has partition image 913, named "RESTORE.IMG", which is an image of partition 901.

Referring now to FIG. 10, first mass storage device 1006 has partition 1004. Partition 1004 utilizes the FAT32 file system and has partition image restoration program and secondary operating system files 1009 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1g and 2, respectively, while "COMMAND.COM" and "IO.SYS" are obtained from a Windows 98SE boot floppy image. "IMAGE.EXE" is a partition image restoration program of TeraByte, Incorporated.

Partition 1004 further includes boot loader files 1010 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 1010 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Once the primary operating system has been installed, partition 1004 may have its drive letter ("C:") removed via a partition editing application program such as Partition Magic, thereby rendering it invisible to the primary operating system. If added security is desired, first mass storage device 1006 may be hardware-switched to a read-only state, making it impossible to compromise the present invention accidentally or maliciously.

Second mass storage device 1007 has partitions 1001 and 1002 (designated by Windows as drive letters "D:" and "E:", respectively), and partition 1003 (hidden). Partition 1001 may utilize either NTFS or the FAT32 file system and has folders 1011 as follows: "Documents and Settings", "Program Files", "Opera", "profile", "opera6.ini" (a configuration file), "Outlook", and "WINDOWS". "Documents and Settings", "Program Files", and "WINDOWS" are folders of the primary operating system. Within "Program Files" of folders 1011, "Outlook" is the main application program folder of the Outlook email client, and "Opera" is the main application program folder of the Opera web browser; within the "Opera" folder, a folder named "profile" contains configuration file "opera6.ini" (discussed below).

Partition 1002 may utilize either NTFS or the FAT32 file system and has folders 1012 as follows: "Desktop", "My Documents", "My Music", "My Pictures", "Opera Bookmarks", "Outlook", and "Videos". The primary operating system is configured to treat "Desktop", "My Documents", "My Music", "My Pictures", and "Videos" of folders 1012 as standard locations for storing user-created files by way of registry code shown in Table 4b above. The Opera web browser is configured to store bookmarks in the "Opera Bookmarks" folder of folders 1012 by way of INI code contained within file "opera6.ini" shown in Table 5b above, while the Outlook email client is configured to store email in the "Outlook" folder of folders 1012 by way of registry code shown in Table 6b above.

Partition 1003 may utilize either NTFS or the FAT32 file system and has partition image 1014, named "RESTORE.IMG", which is an image of partition 1001.

Referring now to FIG. 11, first mass storage device 1106 has partition 1104. Partition 1104 utilizes the FAT32 file system and has partition image restoration program and secondary operating system files 1109 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1i and 2, respectively, while "COMMAND.COM" and "IO.SYS" are obtained from a Windows 98SE boot floppy image. "IMAGE.EXE" is a partition image restoration program of TeraByte, Incorporated.

Partition 1104 further includes boot loader files 1110 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 1110 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Once the primary operating system has been installed, partition 1104 may have its drive letter ("C:") removed via a partition editing application program such as Partition Magic, thereby rendering it invisible to the primary operating system. If added security is desired, first mass storage device 1106 may be hardware-switched to a read-only state, making it impossible to compromise the present invention accidentally or maliciously.

Second mass storage device 1107 has partitions 1101 and 1102 (designated by Windows as drive letters "D:" and "E:", respectively), and partition 1103 (hidden). Partition 1101 may utilize either NTFS or the FAT32 file system and has folders 1111 as follows: "Documents and Settings", "Program Files", "Opera", "profile", "opera6.ini" (a configuration file), "Outlook", and "WINDOWS". "Documents and Settings", "Program Files", and "WINDOWS" are folders of the primary operating system. Within "Program Files" of folders 1111, "Outlook" is the main application program folder of the Outlook email client, and "Opera" is the main application program folder of the Opera web browser; within the "Opera" folder, a folder named "profile" contains configuration file "opera6.ini" (discussed below).

Partition 1102 may utilize either NTFS or the FAT32 file system and has folders 1112 as follows: "Desktop", "My Documents", "My Music", "My Pictures", "Opera Bookmarks", "Outlook", and "Videos". The primary operating system is configured to treat "Desktop", "My Documents", "My Music", "My Pictures", and "Videos" of folders 1112 as standard locations for storing user-created files by way of registry code shown in Table 4b above. The Opera web browser is configured to store bookmarks in the "Opera Bookmarks" folder of folders 1112 by way of INI code contained within file "opera6.ini" shown in Table 5b above, while the Outlook email client is configured to store email in the "Outlook" folder of folders 1112 by way of registry code shown in Table 6b above.

Partition 1103 may utilize either NTFS or the FAT32 file system and has partition images 1113 and 1114. Partition images 1113 and 1114, named "BARE.IMG" and "FULL.IMG", respectively, are images of partition 1101. Partition image 1113 excludes the plurality of application programs (e.g., the Opera web browser and the Outlook email client), making it resemble an image of partition 901 of FIG. 9. Partition image 1114 includes the plurality of application programs of partition 1101. In the event that the present invention computer is to be rebuilt to include newer versions of application programs, the ASCII code of AUTOEXEC.BAT may be modified as set forth in Table 1h. Subsequently, the partition image restoration program is run, restoring partition image 1113 to partition 1101. Thus, the present invention computer may be rebuilt without needing to reinstall the primary operating system.

In the forthcoming embodiments, the distal mass storage device that was added to the present invention for the boot loader, etc., also holds at least one partition image.

Figure 12:
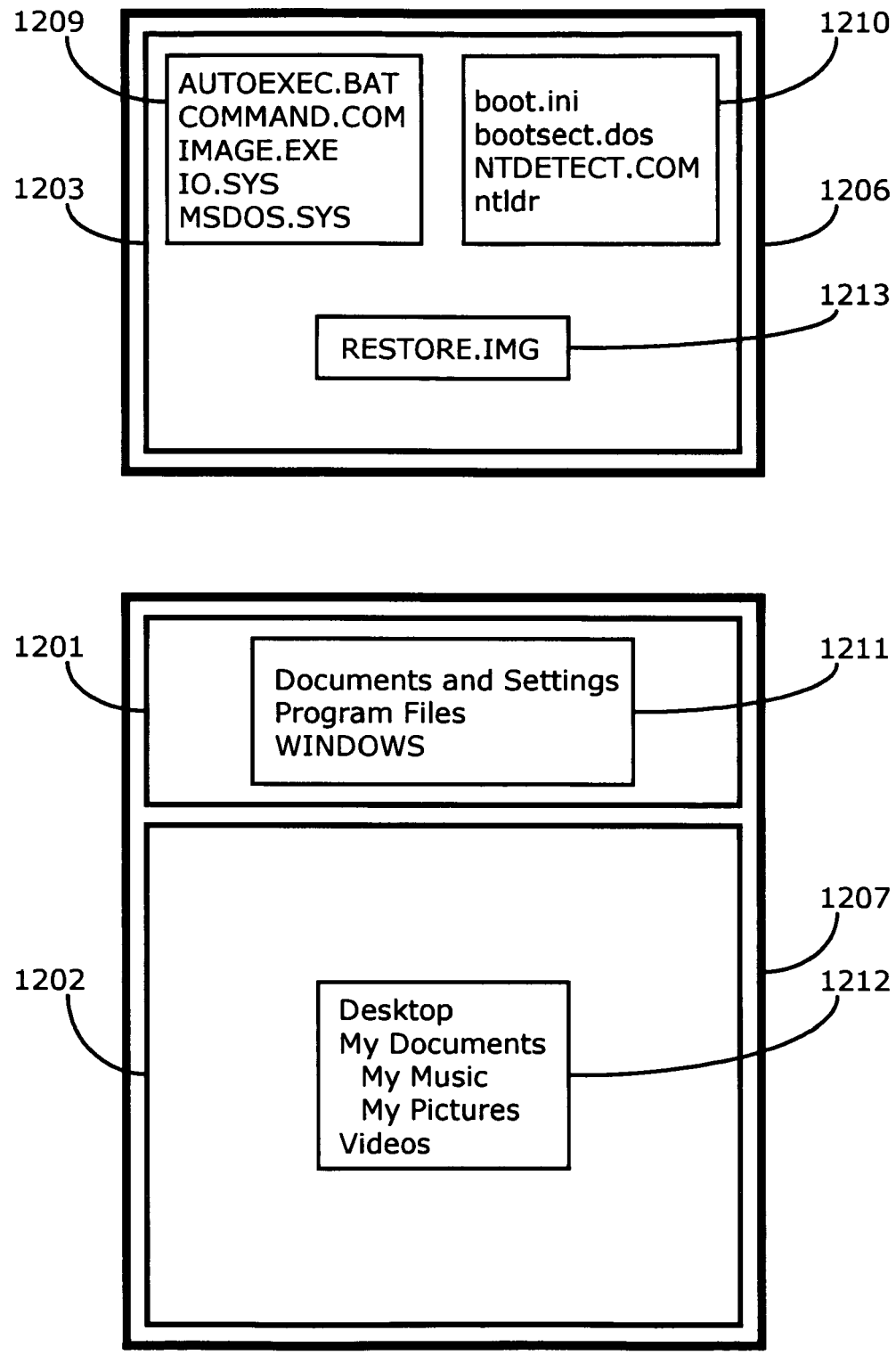
FIG. 12 is a block diagram of two mass storage devices having three partitions and one partition image.

Referring now to FIG. 12, first mass storage device 1206 has partition 1203. Partition 1203 utilizes the FAT32 file system and has partition image restoration program and secondary operating system files 1209 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1j and 2, respectively, while "COMMAND.COM" and "IO.SYS" are obtained from a Windows 98SE boot floppy image. "IMAGE.EXE" is a partition image restoration program of TeraByte, Incorporated.

Partition 1203 further includes boot loader files 1210 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 1210 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Partition 1203 further has partition image 1213, named "RESTORE.IMG", which is an image of partition 1201 of second mass storage device 1207 (set forth below).

Once the primary operating system has been installed, partition 1203 may have its drive letter ("C:") removed via a partition editing application program such as Partition Magic, thereby rendering it invisible to the primary operating system. If added security is desired, first mass storage device 1206 may be hardware-switched to a read-only state, making it impossible to compromise the present invention accidentally or maliciously.

Second mass storage device 1207 has partitions 1201 and 1202 (designated by Windows as drive letters "D:" and "E:", respectively). Partition 1201 may utilize either NTFS or the FAT32 file system and has folders 1211 as follows: "Documents and Settings", "Program Files", and "WINDOWS". "Documents and Settings", "Program Files", and "WINDOWS" are folders of the primary operating system.

Partition 1202 may utilize either NTFS or the FAT32 file system and has folders 1212 as follows: "Desktop", "My Documents", "My Music", "My Pictures", and "Videos". The primary operating system is configured to treat folders 1212 as standard locations for storing user-created files by way of registry code shown in Table 4b above.

Figure 13:
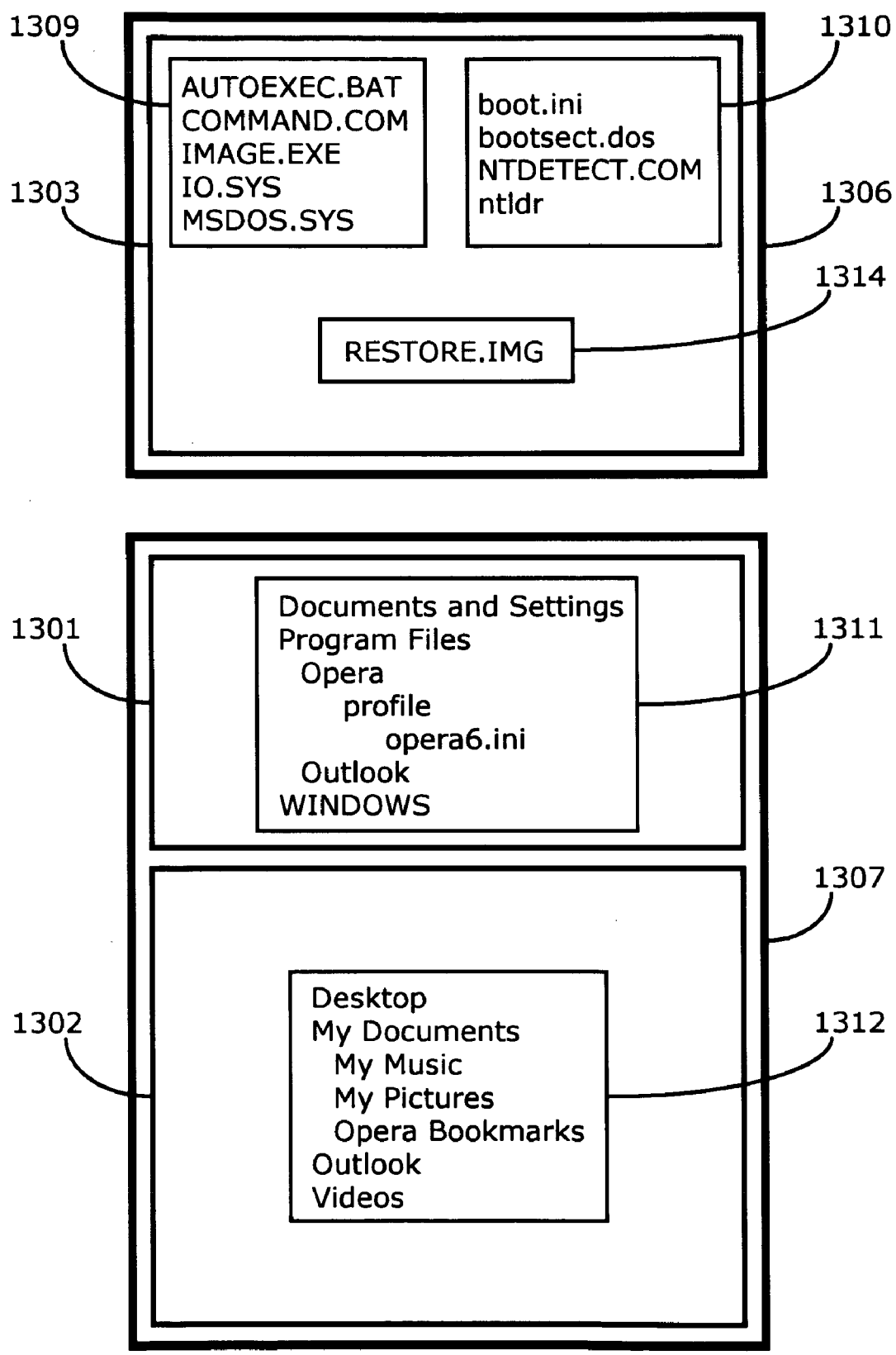
FIG. 13 is a block diagram of two mass storage devices having three partitions, a plurality of application programs, and one partition image.

Referring now to FIG. 13, first mass storage device 1306 has partition 1303. Partition 1303 utilizes the FAT32 file system and has partition image restoration program and secondary operating system files 1309 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1j and 2, respectively, while "COMMAND.COM" and "IO.SYS" are obtained from a Windows 98SE boot floppy image. "IMAGE.EXE" is a partition image restoration program of TeraByte, Incorporated.

Partition 1303 further includes boot loader files 1310 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 1310 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Partition 1303 further has partition image 1314, named "RESTORE.IMG", which is an image of partition 1301 of second mass storage device 1307 (set forth below).

Once the primary operating system has been installed, partition 1303 may have its drive letter ("C:") removed via a partition editing application program such as Partition Magic, thereby rendering it invisible to the primary operating system. If added security is desired, first mass storage device 1306 may be hardware-switched to a read-only state, making it impossible to compromise the present invention accidentally or maliciously.

Second mass storage device 1307 has partitions 1301 and 1302 (designated by Windows as drive letters "D:" and "E:", respectively). Partition 1301 may utilize either NTFS or the FAT32 file system and has folders 1311 as follows: "Documents and Settings", "Program Files", "Opera", "profile", "opera6.ini" (a configuration file), "Outlook", and "WINDOWS". "Documents and Settings", "Program Files", and "WINDOWS" are folders of the primary operating system. Within "Program Files" of folders 1311, "Outlook" is the main application program folder of the Outlook email client, and "Opera" is the main application program folder of the Opera web browser; within the "Opera" folder, a folder named "profile" contains configuration file "opera6.ini" (discussed below).

Partition 1302 may utilize either NTFS or the FAT32 file system and has folders 1312 as follows: "Desktop", "My Documents", "My Music", "My Pictures", "Opera Bookmarks", "Outlook", and "Videos". The primary operating system is configured to treat "Desktop", "My Documents", "My Music", "My Pictures", and "Videos" of folders 1312 as standard locations for storing user-created files by way of registry code shown in Table 4b above. The Opera web browser is configured to store bookmarks in the "Opera Bookmarks" folder of folders 1312 by way of INI code contained within file "opera6.ini" shown in Table 5b above, while the Outlook email client is configured to store email in the "Outlook" folder of folders 1312 by way of registry code shown in Table 6b above.

Referring now to FIG. 14, first mass storage device 1406 has partition 1403. Partition 1403 utilizes the FAT32 file system and has partition image restoration program and secondary operating system files 1409 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1m and 2, respectively, while "COMMAND.COM" and "IO.SYS" are obtained from a Windows 98SE boot floppy image. "IMAGE.EXE" is a partition image restoration program of TeraByte, Incorporated.

Partition 1403 further includes boot loader files 1410 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 1410 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Partition 1403 further has partition images 1413 and 1414 (set forth below).

Once the primary operating system has been installed, partition 1403 may have its drive letter ("C:") removed via a partition editing application program such as Partition Magic, thereby rendering it invisible to the primary operating system. If added security is desired, first mass storage device 1406 may be hardware-switched to a read-only state, making it impossible to compromise the present invention accidentally or maliciously.

Second mass storage device 1407 has partitions 1401 and 1402 (designated by Windows as drive letters "D:" and "E:", respectively). Partition 1401 may utilize either NTFS or the FAT32 file system and has folders 1411 as follows: "Documents and Settings", "Program Files", "Opera", "profile", "opera6.ini" (a configuration file), "Outlook", and "WINDOWS". "Documents and Settings", "Program Files", and "WINDOWS" are folders of the primary operating system. Within "Program Files" of folders 1411, "Outlook" is the main application program folder of the Outlook email client, and "Opera" is the main application program folder of the Opera web browser; within the "Opera" folder, a folder named "profile" contains configuration file "opera6.ini" (discussed below).

Partition 1402 may utilize either NTFS or the FAT32 file system and has folders 1412 as follows: "Desktop", "My Documents", "My Music", "My Pictures", "Opera Bookmarks", "Outlook", and "Videos". The primary operating system is configured to treat "Desktop", "My Documents", "My Music", "My Pictures", and "Videos" of folders 1412 as standard locations for storing user-created files by way of registry code shown in Table 4b above. The Opera web browser is configured to store bookmarks in the "Opera Bookmarks" folder of folders 1412 by way of INI code contained within file "opera6.ini" shown in Table 5b above, while the Outlook email client is configured to store email in the "Outlook" folder of folders 1412 by way of registry code shown in Table 6b above.

Partition images 1413 and 1414, named "BARE.IMG" and "FULL.IMG", respectively, are images of partition 1401. Partition image 1413 excludes the plurality of application programs (e.g., the Opera web browser and the Outlook email client), making it resemble an image of partition 1201 of FIG. 12. Partition image 1414 includes the plurality of application programs of partition 1401. In the event that the present invention computer is to be rebuilt to include newer versions of application programs, the ASCII code of AUTOEXEC.BAT may be modified as set forth in Table 1k. Subsequently, the partition image restoration program is run, restoring partition image 1413 to partition 1401. Thus, the present invention computer may be rebuilt without needing to reinstall the primary operating system.

Referring now to FIG. 15, first mass storage device 1506 has partition 1504. Partition 1504 utilizes the FAT32 file system and has partition image restoration program and secondary operating system files 1509 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1i and 2, respectively, while "COMMAND.COM" and "IO.SYS" are obtained from a Windows 98SE boot floppy image. "IMAGE.EXE" is a partition image restoration program of TeraByte, Incorporated.

Partition 1504 further includes boot loader files 1510 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 1510 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Partition 1504 further has partition image 1513 (set forth below).

Once the primary operating system has been installed, partition 1504 may have its drive letter ("C:") removed via a partition editing application program such as Partition Magic, thereby rendering it invisible to the primary operating system. If added security is desired, first mass storage device 1506 may be hardware-switched to a read-only state, making it impossible to compromise the present invention accidentally or maliciously.

Second mass storage device 1507 has partitions 1501 and 1502 (designated by Windows as drive letters "D:" and "E:", respectively), and partition 1503 (hidden). Partition 1501 may utilize either NTFS or the FAT32 file system and has folders 1511 as follows: "Documents and Settings", "Program Files", "Opera", "profile", "opera6.ini" (a configuration file), "Outlook", and "WINDOWS". "Documents and Settings", "Program Files", and "WINDOWS" are folders of the primary operating system. Within "Program Files" of folders 1511, "Outlook" is the main application program folder of the Outlook email client, and "Opera" is the main application program folder of the Opera web browser; within the "Opera" folder, a folder named "profile" contains configuration file "opera6.ini" (discussed below).

Partition 1502 may utilize either NTFS or the FAT32 file system and has folders 1512 as follows: "Desktop", "My Documents", "My Music", "My Pictures", "Opera Bookmarks", "Outlook", and "Videos". The primary operating system is configured to treat "Desktop", "My Documents", "My Music", "My Pictures", and "Videos" of folders 1512 as standard locations for storing user-created files by way of registry code shown in Table 4b above. The Opera web browser is configured to store bookmarks in the "Opera Bookmarks" folder of folders 1512 by way of INI code contained within file "opera6.ini" shown in Table 5b above, while the Outlook email client is configured to store email in the "Outlook" folder of folders 1512 by way of registry code shown in Table 6b above.

Partition 1503 may utilize either NTFS or the FAT32 file system and has partition image 1514. Partition images 1513 and 1514, named "BARE.IMG" and "FULL.IMG", respectively, are images of partition 1501. Partition image 1513 excludes the plurality of application programs (e.g., the Opera web browser and the Outlook email client), making it resemble an image of partition 1201 of FIG. 12. Partition image 1514 includes the plurality of application programs of partition 1501. In the event that the present invention computer is to be rebuilt to include newer versions of application programs, the ASCII code of AUTOEXEC.BAT may be modified as set forth in Table 1k. Subsequently, the partition image restoration program is run, restoring partition image 1513 to partition 1501. Thus, the present invention computer may be rebuilt without needing to reinstall the primary operating system.

Figure 16:
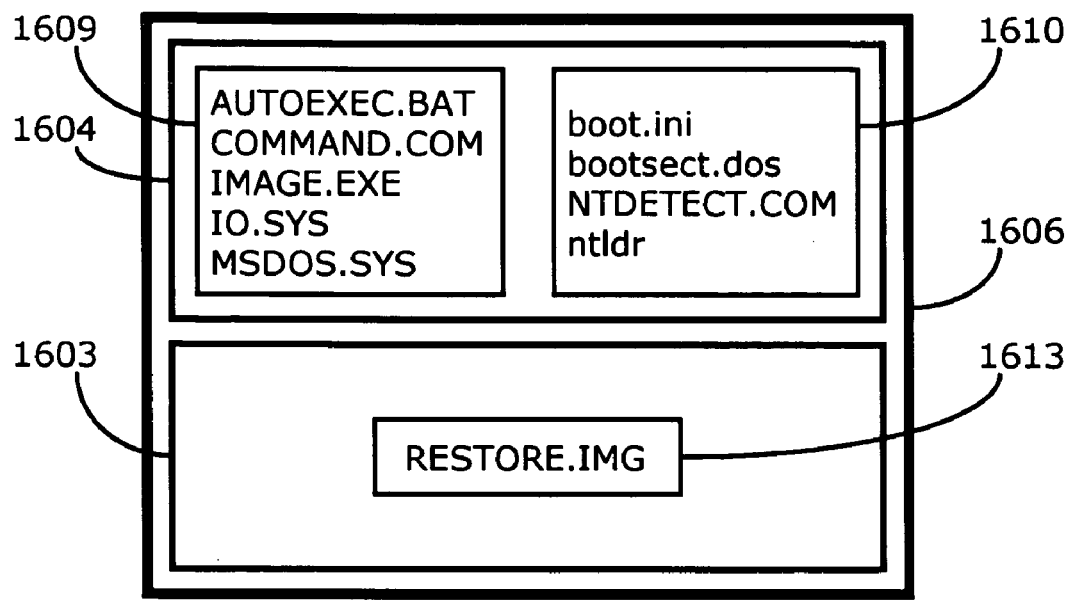
FIG. 16 is a block diagram of two mass storage devices having four partitions, two of which are located in each mass storage device, and one partition image.
Figure 16:
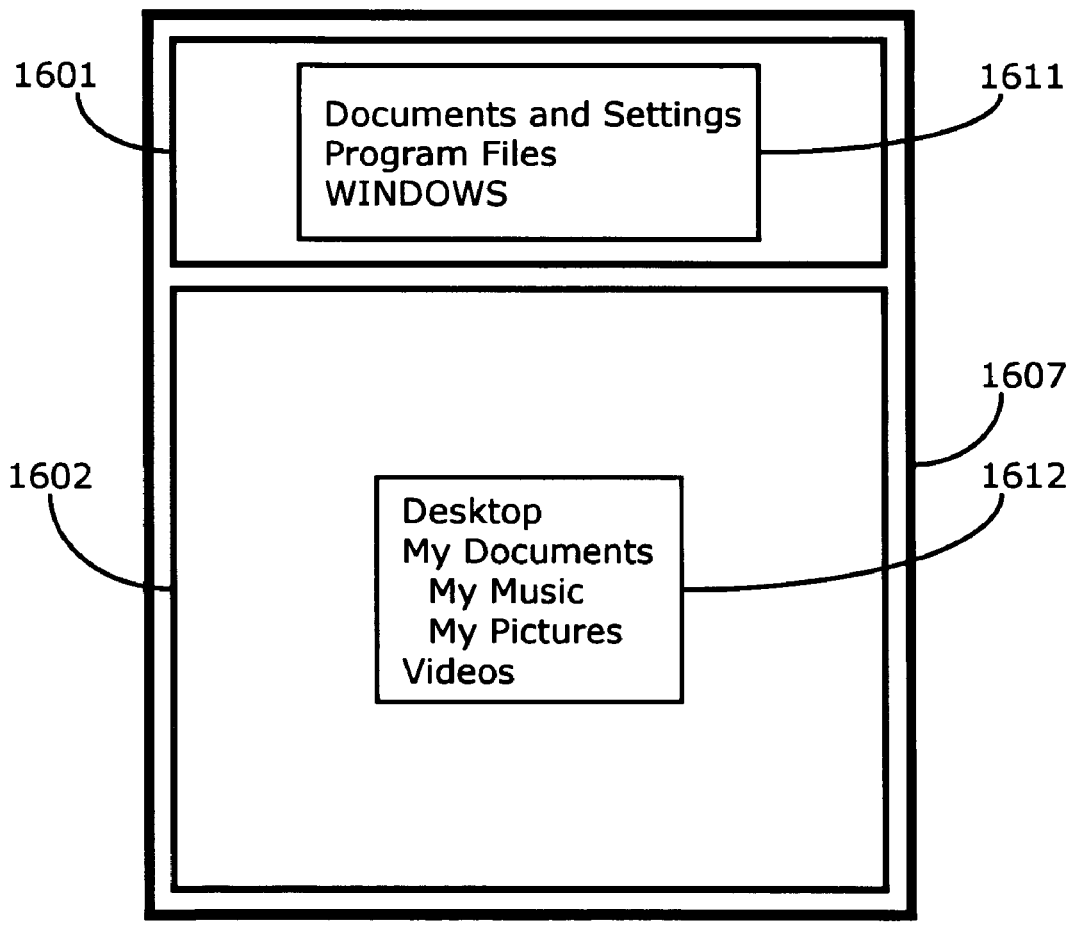

Referring now to FIG. 16, first mass storage device 1606 has partitions 1603 (set forth below) and 1604. Partition 1604 utilizes the FAT32 file system and has partition image restoration program and secondary operating system files 1609 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1n and 2, respectively, while "COMMAND.COM" and "IO.SYS" are obtained from a Windows 98SE boot floppy image. "IMAGE.EXE" is a partition image restoration program of TeraByte, Incorporated.

Partition 1604 further includes boot loader files 1610 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 1610 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Once the primary operating system has been installed, partition 1604 may have its drive letter ("C:") removed via a partition editing application program such as Partition Magic, thereby rendering it invisible to the primary operating system. If added security is desired, first mass storage device 1606 may be hardware-switched to a read-only state, making it impossible to compromise the present invention accidentally or maliciously.

Second mass storage device 1607 has partitions 1601 and 1602 (designated by Windows as drive letters "D:" and "E:", respectively). Partition 1601 may utilize either NTFS or the FAT32 file system and has folders 1611 as follows: "Documents and Settings", "Program Files", and "WINDOWS". "Documents and Settings", "Program Files", and "WINDOWS" are folders of the primary operating system.

Partition 1602 may utilize either NTFS or the FAT32 file system and has folders 1612 as follows: "Desktop", "My Documents", "My Music", "My Pictures", and "Videos". The primary operating system is configured to treat folders 1612 as standard locations for storing user-created files by way of registry code shown in Table 4b above.

Partition 1603 (hidden) may utilize either NTFS or the FAT32 file system and has partition image 1613, named "RESTORE.IMG", which is an image of partition 1601.

Figure 17:
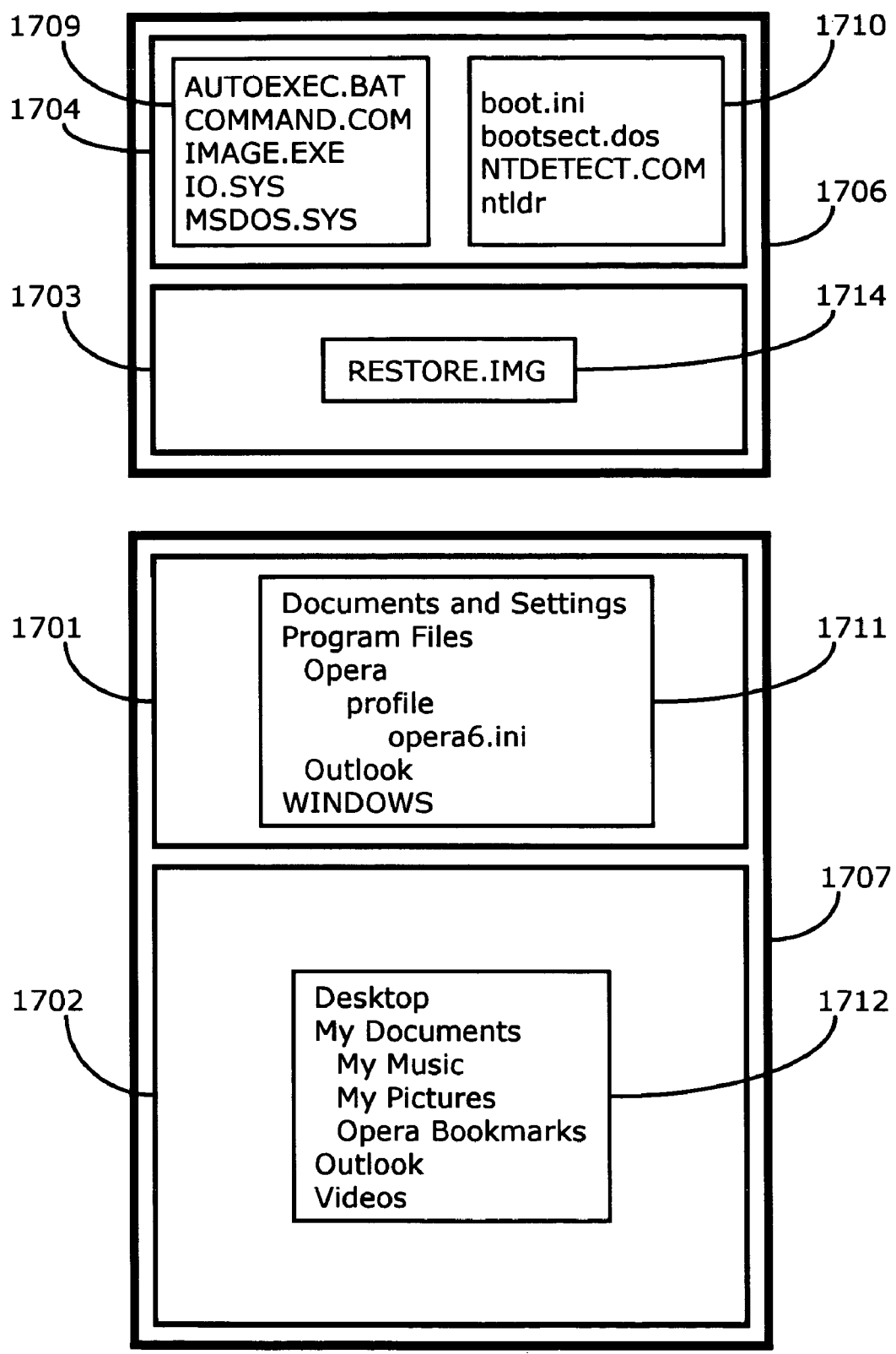
FIG. 17 is a block diagram of two mass storage devices having four partitions, two of which are located in each mass storage device, a plurality of application programs, and one partition image.

Referring now to FIG. 17, first mass storage device 1706 has partitions 1703 (set forth below) and 1704. Partition 1704 utilizes the FAT32 file system and has partition image restoration program and secondary operating system files 1709 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1n and 2, respectively, while "COMMAND.COM" and "IO.SYS" are obtained from a Windows 98SE boot floppy image. "IMAGE.EXE" is a partition image restoration program of TeraByte, Incorporated.

Partition 1704 further includes boot loader files 1710 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 1710 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Once the primary operating system has been installed, partition 1704 may have its drive letter ("C:") removed via a partition editing application program such as Partition Magic, thereby rendering it invisible to the primary operating system. If added security is desired, first mass storage device 1706 may be hardware-switched to a read-only state, making it impossible to compromise the present invention accidentally or maliciously.

Second mass storage device 1707 has partitions 1701 and 1702 (designated by Windows as drive letters "D:" and "E:", respectively). Partition 1701 may utilize either NTFS or the FAT32 file system and has folders 1711 as follows: "Documents and Settings", "Program Files", "Opera", "profile", "opera6.ini" (a configuration file), "Outlook", and "WINDOWS". "Documents and Settings", "Program Files", and "WINDOWS" are folders of the primary operating system. Within "Program Files" of folders 1711, "Outlook" is the main application program folder of the Outlook email client, and "Opera" is the main application program folder of the Opera web browser; within the "Opera" folder, a folder named "profile" contains configuration file "opera6.ini" (discussed below).

Partition 1702 may utilize either NTFS or the FAT32 file system and has folders 1712 as follows: "Desktop", "My Documents", "My Music", "My Pictures", "Opera Bookmarks", "Outlook", and "Videos". The primary operating system is configured to treat "Desktop", "My Documents", "My Music", "My Pictures", and "Videos" of folders 1712 as standard locations for storing user-created files by way of registry code shown in Table 4b above. The Opera web browser is configured to store bookmarks in the "Opera Bookmarks" folder of folders 1712 by way of INI code contained within file "opera6.ini" shown in Table 5b above, while the Outlook email client is configured to store email in the "Outlook" folder of folders 1712 by way of registry code shown in Table 6b above.

Partition 1703 (hidden) may utilize either NTFS or the FAT32 file system and has partition image 1714, named "RESTORE.IMG", which is an image of partition 1701.

Referring now to FIG. 18, first mass storage device 1806 has partitions 1803 (set forth below) and 1804. Partition 1804 utilizes the FAT32 file system and has partition image restoration program and secondary operating system files 1809 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1q and 2, respectively, while "COMMAND.COM" and "IO.SYS" are obtained from a Windows 98SE boot floppy image. "IMAGE.EXE" is a partition image restoration program of TeraByte, Incorporated.

Partition 1804 further includes boot loader files 1810 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 1810 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Once the primary operating system has been installed, partition 1804 may have its drive letter ("C:") removed via a partition editing application program such as Partition Magic, thereby rendering it invisible to the primary operating system. If added security is desired, first mass storage device 1806 may be hardware-switched to a read-only state, making it impossible to compromise the present invention accidentally or maliciously.

Second mass storage device 1807 has partitions 1801 and 1802 (designated by Windows as drive letters "D:" and "E:", respectively). Partition 1801 may utilize either NTFS or the FAT32 file system and has folders 1811 as follows: "Documents and Settings", "Program Files", "Opera", "profile", "opera6.ini" (a configuration file), "Outlook", and "WINDOWS". "Documents and Settings", "Program Files", and "WINDOWS" are folders of the primary operating system. Within "Program Files" of folders 1811, "Outlook" is the main application program folder of the Outlook email client, and "Opera" is the main application program folder of the Opera web browser; within the "Opera" folder, a folder named "profile" contains configuration file "opera6.ini" (discussed below).

Partition 1802 may utilize either NTFS or the FAT32 file system and has folders 1812 as follows: "Desktop", "My Documents", "My Music", "My Pictures", "Opera Bookmarks", "Outlook", and "Videos". The primary operating system is configured to treat "Desktop", "My Documents", "My Music", "My Pictures", and "Videos" of folders 1812 as standard locations for storing user-created files by way of registry code shown in Table 4b above. The Opera web browser is configured to store bookmarks in the "Opera Bookmarks" folder of folders 1812 by way of INI code contained within file "opera6.ini" shown in Table 5b above, while the Outlook email client is configured to store email in the "Outlook" folder of folders 1812 by way of registry code shown in Table 6b above.

Partition 1803 (hidden) may utilize either NTFS or the FAT32 file system and has partition images 1813 and 1814. Partition images 1813 and 1814, named "BARE.IMG" and "FULL.IMG", respectively, are images of partition 1801. Partition image 1813 excludes the plurality of application programs (e.g., the Opera web browser and the Outlook email client), making it resemble an image of partition 1601 of FIG. 16. Partition image 1814 includes the plurality of application programs of partition 1801. In the event that the present invention computer is to be rebuilt to include newer versions of application programs, the ASCII code of AUTOEXEC.BAT may be modified as set forth in Table 1p. Subsequently, the partition image restoration program is run, restoring partition image 1813 to partition 1801. Thus, the present invention computer may be rebuilt without needing to reinstall the primary operating system.

Referring now to FIG. 19, first mass storage device 1906 has partitions 1904 and 1905. Partition 1904 utilizes the FAT32 file system and has partition image restoration program and secondary operating system files 1909 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1i and 2, respectively, while "COMMAND.COM" and "IO.SYS" are obtained from a Windows 98SE boot floppy image. "IMAGE.EXE" is a partition image restoration program of TeraByte, Incorporated.

Partition 1904 further includes boot loader files 1910 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 1910 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Once the primary operating system has been installed, partition 1904 may have its drive letter ("C:") removed via a partition editing application program such as Partition Magic, thereby rendering it invisible to the primary operating system. If added security is desired, first mass storage device 1906 may be hardware-switched to a read-only state, making it impossible to compromise the present invention accidentally or maliciously.

Partition 1905 (hidden) may utilize either NTFS or the FAT32 file system and has partition image 1913 (set forth below).

Second mass storage device 1907 has partitions 1901 and 1902 (designated by Windows as drive letters "D:" and "E:", respectively), and partition 1903 (hidden). Partition 1901 may utilize either NTFS or the FAT32 file system and has folders 1911 as follows: "Documents and Settings", "Program Files", "Opera", "profile", "opera6.ini" (a configuration file), "Outlook", and "WINDOWS". "Documents and Settings", "Program Files", and "WINDOWS" are folders of the primary operating system. Within "Program Files" of folders 1911, "Outlook" is the main application program folder of the Outlook email client, and "Opera" is the main application program folder of the Opera web browser; within the "Opera" folder, a folder named "profile" contains configuration file "opera6.ini" (discussed below).

Partition 1902 may utilize either NTFS or the FAT32 file system and has folders 1912 as follows: "Desktop", "My Documents", "My Music", "My Pictures", "Opera Bookmarks", "Outlook", and "Videos". The primary operating system is configured to treat "Desktop", "My Documents", "My Music", "My Pictures", and "Videos" of folders 1912 as standard locations for storing user-created files by way of registry code shown in Table 4b above. The Opera web browser is configured to store bookmarks in the "Opera Bookmarks" folder of folders 1912 by way of INI code contained within file "opera6.ini" shown in Table 5b above, while the Outlook email client is configured to store email in the "Outlook" folder of folders 1912 by way of registry code shown in Table 6b above.

Partition 1903 may utilize either NTFS or the FAT32 file system and has partition image 1914. Partition images 1913 and 1914, named "BARE.IMG" and "FULL.IMG", respectively, are images of partition 1901. Partition image 1913 excludes the plurality of application programs (e.g., the Opera web browser and the Outlook email client), making it resemble an image of partition 1601 of FIG. 16. Partition image 1914 includes the plurality of application programs of partition 1901. In the event that the present invention computer is to be rebuilt to include newer versions of application programs, the ASCII code of AUTOEXEC.BAT may be modified as set forth in Table 1p. Subsequently, the partition image restoration program is run, restoring partition image 1913 to partition 1901. Thus, the present invention computer may be rebuilt without needing to reinstall the primary operating system.

In the forthcoming embodiments, yet another mass storage device is added to the present invention, and serves as the standard location for storing user-created files. Such an arrangement allows a user to move personal files from a first computer of the present invention to a second as easily as moving the mass storage device, giving the second present invention computer the same "Desktop" content, "My Documents" content, etc., as that which the user created on the first.

Referring now to FIG. 20, first mass storage device 2006 has partition 2004. Partition 2004 utilizes the FAT32 file system and has partition image restoration program and secondary operating system files 2009 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1r and 2, respectively, while "COMMAND.COM" and "IO.SYS" are obtained from a Windows 98SE boot floppy image. "IMAGE.EXE" is a partition image restoration program of TeraByte, Incorporated.

Partition 2004 further includes boot loader files 2010 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 2010 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Once the primary operating system has been installed, partition 2004 may have its drive letter ("C:") removed via a partition editing application program such as Partition Magic, thereby rendering it invisible to the primary operating system. If added security is desired, first mass storage device 2006 may be hardware-switched to a read-only state, making it impossible to compromise the present invention accidentally or maliciously.

Second mass storage device 2007 has partitions 2001 and 2003. Partition 2001 (designated by Windows as drive letter "D:") may utilize either NTFS or the FAT32 file system and has folders 2011 as follows: "Documents and Settings", "Program Files", and "WINDOWS". "Documents and Settings", "Program Files", and "WINDOWS" are folders of the primary operating system. Partition 2003 (hidden) may utilize either NTFS or the FAT32 file system and has partition image 2013, named "RESTORE.IMG", which is an image of partition 2001.

Third mass storage device 2008 has partition 2002 (designated by Windows as drive letter "E:"). Partition 2002 may utilize either NTFS or the FAT32 file system and has folders 2012 as follows: "Desktop", "My Documents", "My Music", "My Pictures", and "Videos". The primary operating system is configured to treat folders 2012 as standard locations for storing user-created files by way of registry code shown in Table 4b above.

Referring now to FIG. 21, first mass storage device 2106 has partition 2104. Partition 2104 utilizes the FAT32 file system and has partition image restoration program and secondary operating system files 2109 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1r and 2, respectively, while "COMMAND.COM" and "IO.SYS" are obtained from a Windows 98SE boot floppy image. "IMAGE.EXE" is a partition image restoration program of TeraByte, Incorporated.

Partition 2104 further includes boot loader files 2110 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 2110 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Once the primary operating system has been installed, partition 2104 may have its drive letter ("C:") removed via a partition editing application program such as Partition Magic, thereby rendering it invisible to the primary operating system. If added security is desired, first mass storage device 2106 may be hardware-switched to a read-only state, making it impossible to compromise the present invention accidentally or maliciously.

Second mass storage device 2107 has partitions 2101 and 2103. Partition 2101 (designated by Windows as drive letter "D:") may utilize either NTFS or the FAT32 file system and has folders 2111 as follows: "Documents and Settings", "Program Files", "Opera", "profile", "opera6.ini" (a configuration file), "Outlook", and "WINDOWS". "Documents and Settings", "Program Files", and "WINDOWS" are folders of the primary operating system. Within "Program Files" of folders 2111, "Outlook" is the main application program folder of the Outlook email client, and "Opera" is the main application program folder of the Opera web browser; within the "Opera" folder, a folder named "profile" contains configuration file "opera6.ini" (discussed below).

Partition 2103 (hidden) may utilize either NTFS or the FAT32 file system and has partition image 2114, named "RESTORE.IMG", which is an image of partition 2101.

Third mass storage device 2108 has partition 2102 (designated by Windows as drive letter "E:"). Partition 2102 may utilize either NTFS or the FAT32 file system and has folders 2112 as follows: "Desktop", "My Documents", "My Music", "My Pictures", "Opera Bookmarks", "Outlook", and "Videos". The primary operating system is configured to treat "Desktop", "My Documents", "My Music", "My Pictures", and "Videos" of folders 2112 as standard locations for storing user-created files by way of registry code shown in Table 4b above. The Opera web browser is configured to store bookmarks in the "Opera Bookmarks" folder of folders 2112 by way of INI code contained within file "opera6.ini" shown in Table 5b above, while the Outlook email client is configured to store email in the "Outlook" folder of folders 2112 by way of registry code shown in Table 6b above.

Referring now to FIG. 22, first mass storage device 2206 has partition 2204. Partition 2204 utilizes the FAT32 file system and has partition image restoration program and secondary operating system files 2209 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1t and 2, respectively, while "COMMAND.COM" and "IO.SYS" are obtained from a Windows 98SE boot floppy image. "IMAGE.EXE" is a partition image restoration program of TeraByte, Incorporated.

Partition 2204 further includes boot loader files 2210 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 2210 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Once the primary operating system has been installed, partition 2204 may have its drive letter ("C:") removed via a partition editing application program such as Partition Magic, thereby rendering it invisible to the primary operating system. If added security is desired, first mass storage device 2206 may be hardware-switched to a read-only state, making it impossible to compromise the present invention accidentally or maliciously.

Second mass storage device 2207 has partitions 2201 and 2203. Partition 2201 (designated by Windows as drive letter "D:") may utilize either NTFS or the FAT32 file system and has folders 2211 as follows: "Documents and Settings", "Program Files", "Opera", "profile", "opera6.ini" (a configuration file), "Outlook", and "WINDOWS". "Documents and Settings", "Program Files", and "WINDOWS" are folders of the primary operating system. Within "Program Files" of folders 2211, "Outlook" is the main application program folder of the Outlook email client, and "Opera" is the main application program folder of the Opera web browser; within the "Opera" folder, a folder named "profile" contains configuration file "opera6.ini" (discussed below).

Partition 2203 (hidden) may utilize either NTFS or the FAT32 file system and has partition images 2213 and 2214 (set forth below).

Third mass storage device 2208 has partition 2202 (designated by Windows as drive letter "E:"). Partition 2202 may utilize either NTFS or the FAT32 file system and has folders 2212 as follows: "Desktop", "My Documents", "My Music", "My Pictures", "Opera Bookmarks", "Outlook", and "Videos". The primary operating system is configured to treat "Desktop", "My Documents", "My Music", "My Pictures", and "Videos" of folders 2212 as standard locations for storing user-created files by way of registry code shown in Table 4b above. The Opera web browser is configured to store bookmarks in the "Opera Bookmarks" folder of folders 2212 by way of INI code contained within file "opera6.ini" shown in Table 5b above, while the Outlook email client is configured to store email in the "Outlook" folder of folders 2212 by way of registry code shown in Table 6b above.

Partition images 2213 and 2214, named "BARE.IMG" and "FULL.IMG", respectively, are images of partition 2201. Partition image 2213 excludes the plurality of application programs (e.g., the Opera web browser and the Outlook email client), making it resemble an image of partition 2001 of FIG. 20. Partition image 2214 includes the plurality of application programs of partition 2201. In the event that the present invention computer is to be rebuilt to include newer versions of application programs, the ASCII code of AUTOEXEC.BAT may be modified as set forth in Table 1s. Subsequently, the partition image restoration program is run, restoring partition image 2213 to partition 2201. Thus, the present invention computer may be rebuilt without needing to reinstall the primary operating system.

Figure 23:
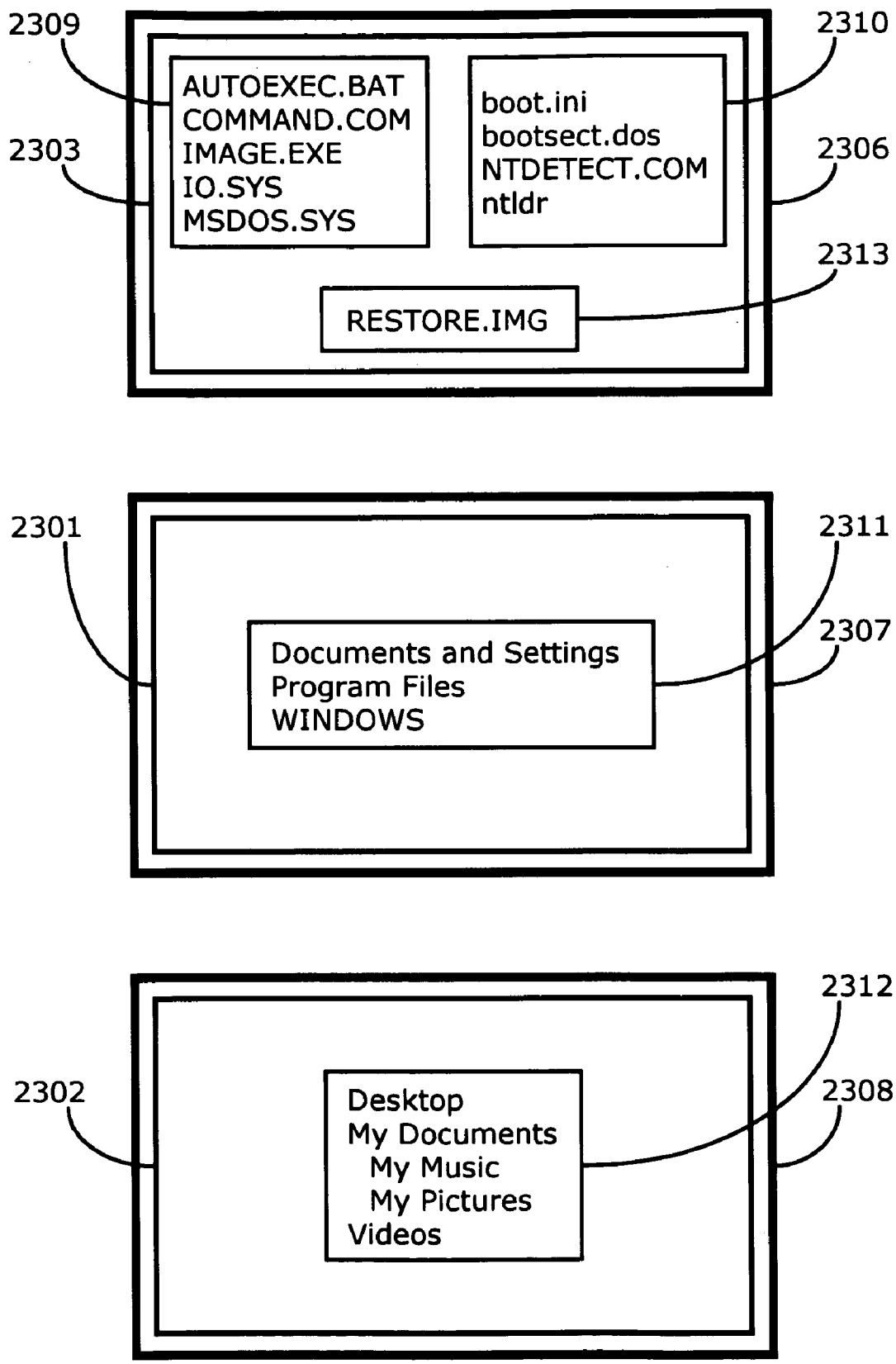
FIG. 23 is a block diagram of three mass storage devices having three partitions and one partition image.

Referring now to FIG. 23, first mass storage device 2306 has partition 2303. Partition 2303 utilizes the FAT32 file system and has partition image restoration program and secondary operating system files 2309 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1j and 2, respectively, while "COMMAND.COM" and "IO.SYS" are obtained from a Windows 98SE boot floppy image. "IMAGE.EXE" is a partition image restoration program of TeraByte, Incorporated.

Partition 2303 further includes boot loader files 2310 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 2310 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Partition 2303 further has partition image 2313, named "RESTORE.IMG", which is an image of partition 2301 of second mass storage device 2307 (set forth below).

Once the primary operating system has been installed, partition 2303 may have its drive letter ("C:") removed via a partition editing application program such as Partition Magic, thereby rendering it invisible to the primary operating system. If added security is desired, first mass storage device 2306 may be hardware-switched to a read-only state, making it impossible to compromise the present invention accidentally or maliciously.

Second mass storage device 2307 has partition 2301 (designated by Windows as drive letter "D:"). Partition 2301 may utilize either NTFS or the FAT32 file system and has folders 2311 as follows: "Documents and Settings", "Program Files", and "WINDOWS". "Documents and Settings", "Program Files", and "WINDOWS" are folders of the primary operating system.

Third mass storage device 2308 has partition 2302 (designated by Windows as drive letter "E:"). Partition 2302 may utilize either NTFS or the FAT32 file system and has folders 2312 as follows: "Desktop", "My Documents", "My Music", "My Pictures", and "Videos". The primary operating system is configured to treat folders 2312 as standard locations for storing user-created files by way of registry code shown in Table 4b above.

Figure 24:
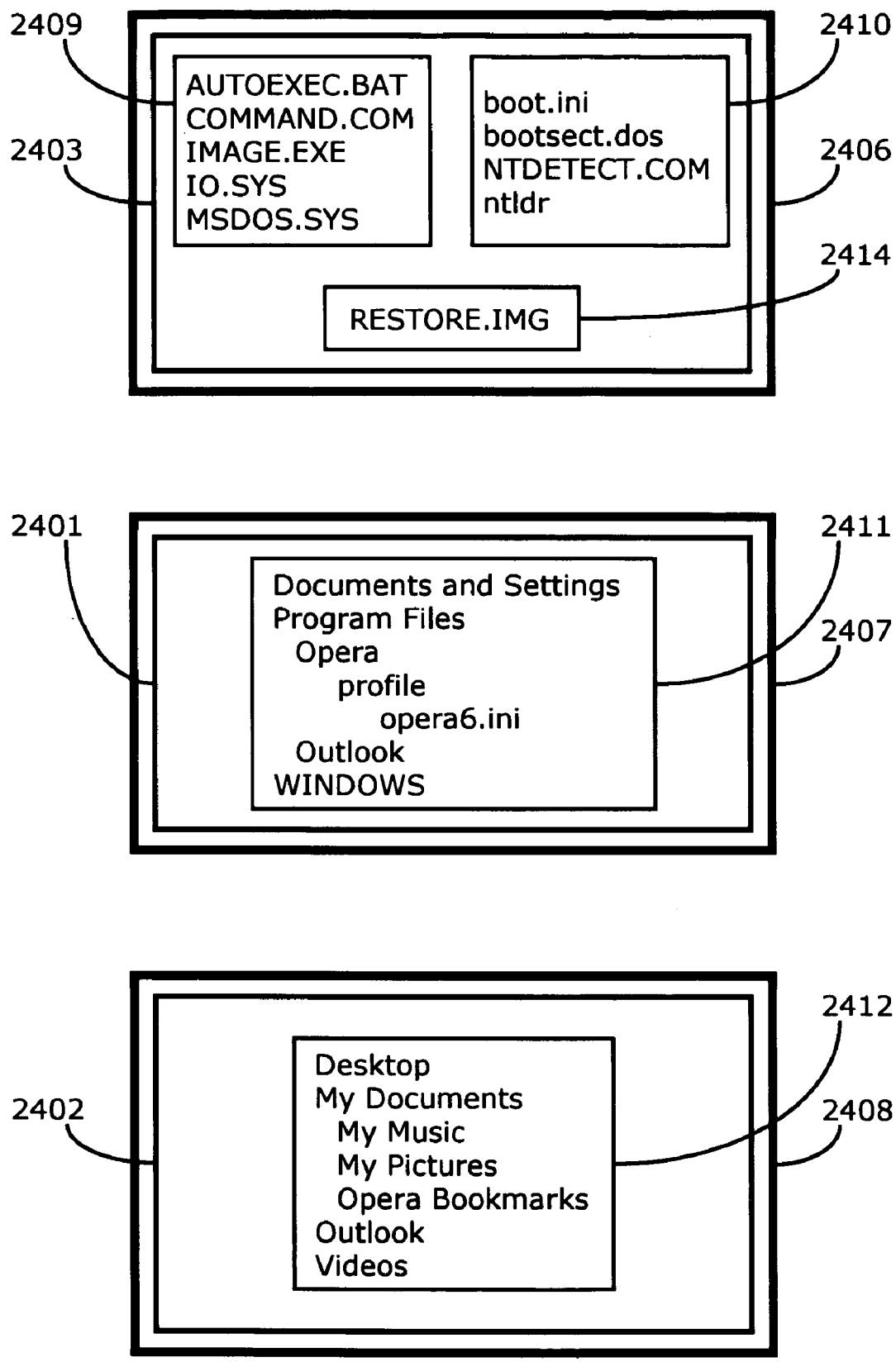
FIG. 24 is a block diagram of three mass storage devices having three partitions, a plurality of application programs, and one partition image.

Referring now to FIG. 24, first mass storage device 2406 has partition 2403. Partition 2403 utilizes the FAT32 file system and has partition image restoration program and secondary operating system files 2409 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1j and 2, respectively, while "COMMAND.COM" and "IO.SYS" are obtained from a Windows 98SE boot floppy image. "IMAGE.EXE" is a partition image restoration program of TeraByte, Incorporated.

Partition 2403 further includes boot loader files 2410 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 2410 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Partition 2403 further has partition image 2414, named "RESTORE.IMG", which is an image of partition 2401 of second mass storage device 2407 (set forth below).

Once the primary operating system has been installed, partition 2403 may have its drive letter ("C:") removed via a partition editing application program such as Partition Magic, thereby rendering it invisible to the primary operating system. If added security is desired, first mass storage device 2406 may be hardware-switched to a read-only state, making it impossible to compromise the present invention accidentally or maliciously.

Second mass storage device 2407 has partition 2401 (designated by Windows as drive letter "D:"). Partition 2401 may utilize either NTFS or the FAT32 file system and has folders 2411 as follows: "Documents and Settings", "Program Files", "Opera", "profile", "opera6.ini" (a configuration file), "Outlook", and "WINDOWS". "Documents and Settings", "Program Files", and "WINDOWS" are folders of the primary operating system. Within "Program Files" of folders 2411, "Outlook" is the main application program folder of the Outlook email client, and "Opera" is the main application program folder of the Opera web browser; within the "Opera" folder, a folder named "profile" contains configuration file "opera6.ini" (discussed below).

Third mass storage device 2408 has partition 2402 (designated by Windows as drive letter "E:"). Partition 2402 may utilize either NTFS or the FAT32 file system and has folders 2412 as follows: "Desktop", "My Documents", "My Music", "My Pictures", "Opera Bookmarks", "Outlook", and "Videos". The primary operating system is configured to treat "Desktop", "My Documents", "My Music", "My Pictures", and "Videos" of folders 2412 as standard locations for storing user-created files by way of registry code shown in Table 4b above. The Opera web browser is configured to store bookmarks in the "Opera Bookmarks" folder of folders 2412 by way of INI code contained within file "opera6.ini" shown in Table 5b above, while the Outlook email client is configured to store email in the "Outlook" folder of folders 2412 by way of registry code shown in Table 6b above.

Referring now to FIG. 25, first mass storage device 2506 has partition 2503. Partition 2503 utilizes the FAT32 file system and has partition image restoration program and secondary operating system files 2509 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1m and 2, respectively, while "COMMAND.COM" and "IO.SYS" are obtained from a Windows 98SE boot floppy image. "IMAGE.EXE" is a partition image restoration program of TeraByte, Incorporated.

Partition 2503 further includes boot loader files 2510 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 2510 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Partition 2503 further has partition images 2513 and 2514 (set forth below).

Once the primary operating system has been installed, partition 2503 may have its drive letter ("C:") removed via a partition editing application program such as Partition Magic, thereby rendering it invisible to the primary operating system. If added security is desired, first mass storage device 2506 may be hardware-switched to a read-only state, making it impossible to compromise the present invention accidentally or maliciously.

Second mass storage device 2507 has partition 2501 (designated by Windows as drive letter "D:"). Partition 2501 may utilize either NTFS or the FAT32 file system and has folders 2511 as follows: "Documents and Settings", "Program Files", "Opera", "profile", "opera6.ini" (a configuration file), "Outlook", and "WINDOWS". "Documents and Settings", "Program Files", and "WINDOWS" are folders of the primary operating system. Within "Program Files" of folders 2511, "Outlook" is the main application program folder of the Outlook email client, and "Opera" is the main application program folder of the Opera web browser; within the "Opera" folder, a folder named "profile" contains configuration file "opera6.ini" (discussed below).

Third mass storage device 2508 has partition 2502 (designated by Windows as drive letter "E:"). Partition 2502 may utilize either NTFS or the FAT32 file system and has folders 2512 as follows: "Desktop", "My Documents", "My Music", "My Pictures", "Opera Bookmarks", "Outlook", and "Videos". The primary operating system is configured to treat "Desktop", "My Documents", "My Music", "My Pictures", and "Videos" of folders 2512 as standard locations for storing user-created files by way of registry code shown in Table 4b above. The Opera web browser is configured to store bookmarks in the "Opera Bookmarks" folder of folders 2512 by way of INI code contained within file "opera6.ini" shown in Table 5b above, while the Outlook email client is configured to store email in the "Outlook" folder of folders 2512 by way of registry code shown in Table 6b above.

Partition images 2513 and 2514, named "BARE.IMG" and "FULL.IMG", respectively, are images of partition 2501. Partition image 2513 excludes the plurality of application programs (e.g., the Opera web browser and the Outlook email client), making it resemble an image of partition 2301 of FIG.

23. Partition image 2514 includes the plurality of application programs of partition 2501. In the event that the present invention computer is to be rebuilt to include newer versions of application programs, the ASCII code of AUTOEXEC.BAT may be modified as set forth in Table 1k. Subsequently, the partition image restoration program is run, restoring partition image 2513 to partition 2501. Thus, the present invention computer may be rebuilt without needing to reinstall the primary operating system.

Referring now to FIG. 26, first mass storage device 2606 has partition 2604. Partition 2604 utilizes the FAT32 file system and has partition image restoration program and secondary operating system files 2609 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1t and 2, respectively, while "COMMAND.COM" and "IO.SYS" are obtained from a Windows 98SE boot floppy image. "IMAGE.EXE" is a partition image restoration program of TeraByte, Incorporated.

Partition 2604 further includes boot loader files 2610 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 2610 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Partition 2604 further has partition image 2613 (set forth below).

Once the primary operating system has been installed, partition 2604 may have its drive letter ("C:") removed via a partition editing application program such as Partition Magic, thereby rendering it invisible to the primary operating system. If added security is desired, first mass storage device 2606 may be hardware-switched to a read-only state, making it impossible to compromise the present invention accidentally or maliciously.

Second mass storage device 2607 has partitions 2601 and 2603. Partition 2601 (designated by Windows as drive letter "D:") may utilize either NTFS or the FAT32 file system and has folders 2611 as follows: "Documents and Settings", "Program Files", "Opera", "profile", "opera6.ini" (a configuration file), "Outlook", and "WINDOWS". "Documents and Settings", "Program Files", and "WINDOWS" are folders of the primary operating system. Within "Program Files" of folders 2611, "Outlook" is the main application program folder of the Outlook email client, and "Opera" is the main application program folder of the Opera web browser; within the "Opera" folder, a folder named "profile" contains configuration file "opera6.ini" (discussed below).

Partition 2603 (hidden) may utilize either NTFS or the FAT32 file system and has partition image 2614 (set forth below).

Third mass storage device 2608 has partition 2602 (designated by Windows as drive letter "E:"). Partition 2602 may utilize either NTFS or the FAT32 file system and has folders 2612 as follows: "Desktop", "My Documents", "My Music", "My Pictures", "Opera Bookmarks", "Outlook", and "Videos". The primary operating system is configured to treat "Desktop", "My Documents", "My Music", "My Pictures", and "Videos" of folders 2612 as standard locations for storing user-created files by way of registry code shown in Table 4b above. The Opera web browser is configured to store bookmarks in the "Opera Bookmarks" folder of folders 2612 by way of INI code contained within file "opera6.ini" shown in Table 5b above, while the Outlook email client is configured to store email in the "Outlook" folder of folders 2612 by way of registry code shown in Table 6b above.

Partition images 2613 and 2614, named "BARE.IMG" and "FULL.IMG", respectively, are images of partition 2601. Partition image 2613 excludes the plurality of application programs (e.g., the Opera web browser and the Outlook email client), making it resemble an image of partition 2301 of FIG. 23. Partition image 2614 includes the plurality of application programs of partition 2601. In the event that the present invention computer is to be rebuilt to include newer versions of application programs, the ASCII code of AUTOEXEC.BAT may be modified as set forth in Table 1k. Subsequently, the partition image restoration program is run, restoring partition image 2613 to partition 2601. Thus, the present invention computer may be rebuilt without needing to reinstall the primary operating system.

Figure 27:
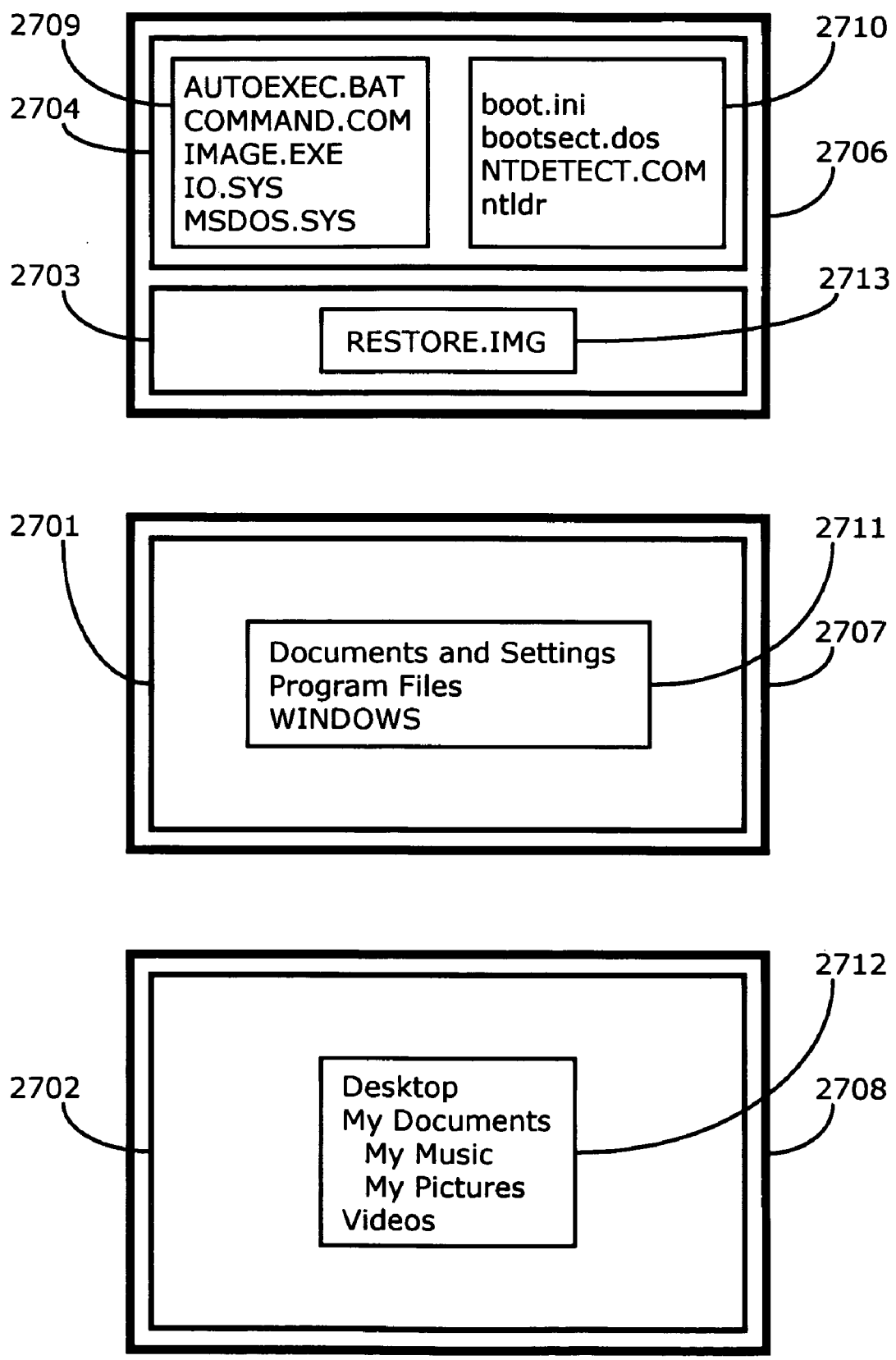
FIG. 27 is a block diagram of three mass storage devices having four partitions, two of which are located on the first mass storage device, and one partition image.

Referring now to FIG. 27, first mass storage device 2706 has partitions 2703 (set forth below) and 2704. Partition 2704 utilizes the FAT32 file system and has partition image restoration program and secondary operating system files 2709 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1n and 2, respectively, while "COMMAND.COM" and "IO.SYS" are obtained from a Windows 98SE boot floppy image. "IMAGE.EXE" is a partition image restoration program of TeraByte, Incorporated.

Partition 2704 further includes boot loader files 2710 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 2710 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Once the primary operating system has been installed, partition 2704 may have its drive letter ("C:") removed via a partition editing application program such as Partition Magic, thereby rendering it invisible to the primary operating system. If added security is desired, first mass storage device 2706 may be hardware-switched to a read-only state, making it impossible to compromise the present invention accidentally or maliciously.

Second mass storage device 2707 has partition 2701 (designated by Windows as drive letter "D:"). Partition 2701 may utilize either NTFS or the FAT32 file system and has folders 2711 as follows: "Documents and Settings", "Program Files", and "WINDOWS". "Documents and Settings", "Program Files", and "WINDOWS" are folders of the primary operating system.

Third mass storage device 2708 has partition 2702 (designated by Windows as drive letter "E:"). Partition 2702 may utilize either NTFS or the FAT32 file system and has folders 2712 as follows: "Desktop", "My Documents", "My Music", "My Pictures", and "Videos". The primary operating system is configured to treat folders 2712 as standard locations for storing user-created files by way of registry code shown in Table 4b above.

Partition 2703 (hidden) may utilize either NTFS or the FAT32 file system and has partition image 2713, named "RESTORE.IMG", which is an image of partition 2701.

Figure 28:
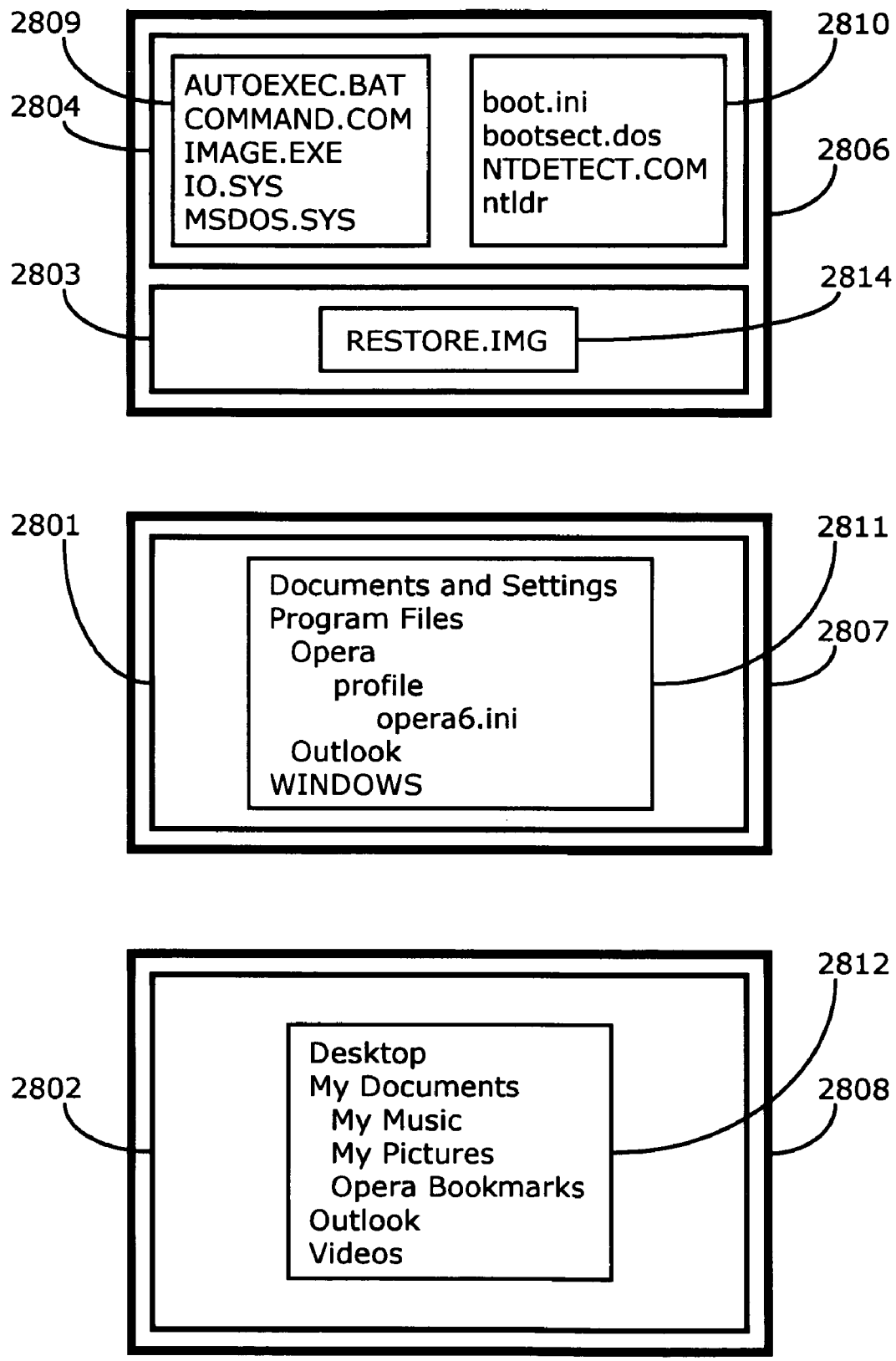
FIG. 28 is a block diagram of three mass storage devices having four partitions, two of which are located on the first mass storage device, a plurality of application programs, and one partition image.

Referring now to FIG. 28, first mass storage device 2806 has partitions 2803 (set forth below) and 2804. Partition 2804 utilizes the FAT32 file system and has partition image restoration program and secondary operating system files 2809 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1n and 2, respectively, while "COMMAND.COM" and "IO.SYS" are obtained from a Windows 98SE boot floppy image. "IMAGE.EXE" is a partition image restoration program of TeraByte, Incorporated.

Partition 2804 further includes boot loader files 2810 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 2810 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Once the primary operating system has been installed, partition 2804 may have its drive letter ("C:") removed via a partition editing application program such as Partition Magic, thereby rendering it invisible to the primary operating system. If added security is desired, first mass storage device 2806 may be hardware-switched to a read-only state, making it impossible to compromise the present invention accidentally or maliciously.

Second mass storage device 2807 has partition 2801 (designated by Windows as drive letter "D:"). Partition 2801 may utilize either NTFS or the FAT32 file system and has folders 2811 as follows: "Documents and Settings", "Program Files", "Opera", "profile", "opera6.ini" (a configuration file), "Outlook", and "WINDOWS". "Documents and Settings", "Program Files", and "WINDOWS" are folders of the primary operating system. Within "Program Files" of folders 2811, "Outlook" is the main application program folder of the Outlook email client, and "Opera" is the main application program folder of the Opera web browser; within the "Opera" folder, a folder named "profile" contains configuration file "opera6.ini" (discussed below).

Third mass storage device 2808 has partition 2802 (designated by Windows as drive letter "E:"). Partition 2802 may utilize either NTFS or the FAT32 file system and has folders 2812 as follows: "Desktop", "My Documents", "My Music", "My Pictures", "Opera Bookmarks", "Outlook", and "Videos". The primary operating system is configured to treat "Desktop", "My Documents", "My Music", "My Pictures", and "Videos" of folders 2812 as standard locations for storing user-created files by way of registry code shown in Table 4b above. The Opera web browser is configured to store bookmarks in the "Opera Bookmarks" folder of folders 2812 by way of INI code contained within file "opera6.ini" shown in Table 5b above, while the Outlook email client is configured to store email in the "Outlook" folder of folders 2812 by way of registry code shown in Table 6b above.

Partition 2803 (hidden) may utilize either NTFS or the FAT32 file system and has partition image 2814, named "RESTORE.IMG", which is an image of partition 2801.

Referring now to FIG. 29, first mass storage device 2906 has partitions 2903 (set forth below) and 2904. Partition 2904 utilizes the FAT32 file system and has partition image restoration program and secondary operating system files 2909 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1q and 2, respectively, while "COMMAND.COM" and "IO.SYS" are obtained from a Windows 98SE boot floppy image. "IMAGE.EXE" is a partition image restoration program of TeraByte, Incorporated.

Partition 2904 further includes boot loader files 2910 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 2910 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Once the primary operating system has been installed, partition 2904 may have its drive letter ("C:") removed via a partition editing application program such as Partition Magic, thereby rendering it invisible to the primary operating system. If added security is desired, first mass storage device 2906 may be hardware-switched to a read-only state, making it impossible to compromise the present invention accidentally or maliciously.

Second mass storage device 2907 has partition 2901 (designated by Windows as drive letter "D:"). Partition 2901 may utilize either NTFS or the FAT32 file system and has folders 2911 as follows: "Documents and Settings", "Program Files", "Opera", "profile", "opera6.ini" (a configuration file), "Outlook", and "WINDOWS". "Documents and Settings", "Program Files", and "WINDOWS" are folders of the primary operating system. Within "Program Files" of folders 2911, "Outlook" is the main application program folder of the Outlook email client, and "Opera" is the main application program folder of the Opera web browser; within the "Opera" folder, a folder named "profile" contains configuration file "opera6.ini" (discussed below).

Third mass storage device 2908 has partition 2902 (designated by Windows as drive letter "E:"). Partition 2902 may utilize either NTFS or the FAT32 file system and has folders 2912 as follows: "Desktop", "My Documents", "My Music", "My Pictures", "Opera Bookmarks", "Outlook", and "Videos". The primary operating system is configured to treat "Desktop", "My Documents", "My Music", "My Pictures", and "Videos" of folders 2912 as standard locations for storing user-created files by way of registry code shown in Table 4b above. The Opera web browser is configured to store bookmarks in the "Opera Bookmarks" folder of folders 2912 by way of INI code contained within file "opera6.ini" shown in Table 5b above, while the Outlook email client is configured to store email in the "Outlook" folder of folders 2912 by way of registry code shown in Table 6b above.

Partition 2903 (hidden) may utilize either NTFS or the FAT32 file system and has partition images 2913 and 2914. Partition images 2913 and 2914, named "BARE.IMG" and "FULL.IMG", respectively, are images of partition 2901.

Partition image 2913 excludes the plurality of application programs (e.g., the Opera web browser and the Outlook email client), making it resemble an image of partition 2701 of FIG. 27. Partition image 2914 includes the plurality of application programs of partition 2901. In the event that the present invention computer is to be rebuilt to include newer versions of application programs, the ASCII code of AUTOEXEC.BAT may be modified as set forth in Table 1p. Subsequently, the partition image restoration program is run, restoring partition image 2913 to partition 2901. Thus, the present invention computer may be rebuilt without needing to reinstall the primary operating system.

Referring now to FIG. 30, first mass storage device 3006 has partitions 3004 and 3005. Partition 3004 utilizes the FAT32 file system and has partition image restoration program and secondary operating system files 3009 as follows: "AUTOEXEC.BAT", "COMMAND.COM", "IMAGE.EXE", "IO.SYS", and "MSDOS.SYS". "AUTOEXEC.BAT" and "MSDOS.SYS" contain ASCII code set forth in Tables 1t and 2, respectively, while "COMMAND.COM" and "IO.SYS" are obtained from a Windows 98SE boot floppy image. "IMAGE.EXE" is a partition image restoration program of TeraByte, Incorporated.

Partition 3004 further includes boot loader files 3010 as follows: "boot.ini", "bootsect.dos", "NTDETECT.COM", and "ntldr". "Bootsect.dos" is created by the Windows XP installer based upon the preexistence of the Windows 98SE files. "Bootsect.dos" allows boot loader files 3010 to simulate the boot procedure of Windows 98SE. Boot loader "ntldr" is responsive to boot configuration file "boot.ini"; the Windows XP installer appends "boot.ini" so that a prompt screen is shown at boot that includes a thirty-second opportunity for selecting the Windows 98SE files it detected. The thirty-second period and the text of the prompt screen can be changed by editing the text in "boot.ini", as shown in Table 3 above.

Once the primary operating system has been installed, partition 3004 may have its drive letter ("C:") removed via a partition editing application program such as Partition Magic, thereby rendering it invisible to the primary operating system. If added security is desired, first mass storage device 3006 may be hardware-switched to a read-only state, making it impossible to compromise the present invention accidentally or maliciously.

Partition 3005 (hidden) may utilize either NTFS or the FAT32 file system and has partition image 3014 (set forth below).

Second mass storage device 3007 has partitions 3001 (designated by Windows as drive letter "D:") and 3003 (hidden). Partition 3001 may utilize either NTFS or the FAT32 file system and has folders 3011 as follows: "Documents and Settings", "Program Files", "Opera", "profile", "opera6.ini" (a configuration file), "Outlook", and "WINDOWS". "Documents and Settings", "Program Files", and "WINDOWS" are folders of the primary operating system. Within "Program Files" of folders 3011, "Outlook" is the main application program folder of the Outlook email client, and "Opera" is the main application program folder of the Opera web browser; within the "Opera" folder, a folder named "profile" contains configuration file "opera6.ini" (discussed below).

Partition 3003 may utilize either NTFS or the FAT32 file system and has partition image 3013, set forth below.

Third mass storage device 3008 has partition 3002 (designated by Windows as drive letter "E:"). Partition 3002 may utilize either NTFS or the FAT32 file system and has folders 3012 as follows: "Desktop", "My Documents", "My Music", "My Pictures", "Opera Bookmarks", "Outlook", and "Videos". The primary operating system is configured to treat "Desktop", "My Documents", "My Music", "My Pictures", and "Videos" of folders 3012 as standard locations for storing user-created files by way of registry code shown in Table 4b above. The Opera web browser is configured to store bookmarks in the "Opera Bookmarks" folder of folders 3012 by way of INI code contained within file "opera6.ini" shown in Table 5b above, while the Outlook email client is configured to store email in the "Outlook" folder of folders 3012 by way of registry code shown in Table 6b above.

Partition images 3013 and 3014, named "BARE.IMG" and "FULL.IMG", respectively, are images of partition 3001. Partition image 3013 excludes the plurality of application programs (e.g., the Opera web browser and the Outlook email client), making it resemble an image of partition 2701 of FIG. 27. Partition image 3014 includes the plurality of application programs of partition 3001. In the event that the present invention computer is to be rebuilt to include newer versions of application programs, the ASCII code of AUTOEXEC-.BAT may be modified as set forth in Table 1p. Subsequently, the partition image restoration program is run, restoring partition image 3013 to partition 3001. Thus, the present invention computer may be rebuilt without needing to reinstall the primary operating system.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A computer with bootable restoration, which comprises:
  a physical computer member that includes:
  (a) at least one mass storage device;
  (b) at least two mass storage device partitions in said at least one mass storage device, including first and second partitions;
  (c) a partition image restoration program;
  (d) at least one partition image;
  (e) at least one human interface device;
  (f) a primary operating system that includes a graphical user interface;
  (g) a secondary operating system; and,
  (h) a boot loader responsive to said at least one human interface device, said boot loader providing opportunity for selecting between said primary operating system and said secondary operating system;
  wherein said primary operating system resides on said first partition and said primary operating system is configured so that its standard locations for storing user-created files are folders rooted on at least one of any partition other than said first partition, said at least one partition image is an image of said first partition, said at least one partition image resides on at least one of any partition other than said first partition; and,
  wherein if no opportunity is taken by a user to select said secondary operating system within a predefined time, said computer loads said primary operating system; and,
  wherein when said secondary operating system is selected by a user within said predefined time, said computer automatically executes said partition image restoration program, which restores said partition image to said first partition.

2. The computer with bootable restoration of claim 1 wherein said primary operating system configuration includes registry data that defines standard locations for storing user-created files as folders rooted on at least one of any partition other than said first partition.

3. The computer with bootable restoration of claim 1 wherein said at least two mass storage device partitions is at least three mass storage device partitions, including a third partition; said at least one partition image resides on said third partition; said third partition is hidden from and inaccessible to said primary operating system.

4. The computer with bootable restoration of claim 3 wherein said primary operating system configuration includes registry data that defines standard locations for storing user-created files as folders rooted on said second partition.

5. The computer with bootable restoration of claim 1 wherein a plurality of application programs has been installed on said primary operating system.

6. The computer with bootable restoration of claim 5 wherein said at least one partition image is at least two partition images including first and second partition images, said first partition image excluding said plurality of application programs, and said second partition image including said plurality of application programs.

7. The computer with bootable restoration of claim 3 wherein a plurality of application programs has been installed on said primary operating system.

8. The computer with bootable restoration of claim 7 wherein said at least one partition image is at least two partition images including first and second partition images, said first partition image excluding said plurality of application programs, and said second partition image including said plurality of application programs.

9. A computer with bootable restoration, which comprises: a physical computer member that includes:
(i) two mass storage devices, being a first mass storage device and a second mass storage device;
(j) at least three mass storage device partitions located in at least one of said two mass storage devices, including first, second, and third partitions;
(k) a partition image restoration program;
(l) at least one partition image;
(m) at least one human interface device;
(n) a primary operating system that includes a graphical user interface;
(o) a secondary operating system; and,
(p) a boot loader responsive to said at least one human interface device, said boot loader providing opportunity for selecting between said primary operating system and said secondary operating system;
wherein said primary operating system resides on said first partition and said primary operating system is configured so that its standard locations for storing user-created files are folders rooted on at least one of any partition other than said first partition, said at least one partition image is an image of said first partition, said at least one partition image resides on said third partition, and said third partition is hidden from and inaccessible to said primary operating system; and,
wherein if no opportunity is taken by a user to select said secondary operating system within a predefined time, said computer loads said primary operating system; and, wherein when said secondary operating system is selected by a user within said predefined time, said computer automatically executes said partition image restoration program, which restores said partition image to said first partition.

10. The computer with bootable restoration of claim 9 wherein said primary operating system configuration includes registry data that defines standard locations for storing user-created files as folders rooted on at least one of any partition other than said first partition.

11. The computer with bootable restoration of claim 9 wherein said primary operating system configuration includes registry data that defines standard locations for storing user-created files as folders rooted on said second partition.

12. The computer with bootable restoration of claim 9 wherein a plurality of application programs has been installed on said primary operating system.

13. The computer with bootable restoration of claim 12 wherein said at least one partition image is at least two partition images including first and second partition images, said first partition image excluding said plurality of application programs, and said second partition image including said plurality of application programs.

14. The computer with bootable restoration of claim 9 wherein said boot loader, said secondary operating system, and said partition image restoration program reside on said first mass storage device; said first, second, and third partitions reside on said second mass storage device.

15. The computer with bootable restoration of claim 12 wherein said boot loader, said secondary operating system, and said partition image restoration program reside on said first mass storage device; said first, second, and third partitions reside on said second mass storage device.

16. The computer with bootable restoration of claim 13 wherein said boot loader, said secondary operating system, and said partition image restoration program reside on said first mass storage device; said first, second, and third partitions reside on said second mass storage device.

17. The computer with bootable restoration of claim 9 wherein said third partition resides on said first mass storage device; said boot loader, said secondary operating system, and said partition image restoration program reside on said third partition; said first and second partitions reside on said second mass storage device.

18. The computer with bootable restoration of claim 12 wherein said third partition resides on said first mass storage device; said boot loader, said secondary operating system, and said partition image restoration program reside on said third partition; said first and second partitions reside on said second mass storage device.

19. The computer with bootable restoration of claim 13 wherein said first partition image, said boot loader, said secondary operating system, and said partition image restoration program reside on said first mass storage device; said first, second, and third partitions reside on said second mass storage device.

20. The computer with bootable restoration of claim 9 wherein said at least three mass storage device partitions is at least four mass storage device partitions including a fourth partition; said third and fourth partitions reside on said first mass storage device; said boot loader, said secondary operating system, and said partition image restoration program reside on said fourth partition; said first and second partitions reside on said second mass storage device.

21. The computer with bootable restoration of claim 12 wherein said at least three mass storage device partitions is at least four mass storage device partitions including a fourth partition; said third and fourth partitions reside on said first mass storage device; said boot loader, said secondary operating system, and said partition image restoration program reside on said fourth partition; said first and second partitions reside on said second mass storage device.

22. The computer with bootable restoration of claim 13 wherein said at least three mass storage device partitions is at least four mass storage device partitions including a fourth partition; said third and fourth partitions reside on said first mass storage device; said boot loader, said secondary operating system, and said partition image restoration program reside on said fourth partition; said first and second partitions reside on said second mass storage device.

23. The computer with bootable restoration of claim 9 wherein said at least three mass storage device partitions is at least five mass storage device partitions including fourth and fifth partitions; said fourth and fifth partitions reside on said first mass storage device; said boot loader, said secondary operating system, and said partition image restoration program reside on said fourth partition; said first partition image resides on said fifth partition; said first, second, and third partitions reside on said second mass storage device.

24. The computer with bootable restoration of claim 12 wherein said at least three mass storage device partitions is at least five mass storage device partitions including fourth and fifth partitions; said fourth and fifth partitions reside on said first mass storage device; said boot loader, said secondary operating system, and said partition image restoration program reside on said fourth partition; said first partition image resides on said fifth partition; said first, second, and third partitions reside on said second mass storage device.

25. The computer with bootable restoration of claim 13 wherein said at least three mass storage device partitions is at least five mass storage device partitions including fourth and fifth partitions; said fourth and fifth partitions reside on said first mass storage device; said boot loader, said secondary operating system, and said partition image restoration program reside on said fourth partition; said first partition image resides on said fifth partition; said first, second, and third partitions reside on said second mass storage device.

26. A computer with bootable restoration, which comprises:
- a physical computer member that includes:
- (q) three mass storage devices, being a first mass storage device, a second mass storage device and a third mass storage device;
- (r) at least three mass storage device partitions located in at least one of said three mass storage devices, including first, second, and third partitions;
- (s) a partition image restoration program;
- (t) at least one partition image;
- (u) at least one human interface device;
- (v) a primary operating system that includes a graphical user interface;
- (w) a secondary operating system; and,
- (x) a boot loader responsive to said at least one human interface device, said boot loader providing opportunity for selecting between said primary operating system and said secondary operating system;
- wherein said primary operating system resides on said first partition and said primary operating system is configured so that its standard locations for storing user-created files are folders rooted on at least one of any partition other than said first partition, said at least one partition image is an image of said first partition, said at least one partition image resides on said third partition, and said third partition is hidden from and inaccessible to said primary operating system; and,
- wherein if no opportunity is taken by a user to select said secondary operating system within a predefined time, said computer loads said primary operating system; and, wherein when said secondary operating system is selected by a user within said predefined time, said computer automatically executes said partition image restoration program, which restores said partition image to said first partition.

27. The computer with bootable restoration of claim 26 wherein said primary operating system configuration includes registry data that defines standard locations for storing user-created files as folders rooted on at least one of any partition other than said first partition.

28. The computer with bootable restoration of claim 26 wherein said primary operating system configuration includes registry data that defines standard locations for storing user-created files as folders rooted on said second partition.

29. The computer with bootable restoration of claim 26 wherein a plurality of application programs has been installed on said primary operating system.

30. The computer with bootable restoration of claim 29 wherein said at least one partition image is at least two partition images including first and second partition images, said first partition image excluding said plurality of application programs, and said second partition image including said plurality of application programs.

31. The computer with bootable restoration of claim 26 wherein said third partition resides on said first mass storage device; said boot loader, said secondary operating system, and said partition image restoration program reside on said third partition; said first partition resides on said second mass storage device; said second partition resides on said third mass storage device.

32. The computer with bootable restoration of claim 29 wherein said third partition resides on said first mass storage device; said boot loader, said secondary operating system, and said partition image restoration program reside on said third partition; said first partition resides on said second mass storage device; said second partition resides on said third mass storage device.

33. The computer with bootable restoration of claim 30 wherein said third partition resides on said first mass storage device; said boot loader, said secondary operating system, and said partition image restoration program reside on said third partition; said first partition resides on said second mass storage device; said second partition resides on said third mass storage device.

34. The computer with bootable restoration of claim 26 wherein said at least three mass storage device partitions is at least four mass storage device partitions including a fourth partition; said third and fourth partitions reside on said first mass storage device; said boot loader, said secondary operating system, and said partition image restoration program reside on said fourth partition; said first partition resides on said second mass storage device; said second partition resides on said third mass storage device.

35. The computer with bootable restoration of claim 29 wherein said at least three mass storage device partitions is at least four mass storage device partitions including a fourth partition; said third and fourth partitions reside on said first mass storage device; said boot loader, said secondary operating system, and said partition image restoration program reside on said fourth partition; said first partition resides on said second mass storage device; said second partition resides on said third mass storage device.

36. The computer with bootable restoration of claim 30 wherein said at least three mass storage device partitions is at least four mass storage device partitions including a fourth partition; said third and fourth partitions reside on said first mass storage device; said boot loader, said secondary operating system, and said partition image restoration program reside on said fourth partition; said first partition resides on said second mass storage device; said second partition resides on said third mass storage device.

37. The computer with bootable restoration of claim 26 wherein said at least three mass storage device partitions is at least four mass storage device partitions including a fourth partition; said fourth partition resides on said first mass storage device; said boot loader, said secondary operating system, said partition image restoration program, and said first partition image reside on said fourth partition; said first and third partitions reside on said second mass storage device; said second partition resides on said third mass storage device.

38. The computer with bootable restoration of claim 29 wherein said at least three mass storage device partitions is at least four mass storage device partitions including a fourth partition; said fourth partition resides on said first mass storage device; said boot loader, said secondary operating system, said partition image restoration program, and said first partition image reside on said fourth partition; said first and third partitions reside on said second mass storage device; said second partition resides on said third mass storage device.

39. The computer with bootable restoration of claim 30 wherein said at least three mass storage device partitions is at least four mass storage device partitions including a fourth partition; said fourth partition resides on said first mass storage device; said boot loader, said secondary operating system, said partition image restoration program, and said first partition image reside on said fourth partition; said first and third partitions reside on said second mass storage device; said second partition resides on said third mass storage device.

40. The computer with bootable restoration of claim 26 wherein said at least three mass storage device partitions is at least five mass storage device partitions including fourth and fifth partitions; said fourth and fifth partitions reside on said first mass storage device; said boot loader, said secondary operating system, and said partition image restoration program reside on said fourth partition; said first partition image resides on said fifth partition; said first and third partitions reside on said second mass storage device; said second partition resides on said third mass storage device.

41. The computer with bootable restoration of claim 29 wherein said at least three mass storage device partitions is at least five mass storage device partitions including fourth and fifth partitions; said fourth and fifth partitions reside on said first mass storage device; said boot loader, said secondary operating system, and said partition image restoration program reside on said fourth partition; said first partition image resides on said fifth partition; said first and third partitions reside on said second mass storage device; said second partition resides on said third mass storage device.

42. The computer with bootable restoration of claim 30 wherein said at least three mass storage device partitions is at least five mass storage device partitions including fourth and fifth partitions; said fourth and fifth partitions reside on said first mass storage device; said boot loader, said secondary operating system, and said partition image restoration program reside on said fourth partition; said first partition image resides on said fifth partition; said first and third partitions reside on said second mass storage device; said second partition resides on said third mass storage device.

* * * * *